United States Patent
Zhang et al.

(10) Patent No.: US 12,302,414 B2
(45) Date of Patent: May 13, 2025

(54) BLUETOOTH CONNECTION METHOD, SYSTEM, AND ELECTRONIC DEVICE

(71) Applicant: HUAWEI TECHNOLOGIES CO., LTD., Guangdong (CN)

(72) Inventors: Ya Zhang, Shenzhen (CN); Liang Wang, Shanghai (CN); Weiting Hsiao, Shenzhen (CN); Yequan Song, Shenzhen (CN); Shanshan Guo, Shenzhen (CN); Nengfu Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/793,983

(22) PCT Filed: Jan. 14, 2021

(86) PCT No.: PCT/CN2021/071644
§ 371 (c)(1),
(2) Date: Jul. 20, 2022

(87) PCT Pub. No.: WO2021/147745
PCT Pub. Date: Jul. 29, 2021

(65) Prior Publication Data
US 2023/0041669 A1    Feb. 9, 2023

(30) Foreign Application Priority Data
Jan. 21, 2020  (CN) .......................... 202010072388.1

(51) Int. Cl.
*H04W 76/10*    (2018.01)
*H04W 4/80*    (2018.01)
*H04W 48/16*    (2009.01)

(52) U.S. Cl.
CPC ........... *H04W 76/10* (2018.02); *H04W 48/16* (2013.01); *H04W 4/80* (2018.02)

(58) Field of Classification Search
CPC ..... H04W 12/069; H04W 12/08; H04W 4/40; H04W 4/80; H04W 48/16; H04W 76/10;
(Continued)

(56) References Cited

U.S. PATENT DOCUMENTS 10,149,340 B1 * 12/2018 Rabii ............... B64D 11/00153
2017/0289787 A1 * 10/2017 Yu .......................... H04W 76/14
(Continued)

FOREIGN PATENT DOCUMENTS

| CN | 105636004 A | 6/2016 |
| CN | 107197346 A | 9/2017 |

(Continued)

OTHER PUBLICATIONS

Revised WD of ISO IEC 30141, ISO/IEC JTC 1/WG 10, Information technology Internet of Things Reference Architecture (IoT RA), 3GPP Inbox\LSs_from_external_bodies, 2016, 66 pages.
(Continued)

*Primary Examiner* — Timothy X Pham

(57) ABSTRACT

Embodiments of this application provide a Bluetooth connection method, a system, and an electronic device. In the method, when a communication connection between an electronic device and a vehicle head unit is disconnected, the electronic device starts to scan a Bluetooth advertising signal. When a user carrying the electronic device is close to the vehicle head unit, the electronic device may obtain, through scanning, a Bluetooth advertising signal sent by the vehicle head unit. When obtaining, through scanning, the Bluetooth advertising signal sent by the vehicle head unit, the electronic device may start a vehicle manufacturer application when the vehicle manufacturer application is
(Continued)

cleared by a system. The electronic device may reconnect to the vehicle head unit through Bluetooth by using the vehicle manufacturer application and a Bluetooth chip. Embodiments of this application can improve convenience of unlocking in a scenario in which a vehicle is insensibly unlocked.

20 Claims, 30 Drawing Sheets

(58) Field of Classification Search
CPC ..... H04W 76/14; H04W 76/19; H04W 76/30; H04W 8/005; H04W 84/18
See application file for complete search history.

(56) References Cited

U.S. PATENT DOCUMENTS

| | | | |
|---|---|---|---|
| 2017/0303070 A1* | 10/2017 | Batra | H04W 76/14 |
| 2018/0270883 A1* | 9/2018 | Wu | H04W 76/14 |
| 2018/0368206 A1 | 12/2018 | Wohler et al. | |
| 2019/0253857 A1* | 8/2019 | Li | H04W 4/80 |

FOREIGN PATENT DOCUMENTS

| | | |
|---|---|---|
| CN | 107770849 A | 3/2018 |
| CN | 109151787 A | 1/2019 |
| CN | 109219028 A | 1/2019 |
| CN | 109451474 A | 3/2019 |
| CN | 109769240 A | 5/2019 |
| CN | 110072221 A | 7/2019 |
| CN | 110519737 A | 11/2019 |
| EP | 2672764 A1 | 12/2013 |
| EP | 3226584 A1 | 10/2017 |
| EP | 3468068 A1 | 4/2019 |
| JP | 2016111548 A | 6/2016 |
| JP | 2017034478 A | 2/2017 |
| JP | 2018032928 A | 3/2018 |
| JP | 2018506208 A | 3/2018 |
| JP | 2019012991 A | 1/2019 |
| JP | 2020072343 A | 5/2020 |
| WO | 2018000134 A1 | 1/2018 |

OTHER PUBLICATIONS

Oppo, Oppo BLE car key open interface document, https://open.oppomobile.com/new/developmentDoc/info?id=10778, 14 pages.

* cited by examiner

BLUETOOTH CONNECTION METHOD, SYSTEM, AND ELECTRONIC DEVICE

CROSS-REFERENCE TO RELATED APPLICATIONS

This application is a national stage of International Application No. PCT/CN2021/071644, filed on Jan. 14, 2021, which claims priority to Chinese Patent Application No. 202010072388.1, filed on Jan. 21, 2020. Both of the aforementioned applications are hereby incorporated by reference in their entireties.

TECHNICAL FIELD

This application relates to the field of electronic technologies, and in particular, to a Bluetooth connection method, a system, and an electronic device.

BACKGROUND

As a Bluetooth function of an electronic device continuously develops, the Bluetooth function of the electronic device is more widely applied in user's life. The Bluetooth function of the electronic device can be used in scenarios such as unlocking a vehicle and assisting another device in performing facial payment, to bring convenience to a user.

For example, the Bluetooth function is used for unlocking the vehicle. The electronic device may start, in response to a user operation, an application corresponding to a vehicle key and start a Bluetooth chip to perform Bluetooth scanning. After a processor of the electronic device obtains an advertising signal from a vehicle head unit through scanning by using the Bluetooth chip and establishes a Bluetooth connection, the vehicle may perform security verification by using the application corresponding to the vehicle key on the electronic device, and unlock the vehicle if the verification succeeds.

In the foregoing process of unlocking the vehicle by using the Bluetooth function, the vehicle can be unlocked only when the application is running on the electronic device. When the application on the electronic device is cleared by a system, the user needs to manually start the application corresponding to the vehicle key to implement the unlocking process. As a result, convenience of unlocking through Bluetooth is reduced.

SUMMARY

This application discloses a Bluetooth connection method, a system, and an electronic device, to improve convenience of unlocking in a scenario in which a vehicle is insensibly unlocked.

According to a first aspect, an embodiment of this application provides a Bluetooth system. The Bluetooth system includes a first electronic device and a second electronic device, a first application is installed on the first electronic device, and the first application is associated with the second electronic device. The first electronic device is configured to: establish a Bluetooth connection to the second electronic device; disconnect the Bluetooth connection when a first preset condition is met; and scan a Bluetooth advertising signal in response to the disconnection of the Bluetooth connection. The second electronic device is configured to advertise a first advertising signal in response to the disconnection of the Bluetooth connection, where the first advertising signal carries device information of the second electronic device. The first electronic device is further configured to start the first application when obtaining, through scanning, the first advertising signal carrying the device information of the second electronic device. The first electronic device is further configured to send a reconnection request to the second electronic device by using the first application. The first electronic device is further configured to establish the Bluetooth connection to the second electronic device when receiving a response data packet sent by the second electronic device.

In the Bluetooth system provided in the first aspect, even if the first application is cleared by a system, a user still does not need to manually start the first application on the electronic device. When obtaining, through scanning, the Bluetooth advertising signal sent by the second electronic device, the first electronic device can start the first application when the first application is closed, to establish the Bluetooth connection path between the two devices. This insensibly implements data transmission between the two devices.

Examples of specific application scenarios are provided below.

(1) Scenario in which a Vehicle is Insensibly Unlocked

For example, in the scenario in which the vehicle is insensibly unlocked, the second electronic device is a vehicle head unit, and the first application is a vehicle manufacturer application. The first electronic device is further configured to receive a ciphertext check instruction from the vehicle head unit through a Bluetooth connection to the vehicle head unit. The first electronic device is further configured to send a first ciphertext to the vehicle head unity by using the vehicle manufacturer application. The vehicle head unit is further configured to: perform ciphertext check based on the first ciphertext, and unlock the vehicle if the check succeeds. In this way, even if the vehicle manufacturer application is cleared by a system, a user still does not need to manually start the vehicle manufacturer application on the first electronic device. When obtaining, through scanning, a Bluetooth advertising signal sent by the vehicle head unit, the first electronic device can start the vehicle manufacturer application when the vehicle manufacturer application is closed, to establish the Bluetooth connection path between the two devices. This improves convenience of unlocking the vehicle, and further improves experience of insensibly unlocking the vehicle.

When a door handle of a vehicle is pulled and a distance between the first electronic device and the vehicle head unit is less than a specified threshold, an MCU of the vehicle head unit sends the ciphertext check instruction to a wallet app through the Bluetooth connection between a Bluetooth chip and a primary Bluetooth chip.

In this embodiment of this application, a distance measurement Bluetooth chip of the second electronic device can be in a sleep state, and the MCU wakes up the distance measurement Bluetooth chip only when an RSSI of the primary Bluetooth chip is greater than a specified threshold and precise distance measurement needs to be performed on the first electronic device. In this way, only when the user carrying the first electronic device is close to the vehicle, and is within a specified distance near the vehicle, the MCU starts the distance measurement Bluetooth chip to determine a relative position between the user carrying the first electronic device and the vehicle and a distance between the user carrying the first electronic device and the vehicle head unit. When the user pulls the door handle of the vehicle, the MCU determines, based on the relative position between the user of the first electronic device and the vehicle and the distance between the user of the first electronic device and the vehicle head unit, to perform ciphertext check, thereby unlocking the vehicle.

Time for waking up the distance measurement Bluetooth chip is not limited in this embodiment of this application. The distance measurement Bluetooth chip is not limited to being waken up only when the RSSI of the primary Bluetooth chip is greater than the specified threshold. For example, the distance measurement Bluetooth chip may also be waken up when the connection is established between the primary Bluetooth chip and the Bluetooth chip.

(2) Scenario in which an Accessory (Such as a Bluetooth Electronic Scale) Uploads Data to an Electronic Device For another example, in the scenario in which the accessory (for example, the Bluetooth electronic scale) uploads the data to the electronic device, the second electronic device is the Bluetooth electronic scale, and the first application is a weight scale application. The first electronic device is further configured to receive the weight data from the Bluetooth electronic scale through a Bluetooth connection to the Bluetooth electronic scale. For example, when the Bluetooth connection is re-established, the weight data is transmitted to the first electronic device. The first electronic device may further display the weight data by using the weight scale application. In this way, even if the weight scale application is cleared by a system, a user still does not need to manually start the weight scale application on the first electronic device. When obtaining, through scanning, a Bluetooth advertising signal sent by the weight scale, the first electronic device can start the weight scale application when the weight scale application is closed, to establish the Bluetooth connection path between the two devices. This improves convenience of transmitting the weight data, and further improves experience of insensibly updating the weight data to the electronic device.

(3) Scenario in which a Wearable Device (Such as a Band or a Watch) Uploads Data to an Electronic Device For another example, in the scenario in which the wearable device (for example, the band or the watch) uploads the data to the electronic device, the first electronic device is further configured to receive the data (for example, sleep or exercise data) from the band through a Bluetooth connection to the band. For example, when the Bluetooth connection is re-established, the sleep or exercise data is transmitted to the first electronic device. The first electronic device may further display the sleep or exercise data by using a band application. In this way, even if the band application is cleared by a system, a user still does not need to manually start the band application on the first electronic device. When obtaining, through scanning, a Bluetooth advertising signal sent by the band, the first electronic device can start the band application when the band application is closed, to establish the Bluetooth connection path between the two devices. This improves convenience of transmitting the sleep or exercise data, and further improves experience of insensibly updating the sleep or exercise data to the electronic device.

With reference to the first aspect, in a possible implementation, the first preset condition includes: the first application is cleared by a system; or a received signal strength indicator RRSI of the first electronic device is less than a specified threshold, and the first application is in a started state.

Provided that the Bluetooth connection is passively disconnected, the first electronic device may perform Bluetooth scanning to re-establish the Bluetooth connection. The "passive disconnection" means that the Bluetooth connection is disconnected due to poor signal quality caused by distance lengthening of the Bluetooth connection or another reason.

If the Bluetooth connection between the Bluetooth chip and the primary Bluetooth chip is passively disconnected, an error code "connection timeout" is received. For example, due to distance lengthening (namely, an excessively long distance) between the first electronic device and the vehicle head unit, the two devices cannot communicate with each other, that is, the Bluetooth connection is disconnected. For another example, due to obstacle blocking or another reason, the two devices cannot communicate with each other, that is, the Bluetooth connection is disconnected. If the Bluetooth received signal strength indicator RRSI is lower than a threshold, the two devices cannot communicate with each other, that is, the Bluetooth connection is disconnected. When a Bluetooth agent module of the first electronic device identifies that the Bluetooth connection is passively disconnected, the Bluetooth agent module indicates the Bluetooth chip to scan the Bluetooth advertising signal.

The first electronic device closes the vehicle manufacturer application in response to a user operation, and the Bluetooth connection between the Bluetooth chip and the primary Bluetooth chip is disconnected. In this case, the Bluetooth connection is also passively disconnected. For example, when the user taps a clear control in a recently opened application interface, the first electronic device may clear the vehicle manufacturer app running in a background, and the Bluetooth connection between the Bluetooth chip and the primary Bluetooth chip is disconnected. In this case, the Bluetooth connection is also passively disconnected. When the Bluetooth agent module of the first electronic device identifies that the Bluetooth connection is passively disconnected, the Bluetooth agent module indicates the Bluetooth chip to scan the Bluetooth advertising signal.

With reference to the first aspect, in a possible implementation, the first electronic device is specifically configured to: in response to the disconnection of the Bluetooth connection, when the first application is in a closed state, scan the Bluetooth advertising signal. The first electronic device is further configured to: in response to the disconnection of the Bluetooth connection, when the first application is cleared by a system, send the reconnection request to the second electronic device.

With reference to the first aspect, in a possible implementation, the first electronic device is specifically configured to: when the Bluetooth connection to the second electronic device is disconnected, scan the Bluetooth advertising signal within a specified time period. The first electronic device is further configured to stop scanning the Bluetooth advertising signal when the first Bluetooth advertising signal is not obtained through scanning within the specified time period.

In some other embodiments of this application, for example, in the scenario in which the vehicle is unlocked insensibly, when the Bluetooth connection to the vehicle head unit is disconnected, and the vehicle manufacturer app is still in a started state, the Bluetooth chip of the first electronic device may separately initiate the connection request and perform Bluetooth scanning on different channels. Specifically, the Bluetooth chip may support a multi-channel connection. When the Bluetooth connection to the vehicle head unit is disconnected, and the vehicle manufacturer app is still in the started state, one channel (for example, a channel 1) of the Bluetooth chip may be in an initiating state to reconnect to the primary Bluetooth chip of the vehicle head unit, and another channel (for example, a channel 2) may be in a scanning state to perform the Bluetooth scanning. The Bluetooth chip may re-establish the Bluetooth connection to the primary Bluetooth chip through any one of the foregoing channels.

Optionally, when the Bluetooth connection to the primary Bluetooth chip is established through the channel 1, the Bluetooth chip may stop a connection process on the channel 2. When the Bluetooth connection to the primary Bluetooth chip is established through the channel 2, the Bluetooth chip may stop a connection process on the channel 1. In this way, the primary Bluetooth chip of the vehicle head unit is reconnected through the two channels, thereby improving reconnection efficiency.

With reference to the first aspect, in a possible implementation, the first electronic device is specifically configured to: when the first advertising signal obtained through scanning carries the device information of the second electronic device, detect whether registration information of the first application is valid; and start the first application when the registration information of the first application is valid.

In the scenario in which the vehicle is unlocked insensibly, when the vehicle manufacturer app re-establishes the Bluetooth connection to the primary Bluetooth chip by using the Bluetooth chip, the wallet app may re-verify registration information of the app. When a wallet server corresponding to the wallet app no longer approves a vehicle manufacturer server, a locally stored approved manufacturer name list of the wallet server no longer includes a name of the vehicle manufacturer server. In this way, validity of the registration information is verified in real time when the Bluetooth connection is re-established, thereby improving security.

With reference to the first aspect, in a possible implementation, the first electronic device is further configured to display a first user interface, where the first user interface includes a first control, and the first control is used to disconnect the Bluetooth connection to the second electronic device.

The first electronic device is further configured to: in response to a user operation performed on the first control, disconnect the Bluetooth connection to the second electronic device, and skip scanning the Bluetooth advertising signal.

With reference to the first aspect, in a possible implementation, the Bluetooth connection between the first electronic device and the second electronic device is a Bluetooth low energy BLE connection or a classic Bluetooth BR/EDR connection.

In a BLE connection scenario, when the Bluetooth chip of the first electronic device starts to scan the Bluetooth advertising signal, the Bluetooth scanning may be BLE scanning. In this case, the Bluetooth chip is in a scanning state. The primary Bluetooth chip of the second electronic device sends the Bluetooth advertising signal, and the primary Bluetooth chip may be in an advertising (advertising) state. When the Bluetooth chip initiates a reconnection to the primary Bluetooth chip, the Bluetooth chip enters an initiating state. Finally, the Bluetooth chip enters a connection (connection) state from the initiating state, and the primary Bluetooth chip enters a connection state from the advertising state, so that the Bluetooth chip reconnects to the primary Bluetooth chip to re-establish the connection.

In a BR/EDR connection scenario, the Bluetooth chip has been paired with the primary Bluetooth chip in a registration process. When the Bluetooth chip starts to perform Bluetooth scanning, the Bluetooth scanning may be BR/EDR scanning. In this case, the Bluetooth chip is in an inquiry state. The primary Bluetooth chip sends the Bluetooth advertising signal, and the primary Bluetooth chip may be in an inquiry scan state. To restore the Bluetooth connection, the Bluetooth chip initiates a reconnection to the primary Bluetooth chip that has been connected through Bluetooth. For example, the Bluetooth chip may page (page) the primary Bluetooth chip, to establish the Bluetooth connection between the Bluetooth chip and the primary Bluetooth chip.

With reference to the first aspect, in a possible implementation, the device information of the second electronic device includes one or more of a media access control MAC address of the second electronic device, a vehicle identification number VIN of the second electronic device, and a universally unique identifier UUID of the second electronic device.

The MAC address is used as an example. The Bluetooth chip 101 of the first electronic device may obtain the MAC address carried in the Bluetooth advertising signal obtained through scanning, and compare the MAC address with a locally stored MAC address of the second electronic device. When the MAC address carried in the Bluetooth advertising signal is the same as the stored MAC address of the second electronic device, the first electronic device may start the first application.

With reference to the first aspect, in a possible implementation, the first electronic device is further configured to obtain the device information of the second electronic device when establishing the Bluetooth connection to the second electronic device. The first electronic device is further configured to detect whether the registration information of the first application is valid, where the registration information of the first application includes the device information of the second electronic device. The first electronic device is further configured to store the device information of the second electronic device when the registration information of the first application is valid, where the stored device information of the second electronic device is used by the first electronic device to scan the first advertising signal.

In the scenario in which the vehicle is unlocked insensibly, the vehicle manufacturer app on the first electronic device may send the registration information to the wallet app. The registration information may include a MAC address (a first MAC address) of the vehicle head unit, a package name of the app, a brand of the vehicle, and the like. The registration information may further include a certificate and/or signature information. The certificate and/or the signature information are/is delivered by the vehicle manufacturer server to the vehicle manufacturer app, for example, may be delivered to the vehicle manufacturer app when the vehicle manufacturer app is installed on the electronic device.

With reference to the first aspect, in a possible implementation, the first electronic device is specifically configured to: obtain a first certificate from a server, where the first certificate is used to prove permission of the first application; and detect, based on the first certificate, whether the registration information of the first application is valid.

The Bluetooth agent module 105 of the first electronic device may store registration information indicating that permission verification succeeds, for example, including the registration information of the foregoing vehicle manufacturer app.

In the scenario in which the vehicle is unlocked insensibly, the vehicle manufacturer server may further send, to the wallet app on the first electronic device and the MCU of the vehicle head unit, a ciphertext used for unlocking. The wallet app stores the ciphertext used for unlocking in an SE, and the MCU of the vehicle head unit stores the ciphertext used for unlocking in an SE of the vehicle head unit. The ciphertext used for unlocking may be set by the user in the vehicle manufacturer app, or may be generated based on a password set by the user in the vehicle manufacturer app.

In this embodiment of this application, after registration of the vehicle manufacturer app 102 is completed (the registration information is valid), and the ciphertext used for unlocking is delivered to the first electronic device and the vehicle head unit, the first electronic device may display a control used for unlocking on a leftmost screen, a user interface of the vehicle manufacturer app, and a user interface of the wallet app. In response to a user operation performed on the control used for unlocking, the electronic device may perform ciphertext check through the Bluetooth connection to the vehicle head unit, to unlock the vehicle door.

The leftmost screen is a screen that is on a left side of a plurality of home screen pages of a system and that is used to display information. The home screen page is used to place an application or a widget icon.

With reference to the first aspect, in a possible implementation, a second application is further installed on the first electronic device, the vehicle manufacturer application is connected to the second application, the second application is connected to a secure storage area, and the secure storage area stores the first ciphertext. The first electronic device is specifically configured to: obtain the first ciphertext from the secure storage area by using the vehicle manufacturer application and the second application, and send the first ciphertext to the vehicle head unit.

With reference to the first aspect, in a possible implementation, after the first electronic device and the second electronic device re-establish the Bluetooth connection, the first electronic device may stop scanning the Bluetooth advertising signal, and the second electronic device may also stop advertising the Bluetooth advertising signal. Specifically, when the Bluetooth chip establishes the connection to the primary Bluetooth chip, the Bluetooth agent module may send a fifth notification to the Bluetooth chip, where the fifth notification is used to indicate the Bluetooth chip to disable a Bluetooth scanning function, that is, stop the Bluetooth scanning.

In this embodiment of this application, when the Bluetooth connection is established between the Bluetooth chip and the primary Bluetooth chip, a Bluetooth stack may send a notification to the Bluetooth agent module. When the Bluetooth connection between the Bluetooth chip and the primary Bluetooth chip is re-established, the Bluetooth advertising signal no longer needs to be scanned, and the Bluetooth scanning function is disabled, thereby reducing power consumption.

In this embodiment of this application, the Bluetooth agent module of the first electronic device may count Bluetooth scanning duration. Specifically, the Bluetooth agent module counts, based on the Bluetooth scanning duration, time at which the Bluetooth chip performs the Bluetooth scanning. When count time exceeds the Bluetooth scanning duration, the Bluetooth agent module may notify the Bluetooth chip to disable the Bluetooth scanning function, that is, stop the Bluetooth scanning.

When a Bluetooth switch is turned off and then turned on again or the electronic device is restarted, the first electronic device records remaining Bluetooth scanning duration, and performs the scanning.

According to a second aspect, an embodiment of this application provides a Bluetooth connection method. A first application is installed on a first electronic device, the first application is associated with a second electronic device, and the method includes: The first electronic device establishes a Bluetooth connection to the second electronic device. The first electronic device disconnects the Bluetooth connection to the second electronic device when a first preset condition is met. The first electronic device scans a Bluetooth advertising signal in response to the disconnection of the Bluetooth connection. The first electronic device starts the first application when a first advertising signal obtained through scanning carries device information of the second electronic device. The first electronic device sends a reconnection request to the second electronic device by using the first application. The first electronic device establishes the Bluetooth connection to the second electronic device when receiving a response data packet sent by the second electronic device.

According to the Bluetooth connection method provided in the second aspect, the following may be implemented: Even if the first application is cleared by a system, a user still does not need to manually start the first application on the electronic device. When obtaining, through scanning, the Bluetooth advertising signal sent by the second electronic device, the first electronic device can start the first application when the first application is closed, to establish the Bluetooth connection path between the two devices. This insensibly implements data transmission between the two devices.

With reference to the second aspect, in a possible implementation, the first preset condition includes: the first application is cleared by a system; or a received signal strength indicator RRSI of the first electronic device is less than a specified threshold, and the first application is in a started state.

With reference to the second aspect, in a possible implementation, that the first electronic device scans the Bluetooth advertising signal in response to the disconnection of the Bluetooth connection includes: In response to the disconnection of the Bluetooth connection, when the first application is in a closed state, the first electronic device scans the Bluetooth advertising signal. The method further includes: In response to the disconnection of the Bluetooth connection, when the first application is cleared by a system, the reconnection request is sent to the second electronic device.

With reference to the second aspect, in a possible implementation, that the first electronic device scans the Bluetooth advertising signal in response to the disconnection of the Bluetooth connection includes: The first electronic device scans the Bluetooth advertising signal within a specified time period in response to the disconnection of the Bluetooth connection. The method further includes: The first electronic device stops scanning the Bluetooth advertising signal when the first electronic device does not obtain the first Bluetooth advertising signal through scanning within the specified time period.

With reference to the second aspect, in a possible implementation, that the first electronic device starts the first application when the first advertising signal obtained through scanning carries the device information of the second electronic device includes: When the first advertising signal obtained through scanning carries the device information of the second electronic device, the first electronic device detects whether registration information of the first application is valid. The first electronic device starts the first application when the registration information of the first application is valid.

With reference to the second aspect, in a possible implementation, the method further includes: The first electronic device displays a first user interface, where the first user interface includes a first control, and the first control is used to disconnect the Bluetooth connection to the second electronic device. In response to a user operation performed on the first control, the first electronic device disconnects the Bluetooth connection to the second electronic device, and skips scanning the Bluetooth advertising signal.

With reference to the second aspect, in a possible implementation, the second electronic device is a vehicle head unit, the first application is a vehicle manufacturer application, and after the first electronic device establishes the Bluetooth connection to the second electronic device, the method further includes: The first electronic device receives a ciphertext check instruction from the vehicle head unit through a Bluetooth connection to the vehicle head unit. The first electronic device sends a first ciphertext to the vehicle head unit by using the vehicle manufacturer application, where the first ciphertext is used by the vehicle head unit to check a ciphertext to unlock a vehicle.

With reference to the second aspect, in a possible implementation, the Bluetooth connection between the first electronic device and the second electronic device is a Bluetooth low energy BLE connection or a classic Bluetooth BR/EDR connection.

With reference to the second aspect, in a possible implementation, the device information of the second electronic device includes one or more of a MAC address of the second electronic device, a VIN of the second electronic device, and a UUID of the second electronic device.

With reference to the second aspect, in a possible implementation, the method further includes: The first electronic device obtains the device information of the second electronic device when establishing the Bluetooth connection to the second electronic device. The first electronic device detects whether the registration information of the first application is valid, where the registration information of the first application includes the device information of the second electronic device. The first electronic device stores the device information of the second electronic device when the registration information of the first application is valid, where the stored device information of the second electronic device is used by the first electronic device to scan the first advertising signal.

With reference to the second aspect, in a possible implementation, that the first electronic device detects whether the registration information of the first application is valid includes: The first electronic device obtains a first certificate from a server, where the first certificate is used to prove permission of the first application. The first electronic device detects, based on the first certificate, whether the registration information of the first application is valid.

With reference to the second aspect, in a possible implementation, a second application is further installed on the first electronic device, the vehicle manufacturer application is connected to the second application, the second application is connected to a secure storage area, and the secure storage area stores the first ciphertext. That the first electronic device sends the first ciphertext to the vehicle head unit by using the vehicle manufacturer application includes: The first electronic device obtains the first ciphertext from the secure storage area by using the vehicle manufacturer application and the second application, and sends the first ciphertext to the vehicle head unit.

According to a third aspect, an embodiment of this application provides a first electronic device, including: one or more processors, a memory, a Bluetooth chip, where the Bluetooth chip supports classic Bluetooth BR/EDR and Bluetooth low energy BLE; a plurality of applications, where the plurality of applications include a first application, and the first application is used to enable, in a started state, the first electronic device to establish a Bluetooth connection to a second electronic device; and one or more computer programs, where the one or more computer programs are stored in the memory, the one or more computer programs include instructions, and when the instructions are executed by the first electronic device, the first electronic device is enabled to perform the following steps: establishing the Bluetooth connection to the second electronic device; disconnecting the Bluetooth connection to the second electronic device when a first preset condition is met; scanning a Bluetooth advertising signal in response to the disconnection of the Bluetooth connection; starting the first application when a first advertising signal obtained through scanning carries device information of the second electronic device; sending a reconnection request to the second electronic device by using the first application; and establishing the Bluetooth connection to the second electronic device when receiving a response data packet sent by the second electronic device.

In the first electronic device provided in the third aspect, even if the first application is cleared by a system, a user still does not need to manually start the first application on the electronic device. When obtaining, through scanning, the Bluetooth advertising signal sent by the second electronic device, the first electronic device can start the first application when the first application is closed, to establish the Bluetooth connection path between the two devices. This insensibly implements data transmission between the two devices.

With reference to the third aspect, in a possible implementation, the first preset condition includes: the first application is cleared by a system; or a received signal strength indicator RRSI of the first electronic device is less than a specified threshold, and the first application is in a started state.

With reference to the third aspect, in a possible implementation, when the instructions are executed by the first electronic device, the first electronic device is enabled to specifically perform the following step: in response to the disconnection of the Bluetooth connection, when the first application is in a closed state, scanning the Bluetooth advertising signal. When the instructions are executed by the first electronic device, the first electronic device is enabled to further perform the following step: in response to the disconnection of the Bluetooth connection, when the first application is cleared by a system, sending the reconnection request to the second electronic device.

With reference to the third aspect, in a possible implementation, when the instructions are executed by the first electronic device, the first electronic device is enabled to specifically perform the following step: scanning the Bluetooth advertising signal within a specified time period in response to the disconnection of the Bluetooth connection. When the instructions are executed by the first electronic device, the first electronic device is enabled to further perform the following step: stopping scanning the Bluetooth advertising signal when the first electronic device does not obtain the first Bluetooth advertising signal through scanning within the specified time period.

With reference to the third aspect, in a possible implementation, when the instructions are executed by the first electronic device, the first electronic device is enabled to specifically perform the following steps: when the first advertising signal obtained through scanning carries the device information of the second electronic device, detecting whether registration information of the first application is valid; and starting the first application when the registration information of the first application is valid.

With reference to the third aspect, in a possible implementation, when the instructions are executed by the first electronic device, the first electronic device is enabled to further perform the following steps: displaying a first user interface, where the first user interface includes a first control, and the first control is used to disconnect the Bluetooth connection to the second electronic device; and in response to a user operation performed on the first control, disconnecting the Bluetooth connection to the second electronic device, and skipping scanning the Bluetooth advertising signal.

With reference to the third aspect, in a possible implementation, the second electronic device is a vehicle head unit, the first application is a vehicle manufacturer application, and after the first electronic device establishes the Bluetooth connection to the second electronic device, when the instructions are executed by the first electronic device, the first electronic device is enabled to further perform the following steps: receiving a ciphertext check instruction from the vehicle head unit through a Bluetooth connection to the vehicle head unit; and sending a first ciphertext to the vehicle head unit by using the vehicle manufacturer application, where the first ciphertext is used by the vehicle head unit to check a ciphertext to unlock a vehicle.

With reference to the third aspect, in a possible implementation, the Bluetooth connection between the first electronic device and the second electronic device is a Bluetooth low energy BLE connection or a classic Bluetooth BR/EDR connection.

With reference to the third aspect, in a possible implementation, the device information of the second electronic device includes one or more of a MAC address of the second electronic device, a VIN of the second electronic device, and a UUID of the second electronic device.

According to a fourth aspect, an embodiment of this application provides a Bluetooth chip. The Bluetooth chip is applied to a first electronic device, the chip includes one or more processors, and the processor is configured to invoke computer instructions, so that the first electronic device performs the method described in any one of the second aspect or the possible implementations of the second aspect.

According to a fifth aspect, this application provides a computer storage medium including computer instructions. When the computer instructions are run on an electronic device, the electronic device is enabled to perform the Bluetooth connection method provided in any one of the second aspect or the possible implementations of the second aspect.

According to a sixth aspect, an embodiment of this application provides a computer program product. When the computer program product runs on a computer, the computer is enabled to perform the Bluetooth connection method provided in any one of the second aspect or the possible implementations of the second aspect.

It may be understood that the electronic device in the third aspect, the Bluetooth chip in the fourth aspect, the computer storage medium in the fifth aspect, or the computer program product in the sixth aspect provided above are all configured to perform the Bluetooth connection method provided in any one of the second aspect or the possible implementations of the second aspect. Therefore, for beneficial effects that can be achieved, refer to beneficial effects in a corresponding method, and details are not described herein again.

BRIEF DESCRIPTION OF DRAWINGS

The following describes accompanying drawings used in embodiments of this application.

DESCRIPTION OF EMBODIMENTS

The following describes embodiments of this application with reference to accompanying drawings in embodiments of this application. Terms used in implementations of embodiments of this application are merely used to explain specific embodiments of this application, and are not intended to limit this application.

First, application scenarios related to embodiments of this application are described. A Bluetooth function is more widely used in insensible services. The insensible services include insensibly unlocking a vehicle, insensible payment, and the like. With reference to a system architecture, descriptions are provided below by using an example of an application scenario in which the vehicle is insensibly unlocked.

It may be understood that, embodiments of this application are not limited to the application scenario in which the vehicle is unlocked insensibly, and may further include a service process implemented by using another Bluetooth function, for example, an insensible payment scenario or a scenario in which an accessory (for example, a Bluetooth electronic scale) or a wearable device (for example, a band or a watch) uploads data to an electronic device. This is not limited in embodiments of this application.

Figure 1:
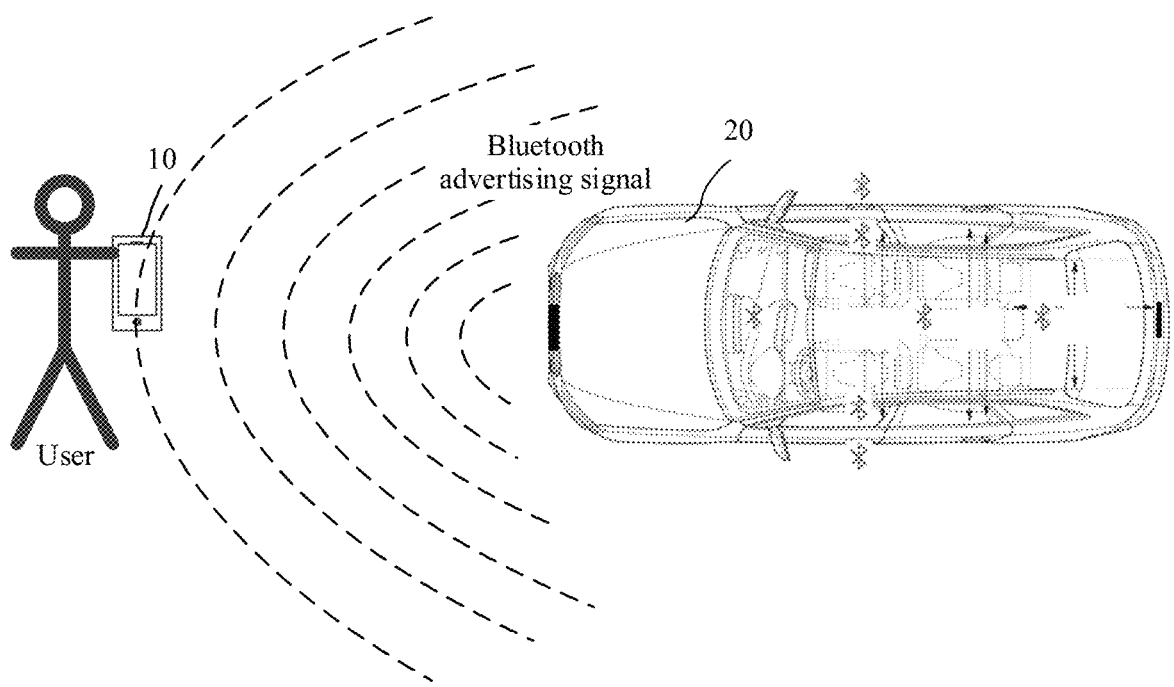
FIG. 1 is a schematic diagram of an architecture of a Bluetooth system according to an embodiment of this application.

FIG. 1 is a schematic diagram of an architecture of a Bluetooth system according to an embodiment of this application. As shown in FIG. 1, the Bluetooth system includes an electronic device 10 and a Bluetooth device 20 (for example, a vehicle head unit 20). The vehicle head unit 20 may advertise a Bluetooth advertising signal. A vehicle manufacturer application (application, app) corresponding to the vehicle head unit 20 may be installed on the electronic device 10. When the vehicle manufacturer app is in a started state, in a process in which a user carrying the electronic device 10 is close to the vehicle head unit 20, the electronic device 10 may receive the Bluetooth advertising signal, and the vehicle manufacturer app may establish a communication connection to a vehicle by using the Bluetooth advertising signal. The vehicle head unit 20 may complete security verification through the communication connection, and automatically unlock a vehicle if the security verification succeeds.

In the foregoing process of unlocking the vehicle, the vehicle can be insensibly unlocked and automatically without the user manually operating the app on the electronic device 10, thereby implementing insensibly unlocking the vehicle. For a principle of establishing the communication connection and automatically unlocking the vehicle, refer to an example described in FIG. 2.

Figure 2:
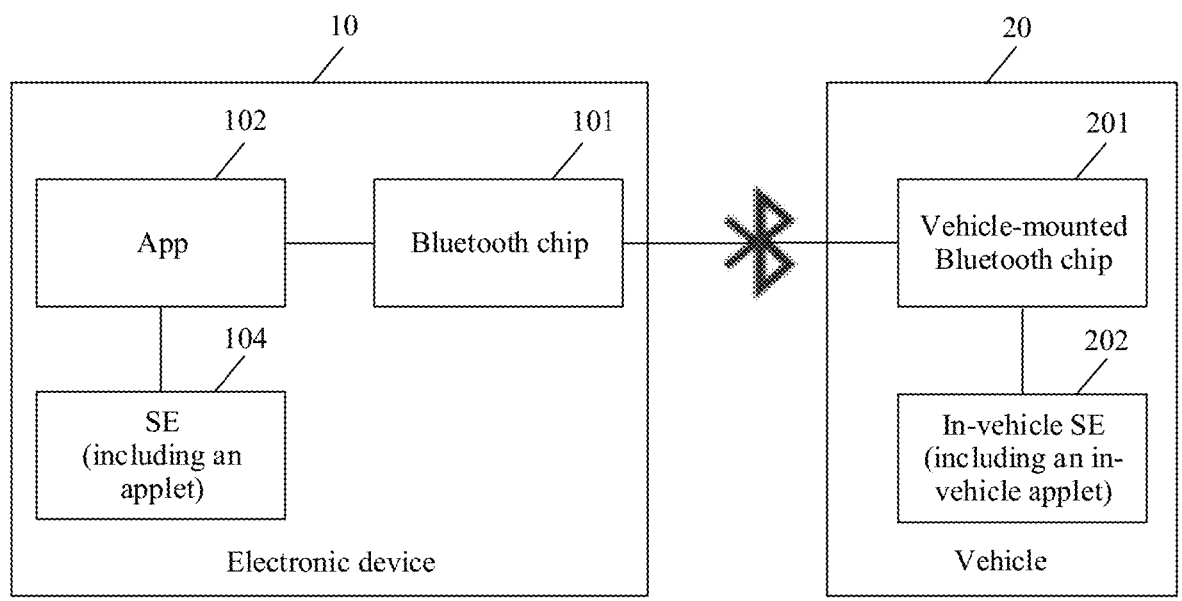
FIG. 2 is a schematic diagram of an architecture of a Bluetooth system according to an embodiment of this application.

The process of unlocking the vehicle in the scenario shown in FIG. 1 is described below with reference to structures of the electronic device 10 and the vehicle head unit 20. FIG. 2 is a schematic diagram of an architecture of the Bluetooth system according to this embodiment of this application. As shown in FIG. 2, the electronic device 10 may establish a communication connection to the vehicle head unit 20, and the communication connection may be a Bluetooth connection. Specifically, in the scenario shown in FIG. 1, in the process in which the user carrying the electronic device 10 is close to the vehicle head unit 20, the electronic device 10 establishes the Bluetooth communication connection to the vehicle head unit 20.

As shown in FIG. 2, the electronic device 10 includes a Bluetooth chip 101, a vehicle manufacturer app 102, and a secure element (secure element, SE) 104, and the SE 104 includes an applet (applet). The vehicle manufacturer app 102 and the SE 104 may be connected through an open mobile alliance application programming interface (open mobile alliance application programming interface, OMA API) 103 (the OMA API 103 is not shown in the figure). The OMA API 103 is an interface for invoking the applet in the SE by using a rich execution environment (rich execution environment, REE).

As shown in FIG. 2, the vehicle head unit 20 includes a vehicle-mounted Bluetooth chip 201 and an in-vehicle SE 202. The in-vehicle SE 202 includes a vehicle-mounted applet. Alternatively, the vehicle-mounted Bluetooth chip 201 and the in-vehicle SE 202 may be connected through an in-vehicle OMA API. The applet in the SE 104 may include a ciphertext used for unlocking. The in-vehicle SE 202 also includes a ciphertext used for unlocking. The ciphertext in the applet in the SE 104 is in a one-to-one correspondence with the ciphertext in the in-vehicle SE 202. For example, a vehicle manufacturer server establishes a secure channel with each of the SE 104 in the electronic device 10 and the in-vehicle SE 202 in the vehicle head unit 20, and places a same ciphertext into each of the SE 104 and the SE 202.

With reference to the schematic diagram of the architecture shown in FIG. 2, processes of disconnecting and re-establishing the communication connection between the electronic device 10 and the vehicle head unit 20 are described below by using a BLE connection as an example. In this scenario, the user carrying the electronic device 10 is away from the vehicle, and this enables that the BLE connection between the electronic device 10 and the vehicle head unit 20 is disconnected. Then, the vehicle manufacturer app 102 on the electronic device 10 is cleared by a system. When the user carrying the electronic device 10 is close to the vehicle again, the user manually starts the vehicle manufacturer app 102 on the electronic device 10, to re-establish the BLE connection between the electronic device 10 and the vehicle head unit 20.

Figure 3:
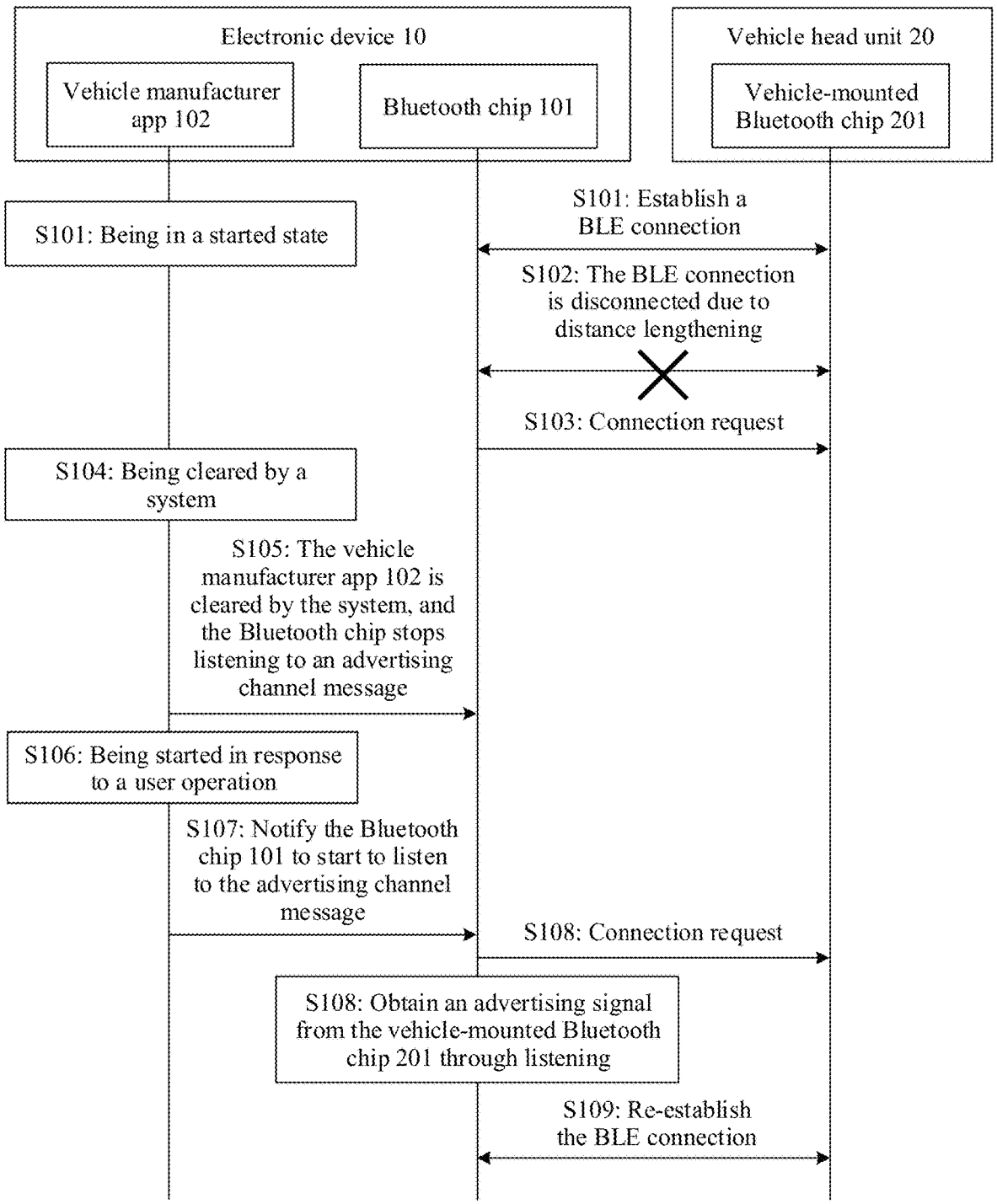
FIG. 3 is a schematic flowchart of a BLE connection method according to an embodiment of this application.

FIG. 3 is a schematic flowchart of a BLE connection method according to this embodiment of this application. As shown in FIG. 3, the BLE connection method includes the following steps.

S101: The vehicle manufacturer app 102 on the electronic device 10 is in a started state, and the Bluetooth chip 101 establishes the BLE connection to the vehicle-mounted Bluetooth chip 201.

S102: The BLE connection between the Bluetooth chip 101 and the vehicle-mounted Bluetooth chip 201 is disconnected due to distance lengthening between the electronic device 10 and the vehicle head unit 20.

It may be understood that this embodiment of this application is described by using the distance lengthening as an example, but is not limited to that the Bluetooth connection is disconnected due to the distance lengthening. Step S103 is performed for reconnection. For example, when the Bluetooth connection is disconnected due to obstacle blocking or another reason, but the vehicle manufacturer app 102 still runs, the electronic device 10 still performs the reconnection step in step S103.

The distance lengthening means that a distance between the electronic device 10 and the vehicle head unit 20 is excessively long. When the distance between the electronic device 10 and the vehicle head unit 20 is excessively long, the two devices cannot communicate with each other, that is, the BLE connection is disconnected. When the BLE connection between the Bluetooth chip 101 and the vehicle-mounted Bluetooth chip 201 is disconnected due to the excessively long distance between the two devices, the vehicle manufacturer app 102 on the electronic device 10 is still in a running state. The vehicle manufacturer app 102 may run in a background, or may run in a foreground.

S103: The Bluetooth chip 101 sends a connection request to the vehicle-mounted Bluetooth chip 201.

The Bluetooth chip 101 may be in an initiating (initiating) state. The Bluetooth chip 101 may send the connection request to the vehicle-mounted Bluetooth chip 201, and listen to an advertising channel message from the vehicle-mounted Bluetooth chip 201. When obtaining, through listening, an advertising signal from the vehicle-mounted Bluetooth chip 201, the Bluetooth chip 101 makes a response to establish the BLE connection between the Bluetooth chip 101 and the vehicle-mounted Bluetooth chip 201. For the process of establishing the connection, refer to descriptions in step S201 in an example described in FIG. 6. When an advertising signal from another device is received, no response is made.

The BLE connection may be used for communication between the vehicle-mounted Bluetooth chip 201 and the vehicle manufacturer app 102 in the process of unlocking the vehicle. Specifically, the vehicle head unit 20 may send a ciphertext check instruction to the electronic device 10 through the communication connection. After receiving the ciphertext check instruction, the electronic device 10 sends the ciphertext in the applet in the SE 104 to the vehicle head unit 20 through the communication connection. The vehicle head unit 20 compares the received ciphertext with the ciphertext in the in-vehicle SE 202; and unlocks the vehicle if the comparison succeeds (for example, if the two ciphertexts are the same, the comparison succeeds).

S104: The vehicle manufacturer app 102 is cleared by the system of the electronic device 10, and step S105 is performed.

After the vehicle manufacturer app 102 is cleared by the system, the vehicle manufacturer app 102 is in a closed state.

The Bluetooth chip 101 may learn that the vehicle manufacturer app 102 is cleared by the system of the electronic device 10, and perform step S105.

S105: The Bluetooth chip 101 stops listening to the advertising channel message.

When the vehicle manufacturer app 102 is closed, the Bluetooth chip 101 stops listening to the advertising channel message. That the vehicle manufacturer app 102 is closed on the electronic device 10 may include but is not limited to the following cases: (1) In response to a closing operation performed by the user, the electronic device 10 closes the vehicle manufacturer app 102. (2) The vehicle manufacturer app 102 is cleared by the system. For example, when running duration of the vehicle manufacturer app 102 in a background of the system of the electronic device 10 exceeds preset duration, the electronic device 10 may close the vehicle manufacturer app 102, to reduce power consumption.

In the process in which the user carrying the electronic device 10 is close to the vehicle head unit 20, when the vehicle manufacturer app 102 is closed on the electronic device 10 (for example, cleared by the system of the electronic device 10), the user needs to manually start the vehicle manufacturer app 102 to re-establish the BLE connection.

S106: If being started in response to a user operation, the vehicle manufacturer app 102 on the electronic device 10 performs step S107.

For example, in response to a touch operation performed on an icon of the vehicle manufacturer app 102, the electronic device 10 starts the vehicle manufacturer app 102 and displays a user interface of the vehicle manufacturer app 102.

S107: The vehicle manufacturer app 102 notifies the Bluetooth chip 101 to start to listen to the advertising channel message.

The Bluetooth chip 101 may enter the initiating state again.

S108: The Bluetooth chip 101 sends the connection request to the vehicle-mounted Bluetooth chip, and obtains the advertising signal from the vehicle-mounted Bluetooth chip 201 through listening.

S109: The Bluetooth chip 101 re-establishes the BLE connection to the vehicle-mounted Bluetooth chip 201.

The Bluetooth chip 101 may store a media access control (media access control, MAC) address of the vehicle head unit 20, and the Bluetooth advertising signal advertised by the vehicle-mounted Bluetooth chip 201 includes the MAC address of the vehicle head unit 20. After obtaining, through listening, the Bluetooth advertising signal from the vehicle-mounted Bluetooth chip 201, the Bluetooth chip 101 establishes the BLE connection to the vehicle-mounted Bluetooth chip 201.

It may be understood that in this embodiment of this application, the MAC address of the vehicle head unit 20 is used as an example for description, but the MAC address constitutes no limitation. The Bluetooth advertising signal advertised by the vehicle-mounted Bluetooth chip 201 may further carry another parameter indicating the vehicle, for example, a vehicle identification number (vehicle identification number (vehicle identification number, VIN)). This is not limited in this embodiment of this application.

It can be learned that in the process in which the user carrying the electronic device 10 is close to the vehicle head unit 20, when the vehicle manufacturer app 102 is closed on the electronic device 10 (for example, cleared by the system of the electronic device 10), the user needs to manually start the vehicle manufacturer app 102 to implement the foregoing unlocking process. As a result, convenience of unlocking the vehicle is reduced, which is not conducive to experience of insensibly unlocking the vehicle.

Embodiments of this application provides a Bluetooth connection method. When the communication connection between the electronic device 10 and the vehicle head unit 20 is disconnected, the electronic device 10 enables a Bluetooth scanning function, and starts to scan a Bluetooth advertising signal. When the user carrying the electronic device 10 is close to the vehicle head unit 20, the electronic device 10 may obtain, through scanning, a Bluetooth advertising signal sent by the vehicle head unit 20. When obtaining, through scanning, the Bluetooth advertising signal sent by the vehicle head unit 20, the electronic device 10 may start the vehicle manufacturer app 102 when the vehicle manufacturer app 102 is cleared by the system. The electronic device 10 may reconnect to the vehicle head unit 20 through Bluetooth by using the vehicle manufacturer app and the Bluetooth chip 101. In this way, the electronic device 10 can establish the communication connection between the vehicle manufacturer app 102 and the vehicle-mounted Bluetooth chip 201 of the vehicle head unit, to insensibly unlock the vehicle.

In the Bluetooth connection method provided in embodiments of this application, even if the vehicle manufacturer app 102 is cleared by the system, the user still does not need to manually start the vehicle manufacturer app 102 on the electronic device 10. The electronic device 10 can start the vehicle manufacturer app 102 to insensibly unlock the vehicle. This improves convenience of unlocking the vehicle, and further improves experience of insensibly unlocking the vehicle.

After the electronic device 10 is successfully reconnected to the vehicle head unit through Bluetooth, the electronic device 10 may disable the Bluetooth scanning function, to reduce power consumption.

It may be understood that the Bluetooth connection is used as an example for description in embodiments of this application. The Bluetooth connection in embodiments of this application may be a BLE connection, or may be a BR/EDR connection. However, in embodiments of this application, the connection is not limited to the Bluetooth connection, and may be another short-range wireless communication connection, for example, a Wi-Fi connection or a ZigBee connection. This is not limited in embodiments of this application.

Figure 4:
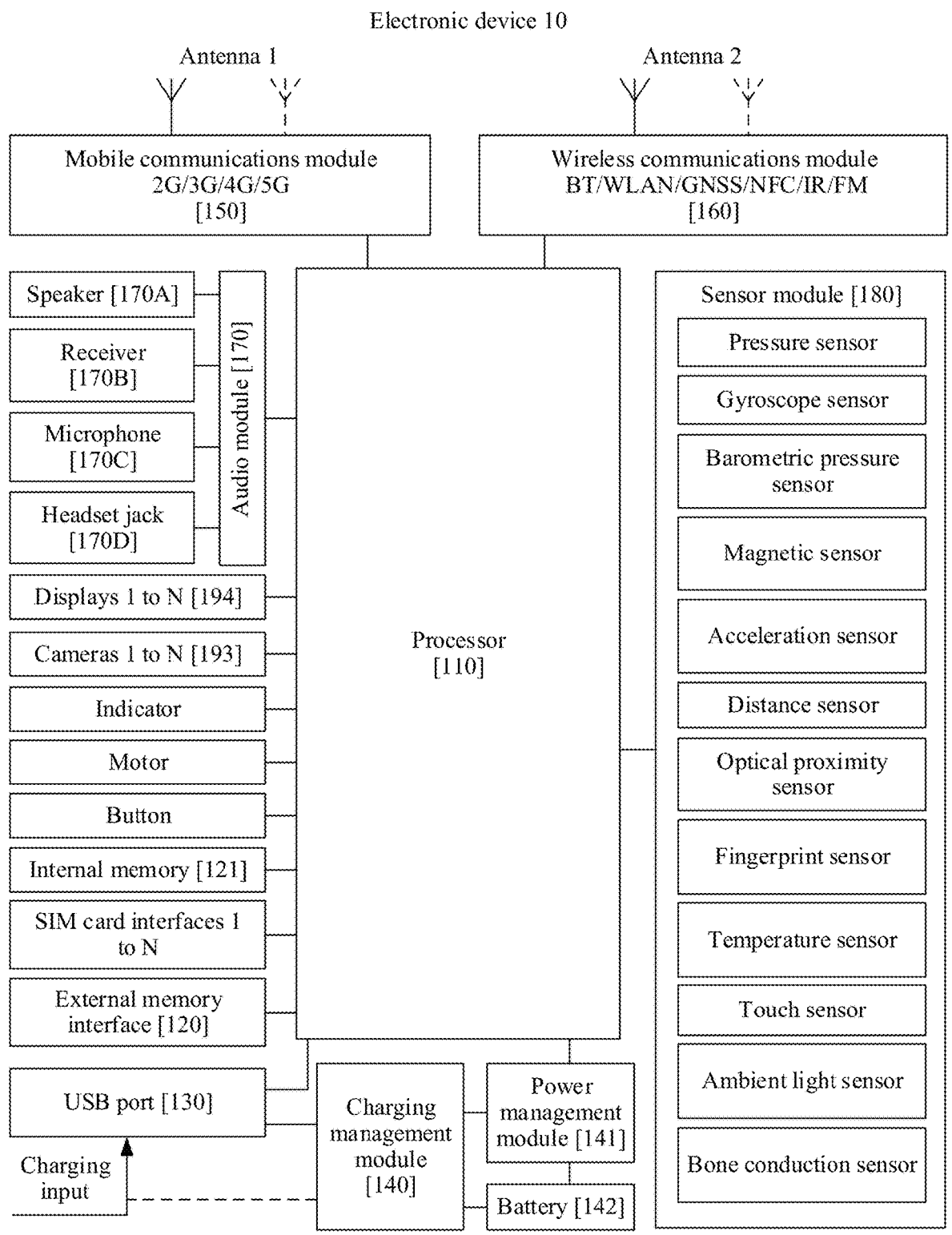
FIG. 4 is a schematic diagram of a structure of an electronic device 10 according to an embodiment of this application.

The electronic device 10 in the Bluetooth system in embodiments of this application is described below. FIG. 4 is a schematic diagram of a structure of the electronic device 10 according to this embodiment of this application.

It should be understood that the electronic device 10 shown in FIG. 4 is merely an example, and the electronic device 10 may include more or fewer components than those shown in FIG. 4, may combine two or more components, or may have different component configurations. Components shown in figure may be implemented in hardware, software, or a combination of hardware and software that includes one or more signal processing and/or application-specific integrated circuits.

The electronic device 10 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 10. In some other embodiments of this application, the electronic device 10 may include more or fewer components than those shown in the figure, or some components may be combined, or some components may be split, or there may be a different component layout. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 10. The controller may generate an operation control signal based on instruction operation code and a time sequence signal, to control instruction fetching and instruction execution.

A memory may be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 10.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be used to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through a CSI interface, to implement a photographing function of the electronic device 10. The processor 110 communicates with the display 194 through the DSI interface, to implement a display function of the electronic device 10.

The GPIO interface may be configured by using software. The GPIO interface may be configured as a control signal, or may be configured as a data signal. In some embodiments, the GPIO interface may be used to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB type-C port, or the like. The USB port 130 may be used to connect to a charger to charge the electronic device 10, may be used to transmit data between the electronic device 10 and a peripheral device, or may be used to connect to a headset, to play audio through the headset. The port may be used to connect to another electronic device such as an AR device.

It may be understood that an interface connection relationship between the modules that is shown in this embodiment of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 10. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/an input from the charging management module 140, and supplies power to the processor 110, the internal memory 121, an external memory, the display 194, the camera 193, the wireless communications module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communications frequency bands. Different antennas may be multiplexed, to improve antenna utilization. For example, the antenna 1 may be multiplexed as a diversity antenna of a wireless local area network. In some other embodiments, an antenna may be used in combination with a tuning switch.

The mobile communications module 150 may provide a solution that is applied to the electronic device 10 and that includes wireless communication such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules in the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After the low-frequency baseband signal is processed by the baseband processor, a processed low-frequency baseband signal is transmitted to the application processor. The application processor outputs a sound signal by using an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in a same component with the mobile communications module 150 or another function module.

The wireless communications module 160 may provide a wireless communication solution that is applied to the electronic device 10 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 10 implements a display function through a GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 10 may include one or N displays 194, where N is a positive integer greater than 1.

The electronic device 10 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in an RGB format, a YUV format, or the like. In some embodiments, the electronic device 10 may include one or N cameras 193, where N is a positive integer greater than 1.

The digital signal processor is configured to process a digital signal, and may process another digital signal in addition to the digital image signal. For example, when the electronic device 10 selects a frequency, the digital signal processor is configured to perform Fourier transform and the like on frequency energy.

The video codec is configured to: compress or decompress a digital video. The electronic device 10 may support one or more types of video codecs. In this way, the electronic device 10 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device 10, such as image recognition, facial recognition, speech recognition, and text understanding.

The external memory interface 120 may be used to connect to an external memory card, for example, a micro SD card, to extend a storage capability of the electronic device 10. The external memory card communicates with the processor 110 through the external memory interface 120, to implement a data storage function. For example, files such as music and videos are stored in the external memory card.

The internal memory 121 may be configured to store computer-executable program code, and the executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 10. In addition, the internal memory 121 may include a high-speed random access memory, and may further include a nonvolatile memory, for example, at least one magnetic disk storage device, a flash memory, and a universal flash storage (universal flash storage, UFS).

The electronic device 10 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 10 may be used to listen to music or answer a hands-free call by using the speaker 170A.

The receiver 170B, also referred to as an "earpiece", is configured to convert an audio electrical signal into a sound signal. When a call is answered or voice information is received by using the electronic device 10, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 10. In some other embodiments, two microphones 170C may be disposed in the electronic device 10, to collect a sound signal and implement a noise reduction function. In some other embodiments, three, four, or more microphones 170C may alternatively be disposed in the electronic device 10, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 10 determines pressure intensity based on a capacitance change. When a touch operation is performed on the display 194, the electronic device 10 detects intensity of the touch operation by using the pressure sensor 180A. The electronic device 10 may calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on an icon of Messages, an instruction for viewing an SMS message is performed. When a touch operation whose touch operation intensity is greater than or equal to the first pressure threshold is performed on the icon of Messages, an instruction for creating an SMS message is performed.

The gyroscope sensor 180B may be configured to determine a motion posture of the electronic device 10. In some embodiments, an angular velocity of the electronic device 10 around three axes (namely, axes x, y, and z) may be determined by using the gyroscope sensor 180B. The gyroscope sensor 180B may be configured to implement image stabilization during shooting. For example, when a shutter is pressed, the gyroscope sensor 180B detects an angle at which the electronic device 10 jitters, obtains, through calculation based on the angle, a distance for which a lens module needs to compensate, and allows the lens to cancel the jitter of the electronic device 10 through reverse motion, to implement image stabilization. The gyroscope sensor 180B may be used in a navigation scenario and a motion-sensing game scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D. In some embodiments, when the electronic device 10 is a clamshell phone, the electronic device 10 may detect opening and closing of a flip cover by using the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 10, and may detect magnitude and a direction of gravity when the electronic device 10 is still. The acceleration sensor 180E may be configured to identify a posture of the electronic device, and is used in an application such as switching between a landscape mode and a portrait mode or a pedometer.

The distance sensor 180F is configured to measure a distance. The electronic device 10 may measure the distance in an infrared or a laser manner. In some embodiments, in a photographing scenario, the electronic device 10 may measure a distance by using the distance sensor 180F to implement quick focusing.

The optical proximity sensor 180G may include a light-emitting diode (LED) and an optical detector, for example, a photodiode. The light-emitting diode may be an infrared light-emitting diode. The electronic device 10 emits infrared light by using the light-emitting diode. The electronic device 10 detects infrared reflected light from a nearby object by using the photodiode. When sufficient reflected light is detected, the electronic device 10 may determine that there is an object near the electronic device 10. When insufficient reflected light is detected, the electronic device 10 may determine that there is no object near the electronic device 10. The electronic device 10 may detect, by using the optical proximity sensor 180G, that the user holds the electronic device 10 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 10 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 10 is in a pocket, to prevent an accidental touch.

The fingerprint sensor 180H is configured to collect a fingerprint. The electronic device 10 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 10 executes a temperature processing policy based on the temperature detected by the temperature sensor 180J. For example, when the temperature reported by the temperature sensor 180J exceeds a threshold, the electronic device 10 lowers performance of a processor located near the temperature sensor 180J, to reduce power consumption to implement thermal protection. In some other embodiments, when the temperature is less than another threshold, the electronic device 10 heats the battery 142 to prevent the electronic device 10 from being shut down abnormally due to a low temperature. In some other embodiments, when the temperature is less than still another threshold, the electronic device 10 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device 10 at a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 10 may receive a button input, and generate a button signal input related to user settings and function control of the electronic device 10.

The motor 191 may generate a vibration prompt. The motor 191 may be used for an incoming call vibration prompt, or may be used for a touch vibration feedback. For example, touch operations performed on different applications (such as a photographing application and an audio playing application) may correspond to different vibration feedback effects. The motor 191 may also correspond to different vibration feedback effects for touch operations performed in different areas of the display 194. Different application scenarios (for example, time reminding, information receiving, an alarm clock, and a game) may also correspond to different vibration feedback effects. A touch vibration feedback effect may be customized.

The indicator 192 may be an indicator lamp, and may be configured to indicate a charging status and a power change, or may be configured to indicate a message, a missed call, a notification, and the like.

The SIM card interface 195 is used to connect to a SIM card. The SIM card may be inserted into the SIM card interface 195 or detached from the SIM card interface 195, to implement contact with or separation from the electronic device 10. The electronic device 10 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 is applicable to different types of SIM cards. The SIM card interface 195 may also be compatible with the external storage card. The electronic device 10 interacts with a network through the SIM card, to implement functions such as calling and data communication. In some embodiments, the electronic device 10 uses an eSIM, that is, an embedded SIM card. The eSIM card may be embedded in the electronic device 10, and cannot be separated from the electronic device 10.

Figure 5:
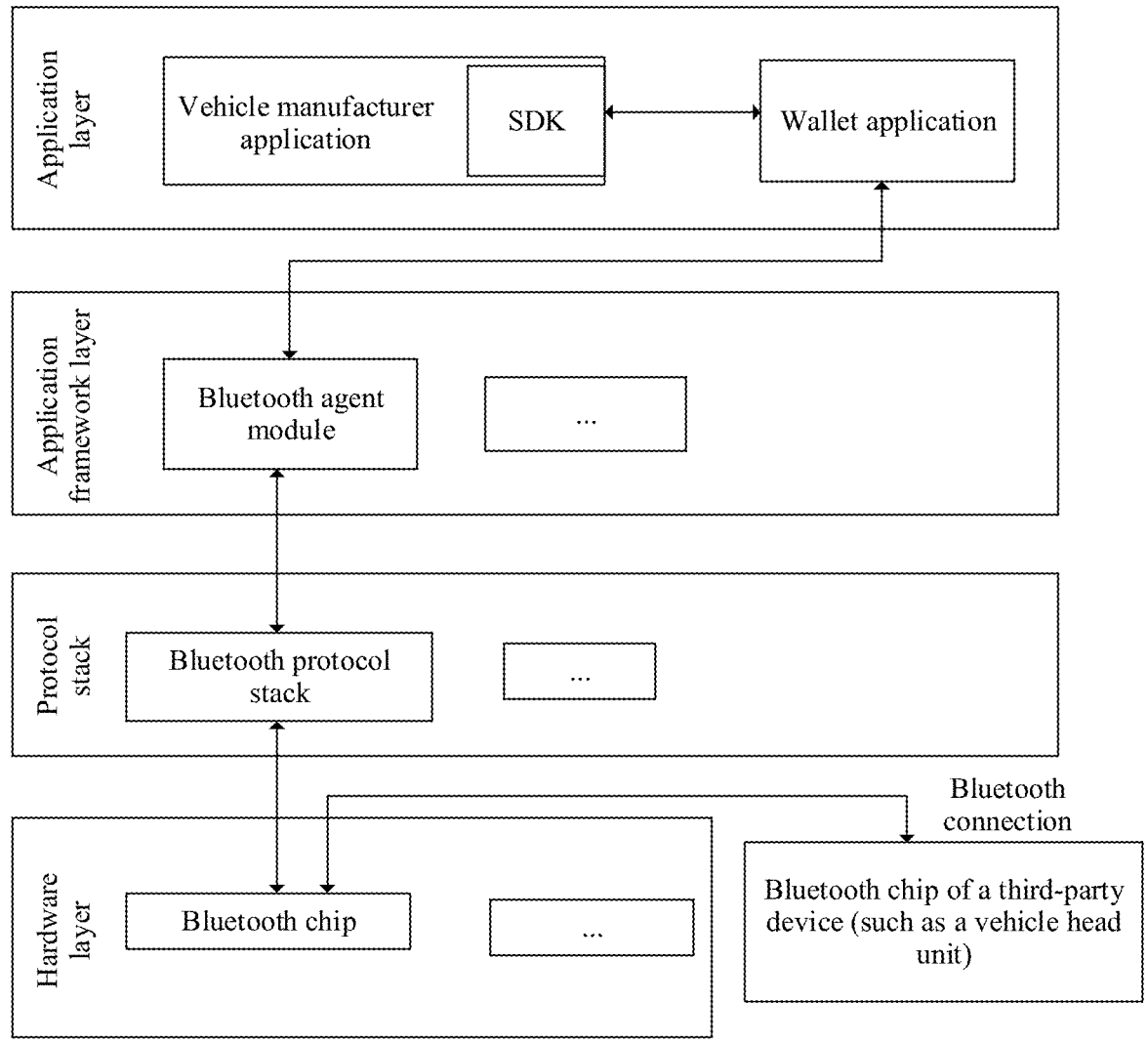
FIG. 5 is a block diagram of a software structure of an electronic device 10 according to an embodiment of this application.

FIG. 5 is a block diagram of a software structure of the electronic device 10 according to this embodiment of this application.

In the layered architecture, software is divided into several layers, and each layer has a clear role and task. The layers communicate with each other through a software interface. In some embodiments, the hierarchical architecture is divided into four layers that are respectively an application layer, an application framework layer, a protocol stack, and a hardware layer from top to bottom.

The application layer may include a series of application packages.

As shown in FIG. 5, the application packages include, for example, a vehicle manufacturer app and a wallet application that correspond to a vehicle key. The wallet application may communicate with a software development kit (software development kit, SDK) in the vehicle manufacturer application. The wallet application can verify validity of the vehicle manufacturer app by using a corresponding server. The wallet application may further notify a Bluetooth agent module (BLE agent) of a verification result. The Bluetooth agent module may determine, based on the verification result, whether to scan an advertisement including a specified MAC address. The Bluetooth agent module may further start, based on the verification result, the vehicle manufacturer app cleared by a system. For details, refer to descriptions in examples shown in FIG. 7 to FIG. 9B, FIG. 16, FIG. 19 to FIG. 21, and FIG. 23 in embodiments of this application.

The application package is not limited to the vehicle manufacturer app included in the scenario in which the vehicle is automatically unlocked. In another scenario, the application package can include another application. For example, in an insensible payment scenario, the application package further includes a payment application (for example, a WeChat application or an Alipay application), and the payment application may be connected to the wallet application by using an included SDK. In a scenario in which an accessory (for example, a Bluetooth electronic scale) automatically uploads weight data to the electronic device 10, the application package further includes an app corresponding to the weight scale. The app can be connected to the wallet application through an included SDK. In a scenario in which a wearable device (for example, a band or a watch) uploads data to the electronic device, the application package further includes an application corresponding to the band and an application corresponding to the watch. A specific scenario and an application installed on the electronic device 10 are not limited in this embodiment of this application.

In this embodiment of this application, a first application may include an application related to an external Bluetooth device (a vehicle head unit, a wearable device, an accessory, or the like), for example, a vehicle manufacturer app, an app corresponding to a weight scale, an application corresponding to a band, or an application corresponding to a watch. A second application may include a wallet application.

In another possible implementation, apps corresponding to the vehicle manufacturer application, the payment application, and the weight scale may be directly connected to the Bluetooth agent module at the application framework layer.

The application package is not limited in this application, and may further include applications such as Camera, Gallery, Calendar, Phone, Map, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 5, the application framework layer may include the Bluetooth agent module provided in this embodiment of this application. The Bluetooth agent module may be an application/interface at the application framework layer. The Bluetooth agent module is configured to indicate the Bluetooth chip to scan the Bluetooth advertising signal including the specified MAC address. The Bluetooth agent module is further configured to: when the Bluetooth chip obtains, through scanning, the advertisement including the specified MAC address, start a specified application (for example, the vehicle manufacturer app), to establish a Bluetooth communication connection between the specified application and the external Bluetooth device (for example, the vehicle head unit 20). Specifically, for functions of the Bluetooth agent module, refer to descriptions in the examples shown in FIG. 7 to FIG. 9B, FIG. 16, FIG. 19 to FIG. 21, and FIG. 23 in embodiments of this application.

The application framework layer may further include a window manager, a content provider, a view system, a phone manager, a resource manager, a notification manager, and the like. This is not limited in this embodiment of this application. The window manager is configured to manage a window program. The window manager may obtain a size of a display, determine whether there is a status bar and the like. The content provider is configured to store and obtain data, and enable the data to be accessed by an application. The view system includes visual controls, such as a control for displaying a text and a control for displaying a picture. The view system may be configured to construct an application. The phone manager is configured to provide a communication function of the electronic device 10, for example, management of a call status (including answering, declining, or the like). The resource manager provides, for an application, various resources such as a localized character string, an icon, and a picture. The notification manager enables an application to display notification information in a status bar, and may be configured to transmit a notification-type message. For example, the notification manager is configured to: notify download completion, provide a message notification, and the like.

The protocol stack may include a plurality of protocols. As shown in FIG. 5, the protocol stack includes a Bluetooth protocol stack (BT Stack). The Bluetooth protocol stack defines a plurality of profiles (profile) and core protocols (protocol) in a Bluetooth framework, each profile defines a corresponding message format and application rule, and the profile is a Bluetooth service (Application). To implement interconnection between different devices on different platforms, a Bluetooth protocol defines specifications for various possible and universal application scenarios, such as an A2DP (advanced audio distribution profile) and an HFP (hands-free profile). The core protocol includes but is not limited to a Bluetooth basic service protocol SDP (service discover protocol), a logical link control and adaptation protocol L2CAP (logical link control and adaptation protocol), and the like. The core protocol is essential to the Bluetooth protocol stack.

The Bluetooth protocol in this embodiment of this application may support a classic Bluetooth (Basic Rate/Enhanced Data Rate, BR/EDR) and/or Bluetooth low energy (Bluetooth low energy, BLE). The Bluetooth protocol may further include different versions of Bluetooth protocols, for example, Bluetooth versions 1.0, 1.2, 2.0+EDR, 3.0+HS, 4.0, 4.1, 4.2, and 5.0.

This is not limited to the Bluetooth protocol, and the protocol stack may further include another type of protocol.

As shown in FIG. 5, the hardware layer may include a Bluetooth chip. The Bluetooth agent module may communicate with the Bluetooth chip through the Bluetooth protocol stack. The Bluetooth chip may scan the Bluetooth advertising signal according to an indication from the Bluetooth agent module. The Bluetooth chip may further establish a Bluetooth connection to a Bluetooth chip of a third-party device (for example, a vehicle head unit), and connect to the vehicle manufacturer app, to establish the Bluetooth communication connection between the vehicle manufacturer app and the external Bluetooth device by using the Bluetooth chip.

In some embodiments of this application, a function of the wallet application at the application layer may be implemented by the Bluetooth agent module, and the wallet application may no longer be included in embodiments provided in this application. Specifically, the Bluetooth agent module may communicate with the SDK in the vehicle manufacturer app, the SDK in the payment application, and the SDK in the app corresponding to the weight scale. The Bluetooth agent module can verify validity of the vehicle manufacturer app by using the corresponding server. The Bluetooth agent module may determine, based on the verification result, whether to scan the advertisement including the specified MAC address. The Bluetooth agent module may further start, based on the verification result, the vehicle manufacturer app cleared by the system.

Figure 6:
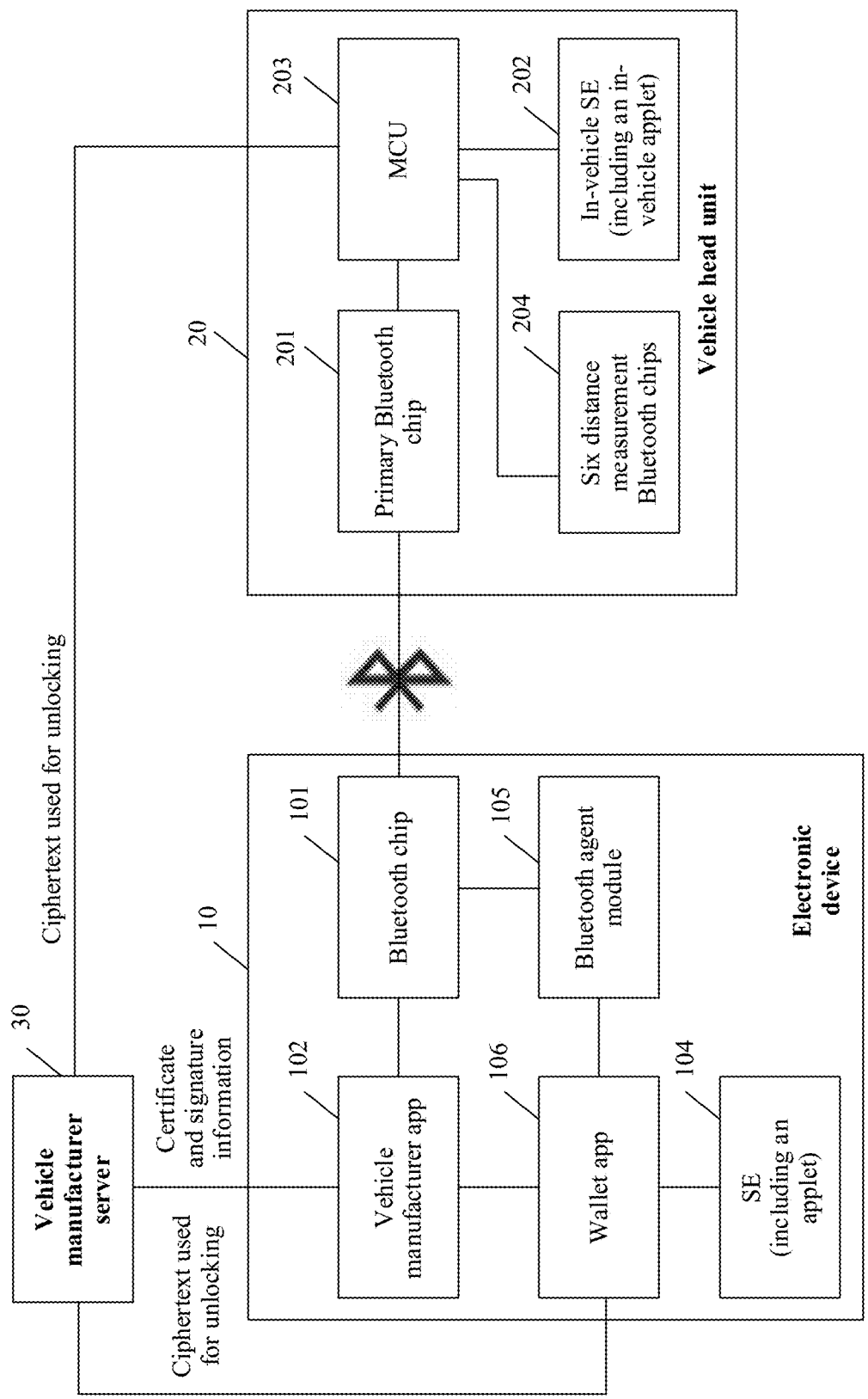
FIG. 6 is a schematic diagram of an architecture of a Bluetooth system according to an embodiment of this application.

The following describes an architecture of a Bluetooth system provided in embodiments of this application. The system architecture may be used in a scenario in which a vehicle is insensibly unlocked through Bluetooth. FIG. 6 is a schematic diagram of an architecture of a Bluetooth system according to an embodiment of this application. As shown in FIG. 6, the Bluetooth system includes an electronic device 10, a vehicle head unit 20, and a vehicle manufacturer server 30.

As shown in FIG. 6, the electronic device 10 includes a Bluetooth chip 101, a vehicle manufacturer app 102, an SE 104, a Bluetooth agent module 105, and a wallet app 106. As shown in FIG. 6, the Bluetooth chip 101 establishes a connection to each of the vehicle manufacturer app 102 and the Bluetooth agent module 105. The Bluetooth chip 101 may be connected to the vehicle manufacturer app 102 by using a processor of the electronic device 10. The vehicle manufacturer app 102 may include an SDK corresponding to the wallet application 106. The vehicle manufacturer app 102 communicates with the wallet app 106 by using the SDK. For details, refer to the descriptions about the vehicle manufacturer app in the embodiment described in FIG. 5.

The wallet app 106 may be separately connected to the vehicle manufacturer app 102, the Bluetooth agent module 105, and the SE 104. The wallet app 106 may be used to communicate with a wallet server to verify whether registration information of the vehicle manufacturer app 102 is valid. In a registration process, if the registration information of the vehicle manufacturer app 102 is valid, the wallet app 106 may send the registration information of the vehicle manufacturer app 102 to the Bluetooth agent module 105 for storage. In a process of insensibly unlocking the vehicle, if the registration information of the vehicle manufacturer app 102 is valid, the wallet app 106 may start the vehicle manufacturer app 102.

The vehicle manufacturer app 102 on the electronic device 10 may establish a communication connection to the vehicle manufacturer server 30. The vehicle manufacturer server 30 may deliver a certificate, signature information, and the like to the vehicle manufacturer app 102 through the communication connection. The certificate and the signature information may be used by the vehicle manufacturer app 102 to prove validity of the vehicle manufacturer app to the wallet app 106 or the Bluetooth agent module 105 during registration. The certificate and the signature information may be carried in registration information in step S202 in an example described in FIG. 7. For a process of proving validity of the vehicle manufacturer app, refer to descriptions in step S203 in the example described in FIG. 7. The wallet app 106 on the electronic device 10 may also establish a communication connection to the vehicle manufacturer server 30, and the vehicle manufacturer server 30 may send, to the wallet app 106 through the communication connection during registration of the vehicle manufacturer app 102, a ciphertext used for unlocking. The wallet app 106 may store the ciphertext in the SE 104. The ciphertext and a ciphertext sent by the vehicle manufacturer server 30 to the vehicle head unit may be in a one-to-one correspondence (for example, the two ciphertexts are the same). When the ciphertext is checked through the communication connection, the vehicle head unit may determine, through comparison, whether the two ciphertexts are the same.

The vehicle manufacturer server 30 and the vehicle head unit 20 may be connected to an MCU 203 by using one or more of the following: a telematics box (telematics box, T-Box), a body control module (body control module, BCM), and a central control module (central control module, CCM).

As shown in FIG. 6, the vehicle head unit 20 may include a primary Bluetooth chip 201, an in-vehicle SE 202, the microcontroller unit (microcontroller unit, MCU) 203, and a distance measurement Bluetooth chip 204. The MCU 203 may separately establish communication connections to the primary Bluetooth chip 201, the in-vehicle SE 202, and the distance measurement Bluetooth chip 204.

There may be a plurality of distance measurement Bluetooth chips 204 that may respectively correspond to a plurality of Bluetooth antennas installed at different positions on a vehicle. For example, a total of six Bluetooth antennas are installed at different positions on the vehicle, and the six Bluetooth antennas may all receive Bluetooth signals sent by the electronic device. Each of the six Bluetooth antennas may correspond to a distance measurement Bluetooth chip, and is used to measure a received signal strength indicator (RSSI) of a received Bluetooth signal. The MCU 203 of the vehicle head unit may determine, based on RSSIs measured by the plurality of Bluetooth chips, a distance between the electronic device carried by a user and the vehicle head unit, and a position relationship between the electronic device and the vehicle.

The MCU 203 of the vehicle head unit 20 may establish the communication connection to the vehicle manufacturer server 30. The vehicle manufacturer server 30 may send, to the MCU 203 through the communication connection during registration of the vehicle manufacturer app 102, the ciphertext used for unlocking. The MCU 203 may store the ciphertext in the in-vehicle SE 202.

Before the vehicle is insensibly unlocked by using the system architecture shown in FIG. 6, the user needs to install the vehicle manufacturer app 102 on the electronic device 10, so that the electronic device 10 completes a registration process. The following processes are described separately below: (a) a registration process; (b) a process of insensibly unlocking a vehicle; (c) a process of re-turning on a Bluetooth switch or restarting the electronic device 10.

(a) Registration Process

Figure 7:
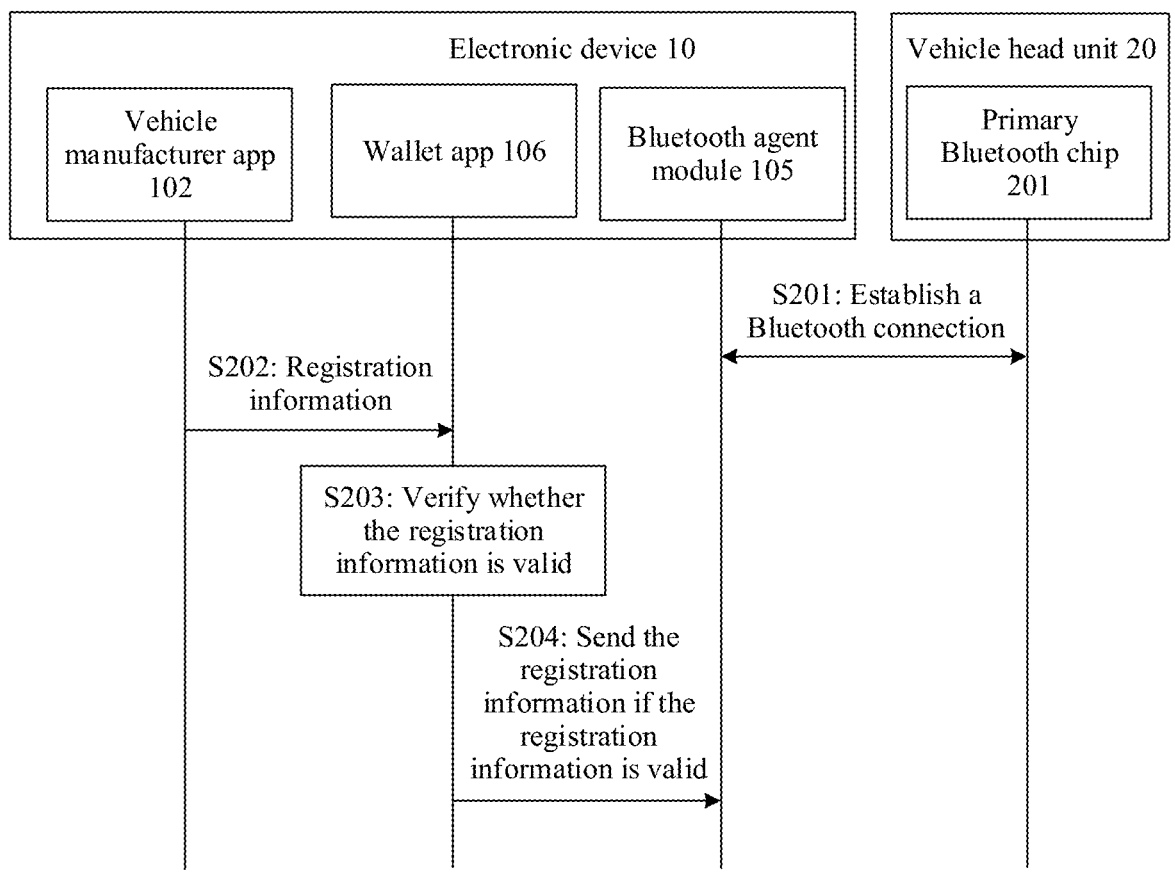
FIG. 7 is a schematic flowchart of a registration process of a vehicle manufacturer app 102 according to an embodiment of this application.

The registration process is described below with reference to the system architecture shown in FIG. 6 and a process shown in FIG. 7. FIG. 7 is a schematic flowchart of the registration process of the vehicle manufacturer app 102 according to this embodiment of this application. The registration process of the vehicle manufacturer app 102 includes steps S201 to S204.

S201: Install the vehicle manufacturer app 102 on the electronic device 10. In response to a user operation in a user interface of the vehicle manufacturer app 102, the Bluetooth chip 101 of the electronic device 10 establishes a Bluetooth connection to the primary Bluetooth chip 201 of the vehicle head unit 20.

A distance between the electronic device 10 and the vehicle head unit 20 falls within a specified threshold range. The electronic device 10 may establish the Bluetooth connection to the vehicle head unit 20 within the specified threshold range. The Bluetooth connection may be a BLE connection, or may be a BR/EDR connection. Specifically, the primary Bluetooth chip 201 of the vehicle head unit 20 may send a Bluetooth advertising signal, where the Bluetooth advertising signal may carry a MAC address, a Bluetooth name, and the like of the vehicle head unit 20. In response to the user operation in the user interface of the vehicle manufacturer app 102, the vehicle manufacturer app 102 may start to search for a Bluetooth advertising signal, and display a Bluetooth name carried in a found Bluetooth advertising signal. For example, the Bluetooth name displayed in the user interface of the vehicle manufacturer app 102 may include a first Bluetooth name, and the first Bluetooth name is the Bluetooth name of the vehicle head unit 20.

For a connection process, in a possible implementation, the Bluetooth connection is the BR/EDR connection. In response to a user operation performed on the first Bluetooth name, the electronic device 10 may be paired with the vehicle head unit 20, and establish the Bluetooth connection to the vehicle head unit 20. Two Bluetooth connection processes are described below.

(1) BR/EDR Connection Process

The process of establishing the BR/EDR connection may include a pairing process and a connection process, which are separately described below.

(a) Pairing Process

In the pairing process, a device that first initiates pairing is referred to as a master device (Master), and a device that passively performs pairing is referred to as a slave device (Slave). For example, in this embodiment of this application, the electronic device 10 actively initiates pairing with the vehicle head unit 20. Therefore, the electronic device 10 may be referred to as a master device, and the vehicle head unit 20 may be referred to as a slave device. In the Bluetooth pairing process, the master device may be in an inquiry (inquiry) state to actively discover an external device. The slave device is in an inquiry scan state and makes a response to scanning of the master device. The Bluetooth pairing process may be as follows:

Step 1: The master device and the slave device each generate an initial key (kinit).

If the master device and the slave device generate initial keys by using a same E22 algorithm, the initial keys obtained by the two devices through calculation should be the same.

Step 2: The master device and the slave device each generate a link key (Kab).

Step 3: The master device and the slave device perform two-way authentication.

The two-way authentication is in a challenge-response (challenge-response) manner. The master device may be a responder, and the slave device may be a requester. The responder may generate a 128-bit random number AU_RANDA, and send the 128-bit random number AU_RANDA to the requester in a plaintext manner. The responder and the requester each perform an encryption operation on respectively obtained AU_RANDA, Kab, and BD_RANDB by using an E1 algorithm, to generate 32-bit SRESA and SRESB respectively. SRESA is generated by the master device that serves as the responder, and SRESB is generated by the slave device that serves as the requester. The requester sends SRESB to the responder. The responder compares SRESA and SRESB. If SRESA and SRESB are equal, current authentication succeeds; or if SRESA and SRESB are unequal, authentication fails. After completing current authentication, roles of the master device and the slave device are interchanged. The master device serves as the requester, and the slave device serves as the responder. The master device and the slave device perform authentication in a same manner.

After authentication between the electronic device 10 and the vehicle head unit 20 is completed, the electronic device 10 and the vehicle head unit 20 may encrypt, by using the link key Kab, data transmitted by the electronic device 10 and the vehicle head unit 20. After the Bluetooth pairing is completed, the vehicle head unit 20 and the electronic device 10 do not need to be paired again when establishing the connection next time. In this embodiment of this application, after completing pairing with the electronic device 10, the vehicle head unit 20 may stop sending the Bluetooth advertising signal. For example, after the vehicle head unit 20 completes pairing with the electronic device 10, and the electronic device 10 is powered on again, the vehicle head unit 20 no longer sends the Bluetooth advertising signal, and page may be performed. After the vehicle head unit 20 completes pairing with the electronic device 10, and the vehicle head unit 20 is powered on again, the vehicle head unit 20 no longer sends the Bluetooth advertising signal, and page scan may be performed.

(b) Connection Process

The connection process may include the following steps.

Step 1: The electronic device 10 is in a page state, and sends a page data packet.

The page data packet may include a device access code (device access code, DAC) of the vehicle head unit 20.

Step 2: When the vehicle head unit 20 is in a page scan state, the vehicle head unit 20 obtains, through listening, the DAC of the vehicle head unit 20.

Step 3: The vehicle head unit 20 may send a reply to the electronic device 10, and switch from the page scan state to a slave response (slave response) state.

Step 4: After receiving the reply sent by the vehicle head unit 20, the electronic device 10 may send a frequency hopping sequence (frequency hopping sequence, FHS) to the vehicle head unit 20 based on the reply, and switch from the page state to a master unit response (master response) state.

Step 5: After receiving the FHS, the vehicle head unit 20 sends a second reply to the electronic device 10, and switches from the slave response state to a connection (connection) state.

Step 6: After the electronic device 10 receives the reply sent by the vehicle head unit 20, the electronic device 10 switches from the master response state to a connection state.

In this case, the electronic device 10 and the vehicle head unit 20 each are in a connection state.

(2) BLE Connection Process

When the connection starts, the two devices are in an advertising (advertising) state and a scanning (scanning) state respectively. A device in an advertising state may be referred to as an advertiser (advertiser), for example, the vehicle head unit 20 in this embodiment of this application. A device in a scanning state may be referred to as an observer (observer), for example, the electronic device 10 in this embodiment of this application. The process of establishing the BLE connection may include the following steps.

S1: The vehicle head unit 20 continuously sends a BLE advertising signal, where t is an advertising interval.

Each time an advertising packet is sent, an advertising event (advertising event) occurs. Each advertising event may include three advertising packets, that is, a same advertising packet is advertised on three channels 37, 38, and 39 at the same time. The advertising event has duration, and the duration is an advertisement transmit window.

S2: The electronic device 10 opens a scan window.

Duration in which the electronic device 10 scans the BLE advertising signal may be referred to as a scan window (scan windows).

S3: The scan window of the electronic device 10 successfully matches the advertisement transmit window of the vehicle head unit 20.

Only when the scan window of the electronic device 10 successfully matches the advertisement transmit window of the vehicle head unit 20, the electronic device 10 can receive the BLE advertising signal sent by the vehicle head unit 20. After the electronic device 10 receives the BLE advertising signal sent by the vehicle head unit 20, the electronic device 10 may enter an initiating (Initiating) state from the advertising (advertising) state, and the electronic device 10 performs step S4.

S4: The electronic device 10 sends a connection request to the vehicle head unit 20.

The connection request is CONN_REQ (also referred to as CONNECT_IND, namely, an A2 data packet). CONN_REQ may include a window offset (transmit window offset), a window size (transmit window size), and the like.

CONN_REQ is used to notify the vehicle head unit 20 that the electronic device 10 is to send a first synchronization packet (a P1 data packet) to the vehicle head unit 20 in a transmit window (transmit window), so that the vehicle head unit 20 opens a radio frequency receive window within a time period corresponding to the transmit window. After receiving the P1 data packet, the vehicle head unit 20 returns a P2 data packet (an ACK packet) to the electronic device 10. Once the electronic device receives the P2 data packet, the BLE connection between the electronic device 10 and the vehicle head unit 20 can be successfully established. The electronic device 10 and the vehicle head unit 20 each enter a connection (connection) state.

In this embodiment of this application, before the electronic device 10 establishes the Bluetooth connection to the vehicle head unit 20, the Bluetooth switch of the electronic device 10 is turned on, so that the Bluetooth chip of the electronic device 10 can scan the Bluetooth advertising signal.

S202: The vehicle manufacturer app 102 sends registration information to the wallet app 106.

In this embodiment of this application, when the Bluetooth chip 101 establishes the Bluetooth connection to the primary Bluetooth chip 201, the vehicle manufacturer app 102 may send the registration information to the wallet app 106. The registration information may include a MAC address (a first MAC address) of the vehicle head unit 20, a package name of the app 102, a brand of the vehicle, and the like. The registration information may further include a certificate and/or signature information. The certificate and/or the signature information are/is delivered by the vehicle manufacturer server 30 to the vehicle manufacturer app, for example, may be delivered to the vehicle manufacturer app 102 when the vehicle manufacturer app 102 is installed on the electronic device 10.

The first MAC address may be obtained by the vehicle manufacturer app 102 from the Bluetooth chip 101.

S203: The wallet app 106 verifies whether the registration information is valid; and performs step S204 if the registration information is valid.

The wallet app 106 may communicate with the wallet server, to verify whether the certificate and/or the signature information are/is valid. Specifically, the wallet server may store verification information used to verify the certificate and/or the signature information. If the wallet server considers that a certificate delivered by a server of an approved manufacturer (for example, the wallet server approves the vehicle manufacturer server 30) is valid, the wallet server pre-stores verification information used to verify a certificate and/or signature information of the vehicle manufacturer server 30. Based on the verification information, the wallet server may verify that the certificate and/or the signature information is valid.

For example, the registration information of the vehicle manufacturer app 102 includes a first certificate, and the first certificate is a digital certificate signed by a certificate authority (certificate authority, CA). The certificate authority is approved by the wallet server corresponding to the wallet app 106. The first certificate may include a public key of the vehicle manufacturer server 30, a name of the vehicle manufacturer server 30, and a digital signature of the certificate authority.

The first certificate is electronic data that includes identity information of the vehicle manufacturer server 30 and that is reviewed and issued by the certificate authority. Therefore, the first certificate may prove, to the wallet server by using the digital signature of the certificate authority, that the vehicle manufacturer server 30 is authenticated by the certificate authority.

If the wallet server approves the certificate authority, the wallet server stores a public key of the certificate authority, verifies the digital signature of the certificate authority in the first certificate by using the public key of the certificate authority, and obtains information such as the public key of the vehicle manufacturer server 30 and the name of the vehicle manufacturer server 30 after the verification succeeds. The wallet server may store an approved manufacturer name list. If the wallet server approves the vehicle manufacturer server 30, the wallet server may store the name of the vehicle manufacturer server 30. After the verification on the digital signature of the certificate authority succeeds, the wallet server detects whether the name that is of the vehicle manufacturer server 30 and that is included in the first certificate is included in the locally stored approved manufacturer name list. If the name is included in the locally stored approved manufacturer name list, it indicates that the registration information is valid, and the wallet server may notify the wallet app 106 of a verification result, and perform step S204.

When the wallet app 106 verifies that the registration information is invalid, the wallet app 106 may notify the vehicle manufacturer app 102. The vehicle manufacturer app 102 may display a message indicating that registration fails.

S204: The wallet app 106 sends the registration information to the Bluetooth agent module 105.

The Bluetooth agent module 105 may store registration information indicating that permission verification succeeds, for example, including the registration information of the foregoing vehicle manufacturer app 102. The registration information of the vehicle manufacturer app 102 may include the MAC address (the first MAC address) of the vehicle head unit 20, the package name of the app 102, and the brand of the vehicle. For example, if the wallet app 106 verifies that registration information of an app 2 and registration information of an app 3 are valid, the Bluetooth agent module 105 may receive and store the registration information of the app 2 and the registration information of the app 3.

The vehicle manufacturer app 102 completes registration with the wallet app 106 through steps S201 to S204.

In this embodiment of this application, the vehicle manufacturer server 30 may further send, to the wallet app 106 on the electronic device 10 and the MCU 203 of the vehicle head unit, the ciphertext used for unlocking. The wallet app 106 stores, in the SE 104, the ciphertext used for unlocking, and the MCU 203 of the vehicle head unit stores, in the in-vehicle SE 202, the ciphertext used for unlocking. The ciphertext used for unlocking may be set by the user in the vehicle manufacturer app 102, or may be generated based on a password set by the user in the vehicle manufacturer app 102.

In this embodiment of this application, after registration of the vehicle manufacturer app 102 is completed through steps S101 to S104, and the ciphertext used for unlocking is delivered to the electronic device 10 and the vehicle head unit 20, the electronic device 10 may display a control used for unlocking on a leftmost screen, the user interface of the vehicle manufacturer app 102, and a user interface of the wallet app 106. In response to a user operation performed on the control used for unlocking, the electronic device 10 may perform ciphertext check through the Bluetooth connection to the vehicle head unit 20, to unlock a vehicle door. For example, the control used for unlocking is, for example, a control 1011 on a leftmost screen 10 shown in FIG. 10.

The leftmost screen is a screen that is on a left side of a plurality of home screen pages of a system and that is used to display information. The home screen page is used to place an application or a widget icon.

(b) Process of Insensibly Unlocking the Vehicle

In this embodiment of this application, when the communication connection between the Bluetooth chip 101 and the primary Bluetooth chip 201 is disconnected, the Bluetooth agent module 105 may notify the Bluetooth chip 101 to enable the Bluetooth scanning function until the Bluetooth advertising signal that includes the MAC address of the vehicle head unit is obtained through scanning. The Bluetooth agent module 105 starts the vehicle manufacturer app 102 based on the Bluetooth advertising signal obtained through scanning. The vehicle manufacturer app 102 reconnects to the vehicle head unit, to re-establish the communication connection between the Bluetooth chip 101 and the primary Bluetooth chip 201. The communication connection may be used to check the ciphertext and unlock the vehicle.

Figure 8A:
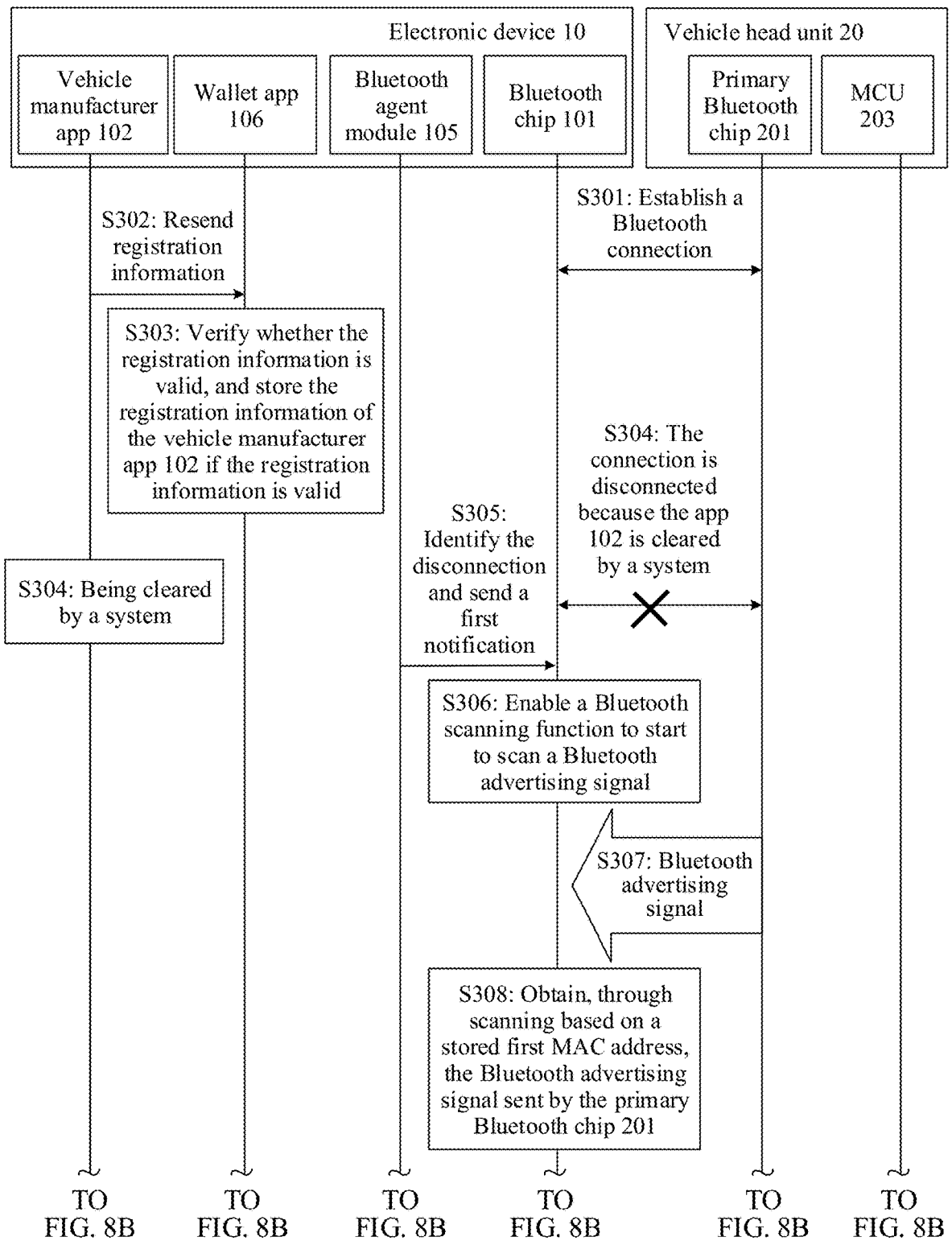
FIG. 8A and FIG. 8B are a schematic flowchart of a process of insensibly unlocking a vehicle according to an embodiment of this application.
Figure 8B:
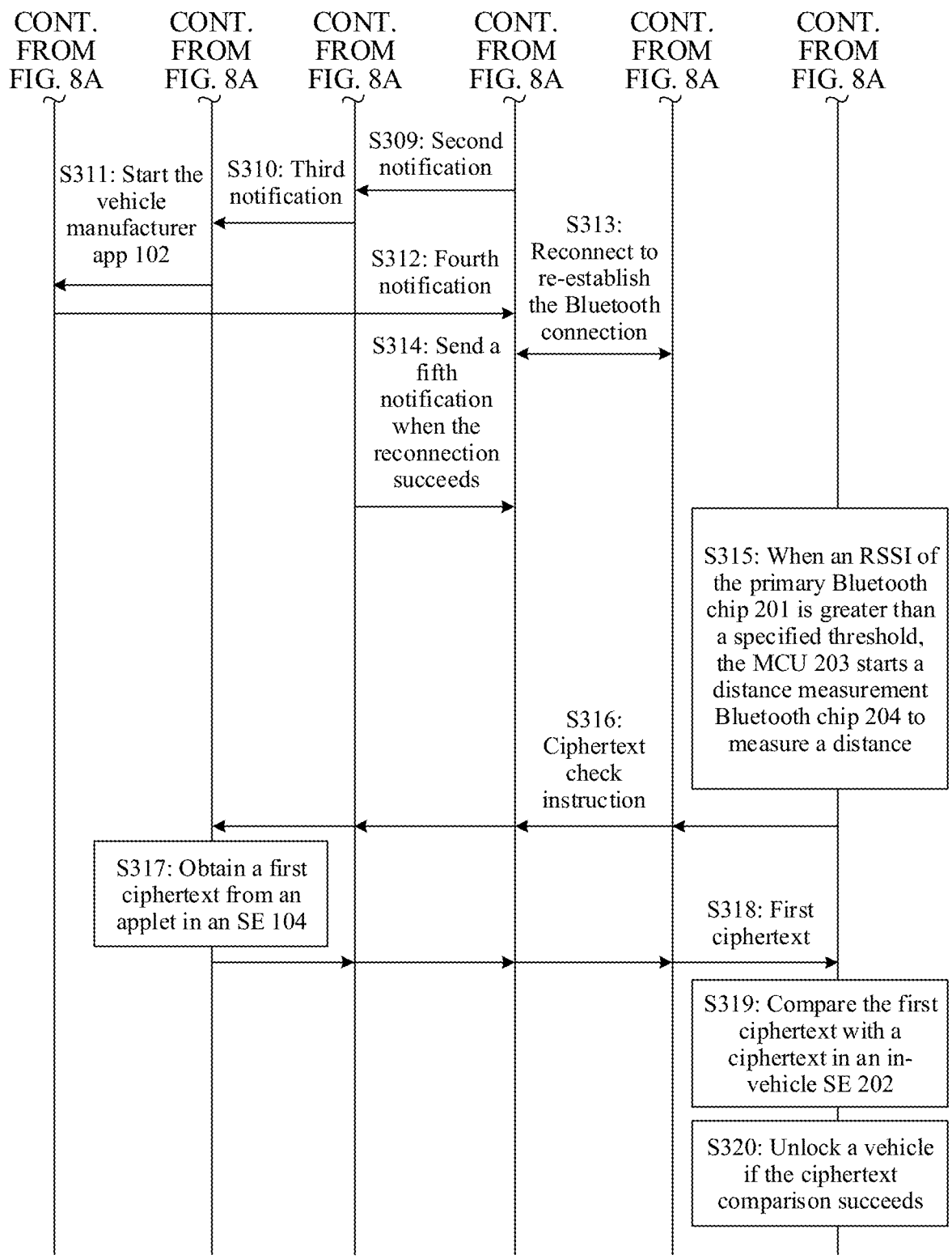

The process of insensibly unlocking the vehicle is described below with reference to the system architecture shown in FIG. 6 and a process shown in FIG. 8A and FIG. 8B. FIG. 8A and FIG. 8B are a schematic flowchart of the process of insensibly unlocking the vehicle according to this embodiment of this application. The process of insensibly unlocking the vehicle includes steps S301 to S320.

S301: The Bluetooth chip 101 establishes the Bluetooth connection to the primary Bluetooth chip 201.

In this case, the vehicle manufacturer app 102 is in a started state. The started state of the vehicle manufacturer app 102 may include a foreground running state and a background running state.

S302: The vehicle manufacturer app 102 resends the registration information to the wallet app 106.

For descriptions of the registration information, refer to descriptions in step S204 in the embodiment described in FIG. 6.

S303: The wallet app 106 verifies whether the registration information is valid, and stores the registration information of the vehicle manufacturer app 102 if the registration information is valid.

In this embodiment of this application, because validity verification of the registration information of the app 102 may have a validity period, when the vehicle manufacturer app 102 re-establishes the Bluetooth connection to the primary Bluetooth chip 201 by using the Bluetooth chip 101, the wallet app 106 may re-verify the registration information of the app 102. For steps S302 and S303, refer to S202 and S203. When the wallet server corresponding to the wallet app 106 no longer approve the vehicle manufacturer server 30, the locally stored approved manufacturer name list of the wallet server no longer includes the name of the vehicle manufacturer server 30. In this way, validity of the registration information is verified in real time when the Bluetooth connection is re-established, thereby improving security.

The wallet app 106 may store the registration information of the vehicle manufacturer app 102, and send the registration information of the vehicle manufacturer app 102 to the Bluetooth agent module 105.

In this embodiment of this application, a process of verifying validity of the registration information in steps S302 and S303 is optional. In another possible implementation, step S304 may be performed after step S301. The electronic device 10 may verify validity of the vehicle manufacturer app 102 based on the registration information of the vehicle manufacturer app 102 that is stored in the registration process.

S304: The vehicle manufacturer app 102 is cleared by a system, and the Bluetooth connection between the Bluetooth chip 101 and the primary Bluetooth chip 201 is disconnected.

In this embodiment of this application, a life cycle of the Bluetooth connection between the Bluetooth chip 101 and the primary Bluetooth chip 201 may end when the vehicle manufacturer app 102 is cleared by the system. When the vehicle manufacturer app 102 is cleared by the system, the Bluetooth chip 101 may disconnect the Bluetooth connection to the primary Bluetooth chip 201.

In this embodiment of this application, the Bluetooth connection between the Bluetooth chip 101 and the primary Bluetooth chip 201 is not limited to being disconnected because the vehicle manufacturer app 102 is cleared by the system, but the Bluetooth connection may be disconnected for another reason. In this embodiment of this application, step S305 may be performed, provided that the Bluetooth connection is passively disconnected. The "passive disconnection" means that the Bluetooth connection is disconnected due to poor signal quality caused by distance lengthening of the Bluetooth connection or another reason. If the Bluetooth connection between the Bluetooth chip 101 and the primary Bluetooth chip 201 is passively disconnected, an error code "connection timeout" is received. For example, due to distance lengthening (namely, an excessively long distance) between the first electronic device 10 and a vehicle head unit 20, the two devices cannot communicate with each other, that is, the Bluetooth connection is disconnected. For another example, due to obstacle blocking or another reason, the two devices cannot communicate with each other, that is, the Bluetooth connection is disconnected. If a Bluetooth received signal strength indicator RRSI is lower than a threshold, the two devices cannot communicate with each other, that is, the Bluetooth connection is disconnected. When the Bluetooth agent module 105 identifies that the Bluetooth connection is passively disconnected, the Bluetooth agent module 105 performs step S305.

The electronic device 10 closes the vehicle manufacturer app 102 in response to a user operation, and the Bluetooth connection between the Bluetooth chip 101 and the primary Bluetooth chip 201 is disconnected. In this case, the Bluetooth connection is also passively disconnected. For example, when the user taps a clear control in a recently opened application interface, the electronic device 10 may clear the vehicle manufacturer app 102 running in a background, and the Bluetooth connection between the Bluetooth chip 101 and the primary Bluetooth chip 201 is disconnected. In this case, the Bluetooth connection is also passively disconnected. When the Bluetooth agent module 105 identifies that the Bluetooth connection is passively disconnected, the Bluetooth agent module 105 performs step S305.

In some other embodiments of this application, when the Bluetooth connection is disconnected due to the distance lengthening between the electronic device 10 and the vehicle head unit 20, the vehicle manufacturer app 102 on the electronic device 10 may still be in the started state. The Bluetooth agent module 105 of the electronic device 10 may learn whether the vehicle manufacturer app 102 is currently in the started state. If the vehicle manufacturer app 102 is currently in the started state, the Bluetooth chip 101 initiates a connection request to the primary Bluetooth chip 201, that is, the Bluetooth chip 101 is in the initiating state in a BLE connection scenario. When the vehicle manufacturer app 102 is in a closed state (for example, the vehicle manufacturer app 102 is cleared by the system because time for the vehicle manufacturer app 102 running in the background exceeds specified time), the Bluetooth agent module 105 may notify the Bluetooth chip 101 to perform Bluetooth scanning, that is, the Bluetooth agent module 105 is in the scanning state in this case.

In some other embodiments of this application, when the Bluetooth connection to the vehicle head unit 20 is disconnected, and the vehicle manufacturer app 102 is still in the started state, the Bluetooth chip 101 may separately initiate a connection request and perform Bluetooth scanning on different channels. Specifically, the Bluetooth chip 101 may support a multi-channel connection. When the Bluetooth connection to the vehicle head unit 20 is disconnected, and the vehicle manufacturer app 102 is still in the started state, one channel (for example, a channel 1) of the Bluetooth chip 101 may be in an initiating state to reconnect to the primary Bluetooth chip 201, and another channel (for example, a channel 2) may be in a scanning state to perform Bluetooth scanning. The Bluetooth chip 101 may re-establish the Bluetooth connection to the primary Bluetooth chip 201 through any one of the foregoing channels. Optionally, when the Bluetooth connection to the primary Bluetooth chip 201 is established through the channel 1, the Bluetooth chip 101 may stop a connection process on the channel 2. When the Bluetooth connection to the primary Bluetooth chip 201 is established through the channel 2, the Bluetooth chip 101 may stop a connection process on the channel 1. In this way, the primary Bluetooth chip of the vehicle head unit is reconnected through the two channels, thereby improving reconnection efficiency.

S305: The Bluetooth agent module 105 identifies that the Bluetooth connection is disconnected, and sends a first notification to the Bluetooth chip 101, where the first notification is used to indicate the Bluetooth chip 101 to start Bluetooth scanning.

The first notification carries the first MAC address. After starting to perform Bluetooth scanning, the Bluetooth chip 101 detects whether a received Bluetooth advertising signal carries the first MAC address.

It may be understood that this embodiment of this application is described by using the MAC address of the vehicle head unit 20 as an example, but is not limited to the MAC address. The Bluetooth advertising signal advertised by the vehicle-mounted Bluetooth chip 201 may further carry another parameter indicating the vehicle, for example, a VIN or a universally unique identifier (universally unique identifier, UUID). In this case, the registration information of the vehicle manufacturer app 102 carries the VIN or the UUID of the vehicle in the registration process. The parameter indicating the vehicle is not limited in this embodiment of this application.

S306: The Bluetooth chip 101 enables the Bluetooth scanning function to start to scan the Bluetooth advertising signal.

S307: The primary Bluetooth chip 201 sends a Bluetooth advertising signal, where the Bluetooth advertising signal carries the MAC address of the vehicle head unit 20.

In a possible implementation of this application, the primary Bluetooth chip 201 may stop advertising the Bluetooth advertising signal when the Bluetooth connection is established; and start to advertise the Bluetooth advertising signal when the Bluetooth connection is disconnected. In another possible implementation, regardless of a Bluetooth connection state or a Bluetooth disconnection state, the primary Bluetooth chip 201 may continuously advertise the Bluetooth advertising signal.

The Bluetooth advertising signal sent by the primary Bluetooth chip 201 is a first advertising signal in this embodiment of this application. The first advertising signal carries device information of a second electronic device (for example, the vehicle head unit). The device information of the vehicle head unit includes the MAC address, the VIN, the UUID, and the like of the vehicle head unit.

If the electronic device 10 can be moved to an area in which the electronic device 10 can obtain, through scanning, the Bluetooth advertising signal sent by the primary Bluetooth chip 201, step S308 is performed.

S308: The Bluetooth chip 101 obtains, through scanning based on the stored first MAC address, the Bluetooth advertising signal sent by the primary Bluetooth chip 201.

The Bluetooth chip 101 may obtain a MAC address carried in the Bluetooth advertising signal obtained through scanning, and compare the MAC address with the locally stored first MAC address. When the MAC address carried in the Bluetooth advertising signal is the same as the stored first MAC address, step S309 is performed.

S309: The Bluetooth chip 101 sends a second notification to the Bluetooth agent module 105, where the second notification is used to notify that the Bluetooth advertising signal obtained through scanning carries the first MAC address.

Before step S310, the Bluetooth agent module 105 may be in a sleep state. When determining that the MAC address carried in the received Bluetooth advertising signal is the same as the stored first MAC address, the Bluetooth chip 101 wakes up the Bluetooth agent module 105 to perform step S310.

S310: The Bluetooth agent module 105 sends a third notification to the wallet app 106 according to the first MAC address, where the third notification is used to indicate the wallet app 106 to verify whether the registration information of the vehicle manufacturer app 102 is valid. Step S312 is performed if the registration information is valid.

In this embodiment of this application, step S311 may be optionally skipped. To be specific, when receiving the second notification, the Bluetooth agent module 105 notifies the wallet app 106 to perform step S312. In this embodiment of this application, it is not limited to starting the vehicle manufacturer app 102 by using the wallet app 106, but the vehicle manufacturer app 102 may alternatively be started by using the Bluetooth agent module 105. In this embodiment of this application, when the wallet app 106 is in the closed state, the Bluetooth agent module 105 may start the wallet app 106.

In this embodiment of this application, when it is verified that the vehicle manufacturer app 102 is invalid, the process ends, and step S311 is not performed.

S311: The wallet app 106 starts the vehicle manufacturer app 102.

S312: The vehicle manufacturer app 102 sends a fourth notification to the Bluetooth chip 101, where the fourth notification is used to indicate the Bluetooth chip 101 to initiate a reconnection to the primary Bluetooth chip 201.

S313: The Bluetooth chip 101 reconnects to the primary Bluetooth chip 201, to re-establish the connection.

The Bluetooth chip 101 reconnects to the primary Bluetooth chip 201, that is, sends a reconnection request to the primary Bluetooth chip 201. After receiving the reconnection request, the primary Bluetooth chip 201 sends a response data packet to the Bluetooth chip 101, so that the Bluetooth chip 101 re-establishes the Bluetooth connection to the primary Bluetooth chip 201.

In the BLE connection scenario, when the Bluetooth chip 101 starts to scan the Bluetooth advertising signal, the Bluetooth scanning may be BLE scanning. In this case, the Bluetooth chip 101 is in the scanning state. The primary Bluetooth chip 201 sends the Bluetooth advertising signal, and the primary Bluetooth chip 201 may be in the advertising (advertising) state. When the Bluetooth chip 101 initiates the reconnection to the primary Bluetooth chip 201, the Bluetooth chip 101 enters the initiating state. Finally, the Bluetooth chip 101 enters the connection (connection) state from the initiating state, and the primary Bluetooth chip 201 enters the connection state from the advertising state, so that the Bluetooth chip 101 reconnects to the primary Bluetooth chip 201 to re-establish the connection.

In the BR/EDR connection scenario, the Bluetooth chip 101 and the primary Bluetooth chip 202 have completed pairing in step S101 in the registration process described in FIG. 7. When the Bluetooth chip 101 starts to perform Bluetooth scanning, the Bluetooth chip 101 is in the inquiry state, where the Bluetooth scanning may be BR/EDR scanning. The primary Bluetooth chip 201 sends the Bluetooth advertising signal, and the primary Bluetooth chip 201 may be in the inquiry scan state. To restore the Bluetooth connection, the Bluetooth chip 101 initiates the reconnection to the primary Bluetooth chip 201 that was connected through Bluetooth. For example, the Bluetooth chip 101 may page (page) the primary Bluetooth chip 201, to establish the Bluetooth connection between the Bluetooth chip 101 and the primary Bluetooth chip 201.

S314: When the Bluetooth chip 101 establishes the connection to the primary Bluetooth chip 201, the Bluetooth agent module 105 may send a fifth notification to the Bluetooth chip 101, where the fifth notification is used to indicate the Bluetooth chip 101 to disable the Bluetooth scanning function, that is, stop performing Bluetooth scanning.

In this embodiment of this application, when the Bluetooth connection is established between the Bluetooth chip 101 and the primary Bluetooth chip 201, a Bluetooth protocol stack may send a notification to the Bluetooth agent module 105, and the Bluetooth agent module 105 may perform step S314.

When the Bluetooth connection between the Bluetooth chip 101 and the primary Bluetooth chip 201 is re-established, the Bluetooth advertising signal no longer needs to be scanned, and the Bluetooth scanning function is disabled, thereby reducing power consumption.

S315: When the RSSI of the primary Bluetooth chip 201 is greater than the specified threshold, the MCU 203 starts the distance measurement Bluetooth chip 204 to measure a distance between the electronic device 10 and the vehicle head unit 20.

In this embodiment of this application, the distance measurement Bluetooth chip 204 can be in a sleep state, and the MCU 203 wakes up the distance measurement Bluetooth chip 204 only when the RSSI of the primary Bluetooth chip 201 is greater than the specified threshold and precise distance measurement needs to be performed on the electronic device 10. In this way, only when the user carrying the electronic device 10 is close to the vehicle, and is within a specified distance near the vehicle, the MCU 203 starts the distance measurement Bluetooth chip 204 to determine a relative position between the user carrying the electronic device 10 and the vehicle and a distance between the user carrying the electronic device 10 and the vehicle head unit. When the user pulls a door handle of the vehicle, the MCU 203 determines, based on the relative position between the user of the electronic device 10 and the vehicle and the distance between the user of the electronic device 10 and the vehicle head unit, to perform ciphertext check, thereby unlocking the vehicle.

Time for waking up the distance measurement Bluetooth chip 204 is not limited in this embodiment of this application. The distance measurement Bluetooth chip 204 is not limited to being waken up only when the RSSI of the primary Bluetooth chip 201 is greater than the specified threshold. For example, the distance measurement Bluetooth chip 204 may alternatively be waken up when the connection is established between the primary Bluetooth chip 201 and the Bluetooth chip 101.

S316: When the door handle of the vehicle is pulled and the distance between the electronic device 10 and the vehicle head unit 20 is less than a specified threshold, the MCU 203 sends a ciphertext check instruction to the wallet app 106 through the Bluetooth connection between the Bluetooth chip 101 and the primary Bluetooth chip 201.

S317: The wallet app 106 obtains a first ciphertext from the applet in the SE 104.

It may be understood that the ciphertext in the electronic device 10 is not limited to being stored in the applet in the SE 104, but may alternatively be stored in another secure storage area, for example, stored in a trusted execution environment (trusted execution environment, TEE) application (trusted execution environment application, TA). In this case, the wallet app 106 may obtain the first ciphertext from the TEE, and send the first ciphertext to the vehicle head unit 20.

S318: The wallet app 106 sends the first ciphertext to the MCU 203 by using the vehicle manufacturer app 102 and the Bluetooth chip 101.

In a transmission process in step S318 the first ciphertext may be encrypted for transmission. An encryption method is not limited in this embodiment of this application.

S319: The MCU 203 compares the first ciphertext with the ciphertext in the in-vehicle SE 202.

S320: The MCU 203 unlocks the vehicle if the ciphertext comparison succeeds.

In the process of insensibly unlocking the vehicle shown in FIG. 8A and FIG. 8B, even if the vehicle manufacturer app 102 is cleared by the system, the user still does not need to manually start the vehicle manufacturer app on the electronic device 10. When obtaining, through scanning, the Bluetooth advertising signal sent by the vehicle head unit 20, the electronic device 10 can start the vehicle manufacturer app when the vehicle manufacturer app 102 is closed, to insensibly unlock the vehicle. This improves convenience of unlocking the vehicle, and further improves experience of insensibly unlocking the vehicle.

In some embodiments of this application, when delivering the first notification in step S305, the Bluetooth agent module 105 may further count Bluetooth scanning duration. Specifically, the Bluetooth agent module 105 counts, based on the Bluetooth scanning duration, time at which the Bluetooth chip 101 performs the Bluetooth scanning. When count time exceeds the Bluetooth scanning duration, the Bluetooth agent module 105 may notify the Bluetooth chip 101 to disable the Bluetooth scanning function, that is, stop the Bluetooth scanning. The Bluetooth scanning duration is a specified time period, and the electronic device 10 scans the Bluetooth advertising signal within the specified time period.

Optionally, the Bluetooth scanning duration may be delivered by the wallet server to the Bluetooth agent module 105. In some other embodiments, a value range of the Bluetooth scanning duration may be set on the wallet server, for example, less than or equal to 7×24 hours. The Bluetooth scanning duration delivered by the Bluetooth agent module 105 needs to meet the value range set on the wallet server.

In this embodiment of this application, the Bluetooth scanning duration may overlap scanning on another type by the electronic device 10, that is, the electronic device 10 scans the Bluetooth advertising signal when performing scanning of the another type. For example, time for scanning Huawei share after the screen is turned off may be 24 hours. During scanning of Huawei share, the electronic device may further detect the Bluetooth advertising signal obtained through scanning, and detect whether the Bluetooth advertising signal carries the device information of the second electronic device.

In this embodiment of this application, in the foregoing (a) Registration process and (b) Process of insensibly unlocking the vehicle, the Bluetooth switch of the electronic device 10 is in an on state, so that the Bluetooth chip 10 is in a working state.

(c) Process of Re-Turning on the Bluetooth Switch or Restarting the Electronic Device 10

Figure 9A:
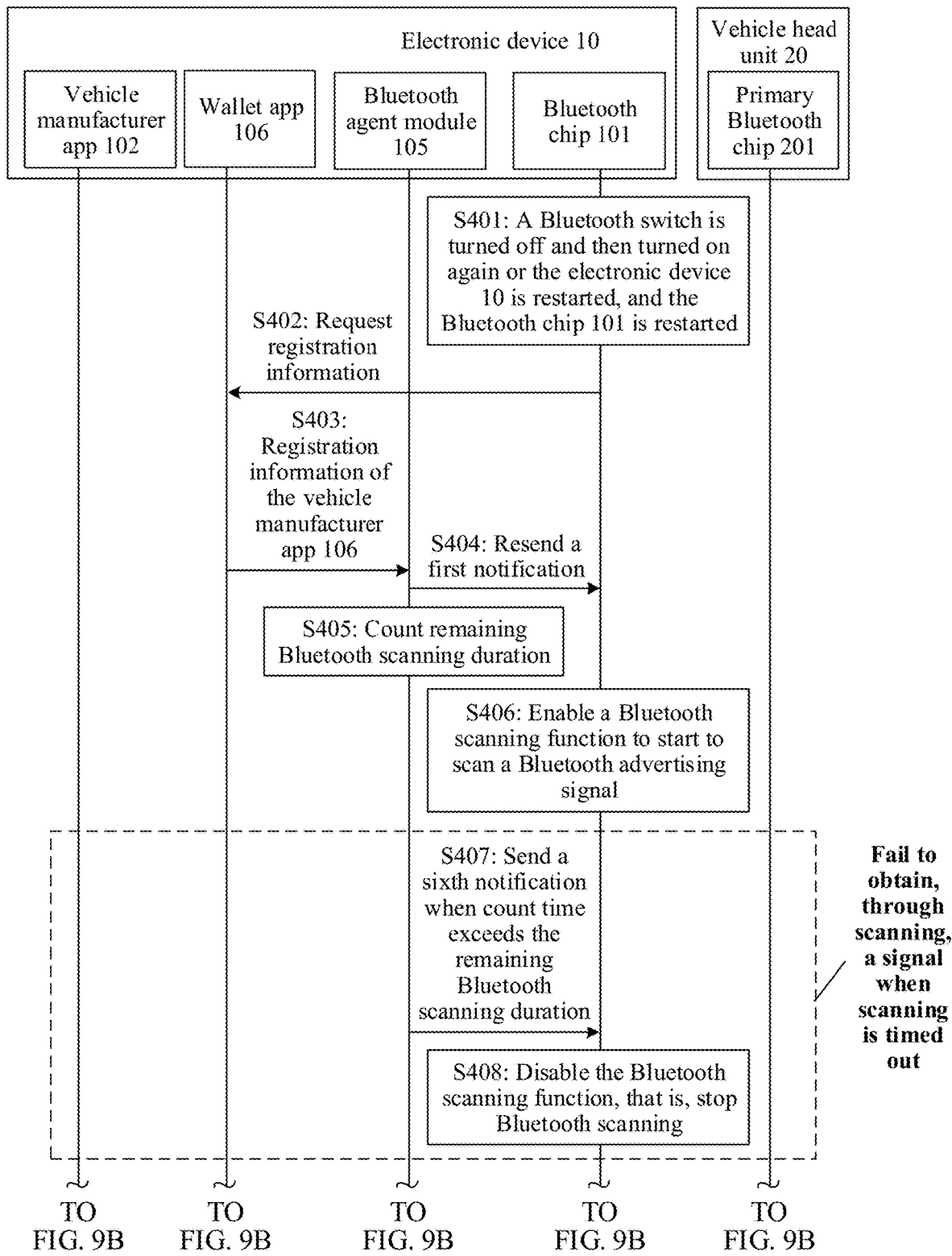
FIG. 9A and FIG. 9B are a schematic flowchart of a Bluetooth scanning method according to an embodiment of this application.
Figure 9B:
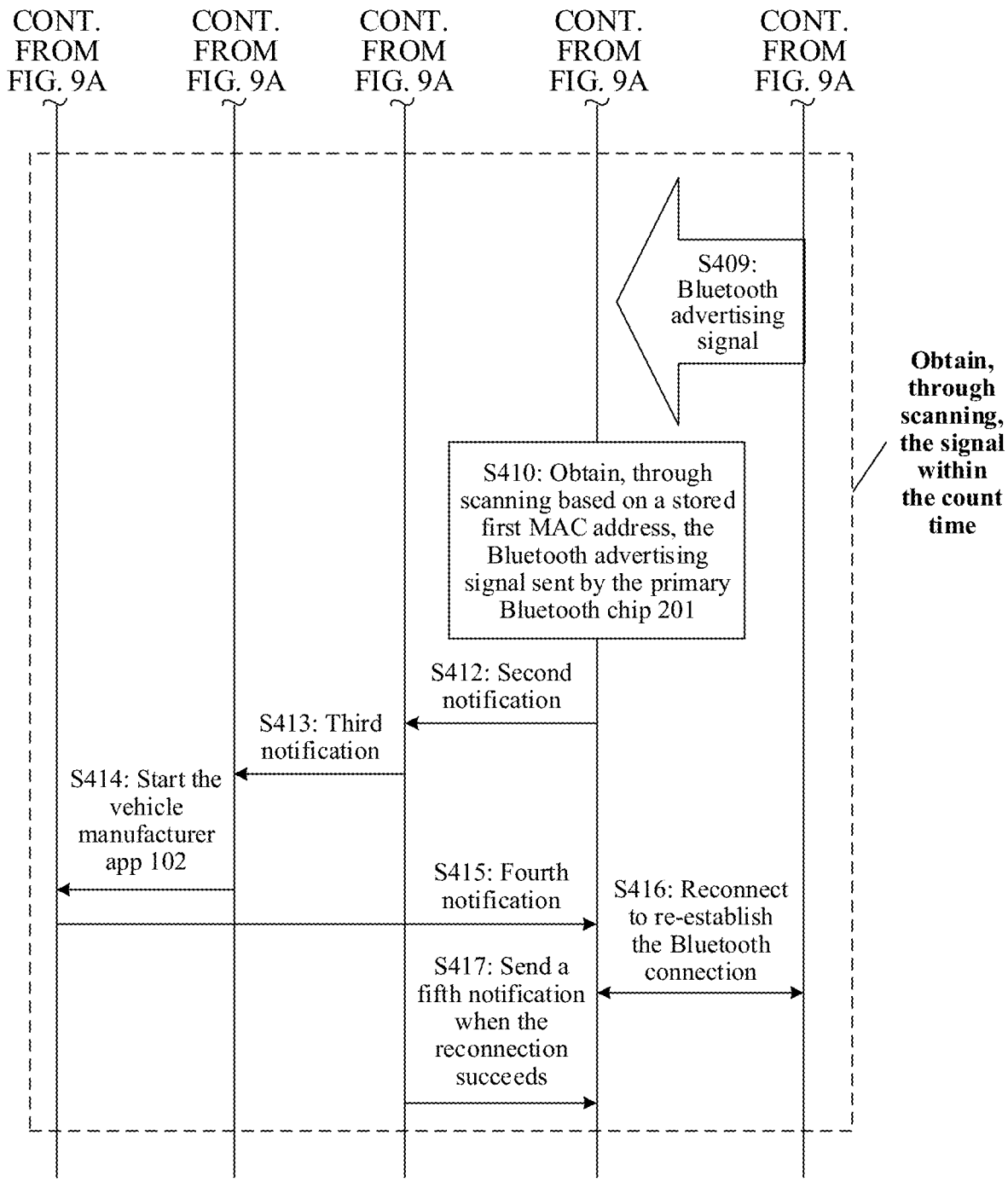

In some embodiments of this application, when the Bluetooth switch is re-turned on (that is, the Bluetooth switch is turned off and then turned on again) or the electronic device 10 is restarted in the process in which the Bluetooth chip 101 performs Bluetooth scanning, the Bluetooth agent module 101 still counts the Bluetooth scanning duration in a period in which the Bluetooth switch is turned off and a period in which the Bluetooth chip stops working due to restarting of the electronic device 10. Specifically, refer to FIG. 9A and FIG. 9B. FIG. 9A and FIG. 9B are a schematic flowchart of a Bluetooth scanning method according to this embodiment of this application. The Bluetooth scanning method includes steps S401 to S408.

S401: The Bluetooth switch is turned off and then turned on again or the electronic device 10 is restarted, and the Bluetooth chip 101 is restarted.

S402: The Bluetooth chip 101 requests registration information from the wallet app 106.

The registration information may include a Bluetooth advertising signal that needs to be scanned (for example, the Bluetooth advertising signal carrying the first MAC address) and the remaining Bluetooth scanning duration. The wallet app 106 may also count the Bluetooth scanning duration, and still store the remaining Bluetooth scanning duration when the Bluetooth switch is re-turned on or the electronic device 10 is restarted.

S403: The wallet app 106 sends the registration information of the vehicle manufacturer app 106 to the Bluetooth agent module 105.

S404: The Bluetooth agent module 105 resends a first notification to the Bluetooth chip 101.

S405: The Bluetooth agent module 105 counts the remaining Bluetooth scanning duration.

S406: The Bluetooth chip 101 enables the Bluetooth scanning function to start to scan the Bluetooth advertising signal.

S407: When count time exceeds the remaining Bluetooth scanning duration, the Bluetooth agent module 105 sends a sixth notification to the Bluetooth chip 101, where the sixth notification indicates to disable the Bluetooth scanning function.

In this embodiment of this application, scanning time of the Bluetooth chip 101 is not limited to being counted by the Bluetooth agent module 105, and may alternatively counted by the Bluetooth chip 101. When the count time exceeds the Bluetooth scanning duration, the Bluetooth chip 101 may stop performing the Bluetooth scanning. The wallet app 106 or the Bluetooth agent module 105 may also store the remaining Bluetooth scanning duration. Currently, when the Bluetooth chip 101 is restarted, the Bluetooth chip 101 may still store the remaining Bluetooth scanning duration, or obtain the remaining Bluetooth scanning duration from the wallet app 106 and the Bluetooth agent module 105, and perform the Bluetooth scanning based on the remaining Bluetooth scanning duration.

S408: The Bluetooth chip 101 disables the Bluetooth scanning function, that is, stops Bluetooth scanning.

In this embodiment of this application, for specific descriptions in steps S409 to S417, refer to steps S309 to S314 in the example described in FIG. 8B. When count time does not exceed the remaining Bluetooth scanning duration, if the Bluetooth advertising signal including the first MAC address is obtained through scanning, the Bluetooth chip 101 notifies the Bluetooth agent module 105, to start the vehicle manufacturer app 102 to establish the Bluetooth connection between the Bluetooth chip 101 and the primary Bluetooth chip 201. After the Bluetooth connection is established, the Bluetooth chip 101 stops the Bluetooth scanning.

Descriptions are provided by using the Bluetooth scanning method described in FIG. 9A and FIG. 9B as an example. Count time of Bluetooth scanning in the Bluetooth agent module 105 is 24 hours. At 08:00 a.m. Beijing time on the first day, the Bluetooth agent module 105 delivers the first notification to start the Bluetooth scanning and start counting. The Bluetooth agent module 105 determines that if the Bluetooth chip 101 still does not establish the Bluetooth connection to the vehicle head unit 20 before 08:00 a.m. on the second day, the Bluetooth agent module 105 disables the Bluetooth scanning function. From 08:00 a.m. Beijing time on the first day to 08:00 a.m. Beijing time on the second day, the Bluetooth switch is re-turned on or the electronic device 10 is restarted, and the Bluetooth agent module 105 still disables the Bluetooth scanning function at 08:00 a.m. Beijing time on the second day. If the vehicle manufacturer app 102 has reconnected to the vehicle head unit 20 from 08:00 a.m. Beijing time on the first day to 08:00 a.m. on the second day, the Bluetooth chip 101 stops the Bluetooth scanning. Counting the current Bluetooth scanning duration also ends.

In this embodiment of this application, time for performing Bluetooth scanning by the electronic device 10 is limited, and the electronic device 10 does not keep scanning when the electronic device does not obtain, through scanning, the Bluetooth advertising signal carrying the first MAC address. This reduces power consumption of Bluetooth scanning.

In this embodiment of this application, after the Bluetooth chip 101 disables the Bluetooth scanning function, the user may touch the control used for unlocking on the leftmost screen, the user interface of the vehicle manufacturer app 102, and the user interface of the wallet app 106, so that the electronic device 10 performs ciphertext verification through the Bluetooth connection to the vehicle head unit 20, thereby unlocking the vehicle door. In addition, in response to the user operation performed on the control used for unlocking, the electronic device 10 may re-enable the Bluetooth scanning function.

In some embodiments of this application, the Bluetooth connection between the electronic device 10 and the vehicle head unit 20 may be disconnected in response to a user operation. That is, the Bluetooth connection is actively disconnected. Active disconnection is relative to the foregoing passive disconnection. Specifically, after registration described in FIG. 7 is completed, the electronic device 10 may display, on the leftmost screen, the user interface of the vehicle manufacturer app 102, and the user interface of the wallet app 106, a control used for disconnection. The leftmost screen, the user interface of the vehicle manufacturer app 102, and the user interface of the wallet app 106 are first user interfaces, and the control used for disconnection is a first control. In response to the user operation performed on the control, the Bluetooth chip 101 of the electronic device 10 may disconnect the Bluetooth connection to the primary Bluetooth chip 201. The processor of the electronic device 10 may notify the Bluetooth agent module 105, where the notification indicates that the disconnection is actively triggered by the user. After receiving the notification, the Bluetooth agent module 105 may no longer notify the Bluetooth chip 101 to perform the scanning, and the Bluetooth chip 101 no longer sends the connection request to the primary Bluetooth chip 201. When the electronic device 10 actively disconnects the Bluetooth connection, the electronic device 10 receives an error code (error code) such as "connection terminated by local host", and the vehicle head unit 20 receives an error code such as "remote user terminated connection".

In this way, when the user operation triggers the disconnection of the Bluetooth connection between the electronic device 10 and the vehicle head unit 20, the electronic device 10 skips scanning the Bluetooth advertising signal, thereby improving convenience.

User interfaces in embodiments of this application are described below.

Figure 10:
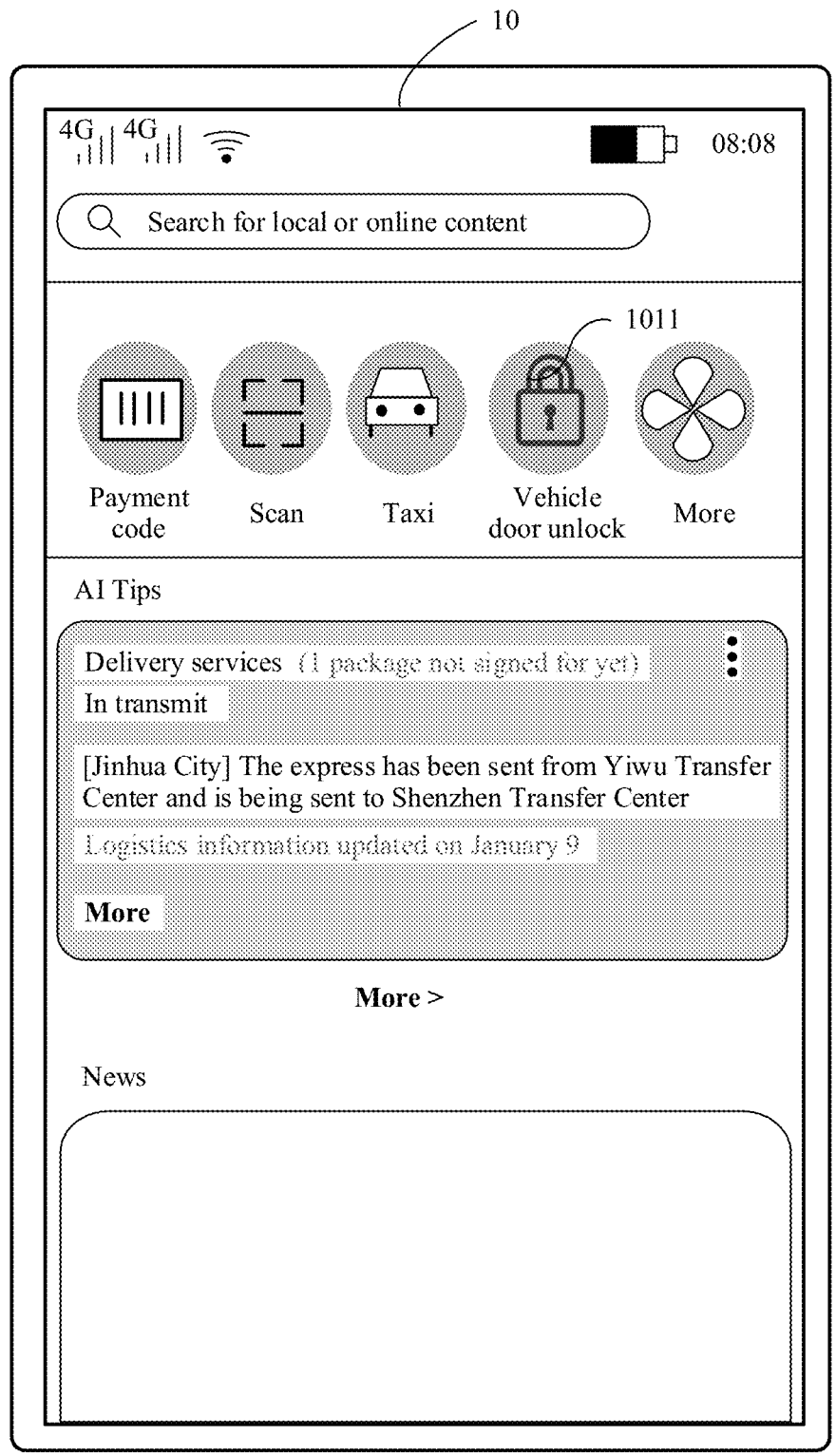
FIG. 10 is a schematic diagram of a user interface according to an embodiment of this application.

FIG. 10 is a schematic diagram of a user interface according to this embodiment of this application. As shown in FIG. 10, the user interface 10 is a leftmost screen. After registration of the vehicle manufacturer app 102 is completed through steps S101 to S104, and the ciphertext used for unlocking is delivered to the electronic device 10 and the vehicle head unit 20, the electronic device 10 may display, on the leftmost screen, the control used for unlocking the vehicle. As shown in FIG. 10, the leftmost screen 10 includes a plurality of function controls, for example, a payment code control, a scan control, a taxi control, a vehicle door unlock control 1011, and more controls. The leftmost screen 10 may further include AI tips information, for example, delivery service information. The leftmost screen 10 may further include news information and the like.

The vehicle door unlock control 1011 is used to unlock a vehicle. Specifically, when the user carrying the electronic device 10 moves near the vehicle, the user may touch the vehicle door unlock control 1011 to trigger unlocking the vehicle door. In response to the user operation performed on the vehicle door unlock control 1011, the electronic device 10 may enable the Bluetooth scanning function. When the vehicle manufacturer app 102 is closed, the electronic device 10 may start the vehicle manufacturer app 102. The electronic device 10 may establish the Bluetooth connection between the electronic device 10 and the vehicle head unit 20 based on the Bluetooth advertising signal obtained, through scanning, from the vehicle head unit 20, and complete ciphertext check through the Bluetooth connection.

Figure 11A:
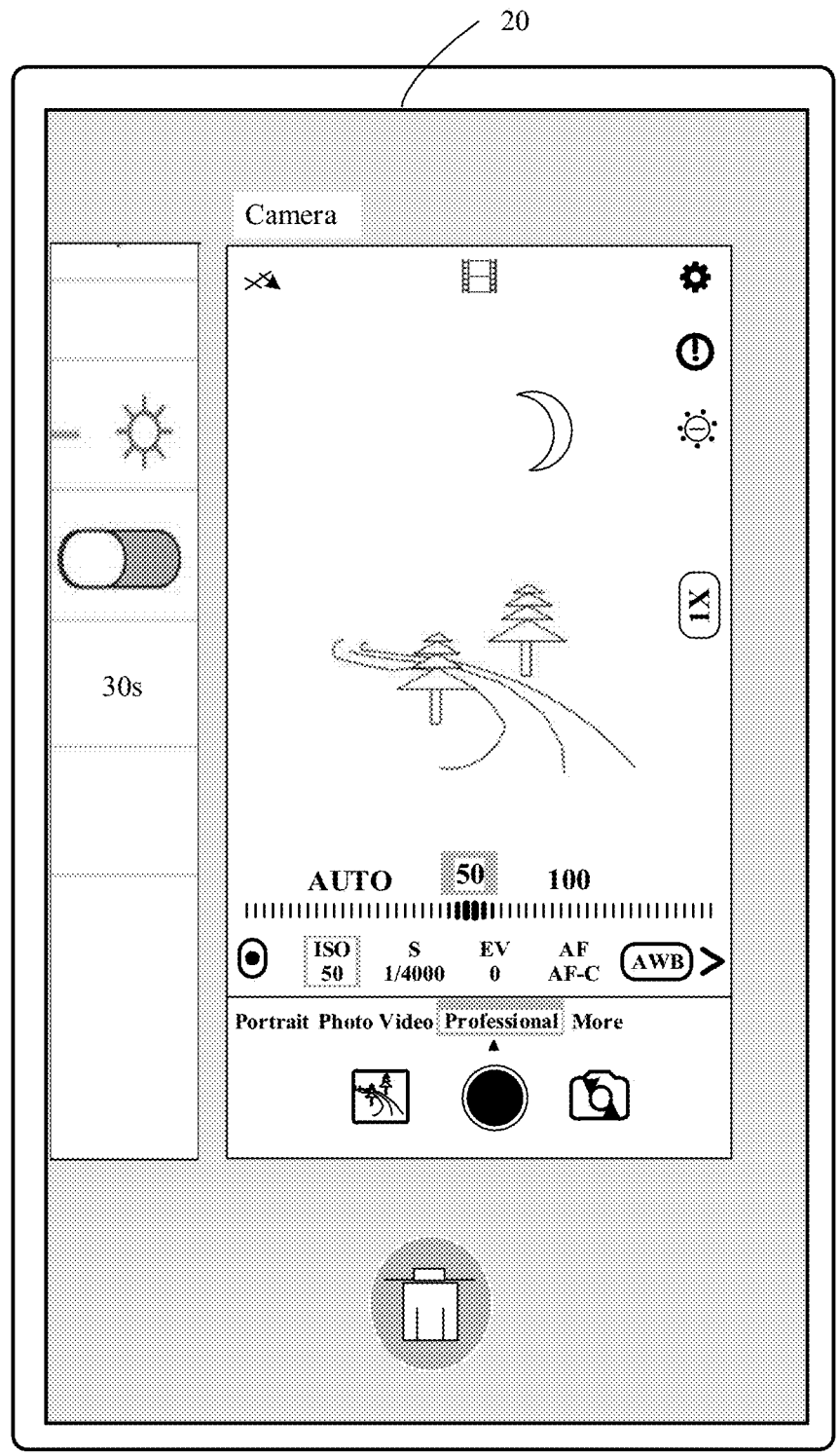
FIG. 11A and FIG. 11B are a schematic diagram of some user interfaces according to an embodiment of this application.
Figure 11B:
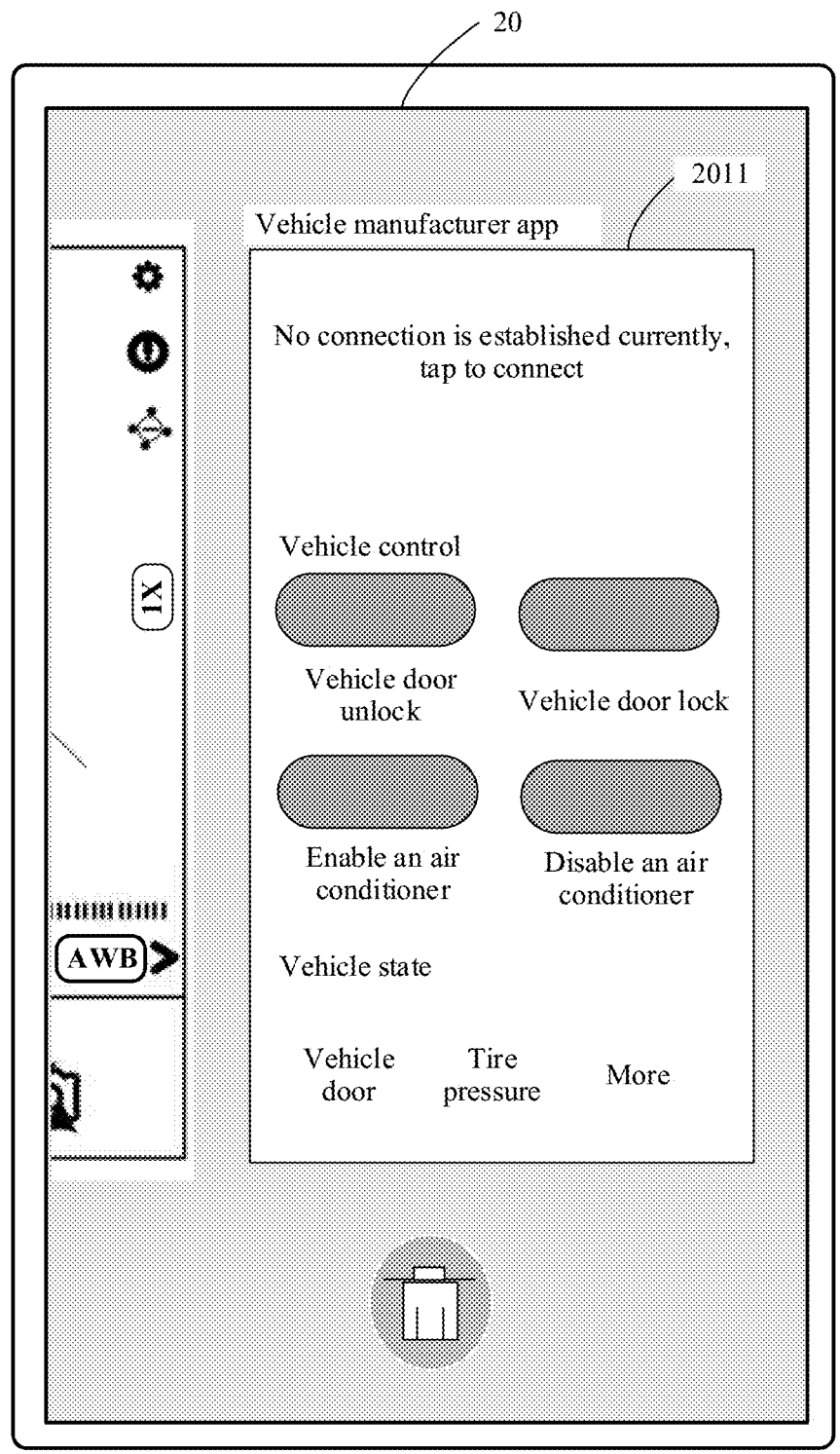

In this embodiment of this application, when the vehicle manufacturer app 102 is closed, for example, cleared by the system, a recently opened application interface of the electronic device 10 does not include the user interface of the vehicle manufacturer app 102. When obtaining, through scanning, the Bluetooth advertising signal sent by the vehicle head unit 20, the electronic device 10 may start the vehicle manufacturer app 102 when the vehicle manufacturer app 102 is closed, and a recently opened application interface of the electronic device 10 includes the user interface of the vehicle manufacturer app 102. FIG. 11A and FIG. 11B are a schematic diagram of some user interfaces according to this embodiment of this application. As shown in FIG. 11A, when the vehicle manufacturer app 102 is cleared by the system, a recently opened application interface 20 does not include the user interface of the vehicle manufacturer app 102. The recently opened application interface 20 may include an interface of an application recently running in a foreground of the electronic device 10. For example, as shown in FIG. 11A, the recently opened application interface 20 may include a user interface of a camera application. In addition, in response to a touch sliding operation performed in the recently opened application interface 20, the electronic device 10 may display user interfaces of more applications in the recently opened application interface 20.

When obtaining, through scanning, the Bluetooth advertising signal sent by the vehicle head unit 20, the electronic device 10 may start the vehicle manufacturer app 102 when the vehicle manufacturer app 102 is closed. After the vehicle manufacturer app 102 is started, as shown in FIG. 11B, the recently opened application interface of the electronic device 10 may include a user interface 2011 of the vehicle manufacturer app 102.

As shown in FIG. 11B, the user interface 2011 of the vehicle manufacturer app 102 may include a plurality of controls for controlling the vehicle. For example, the user interface 2011 includes a control for unlocking a vehicle door, a control for locking a vehicle door, a control for enabling an air conditioner, a control for disabling an air conditioner, and the like. The user interface 2011 may further include a plurality of controls for viewing vehicle states. For example, the user interface 2011 includes a control for viewing a vehicle door state, a control for viewing a tire pressure state, and the like. When the Bluetooth connection to the vehicle head unit is not established, the user interface 2011 of the vehicle manufacturer app 102 may further include a control for connecting to the vehicle head unit 20, and there is a message indicating that "No connection is established currently, tap to connect". When the Bluetooth connection to the vehicle head unit is established, the user interface 2011 of the vehicle manufacturer app 102 may further include a control for disconnecting the Bluetooth connection to the vehicle head unit conjunction, and there is a message indicating that "Connection is established currently, tap to disconnect". The control for disconnecting the Bluetooth connection to the vehicle head unit is the first control. In response to the user operation performed on the first control, the electronic device 10 may disconnect the Bluetooth connection to the second electronic device, and skip scanning the Bluetooth advertising signal.

Figure 12A:
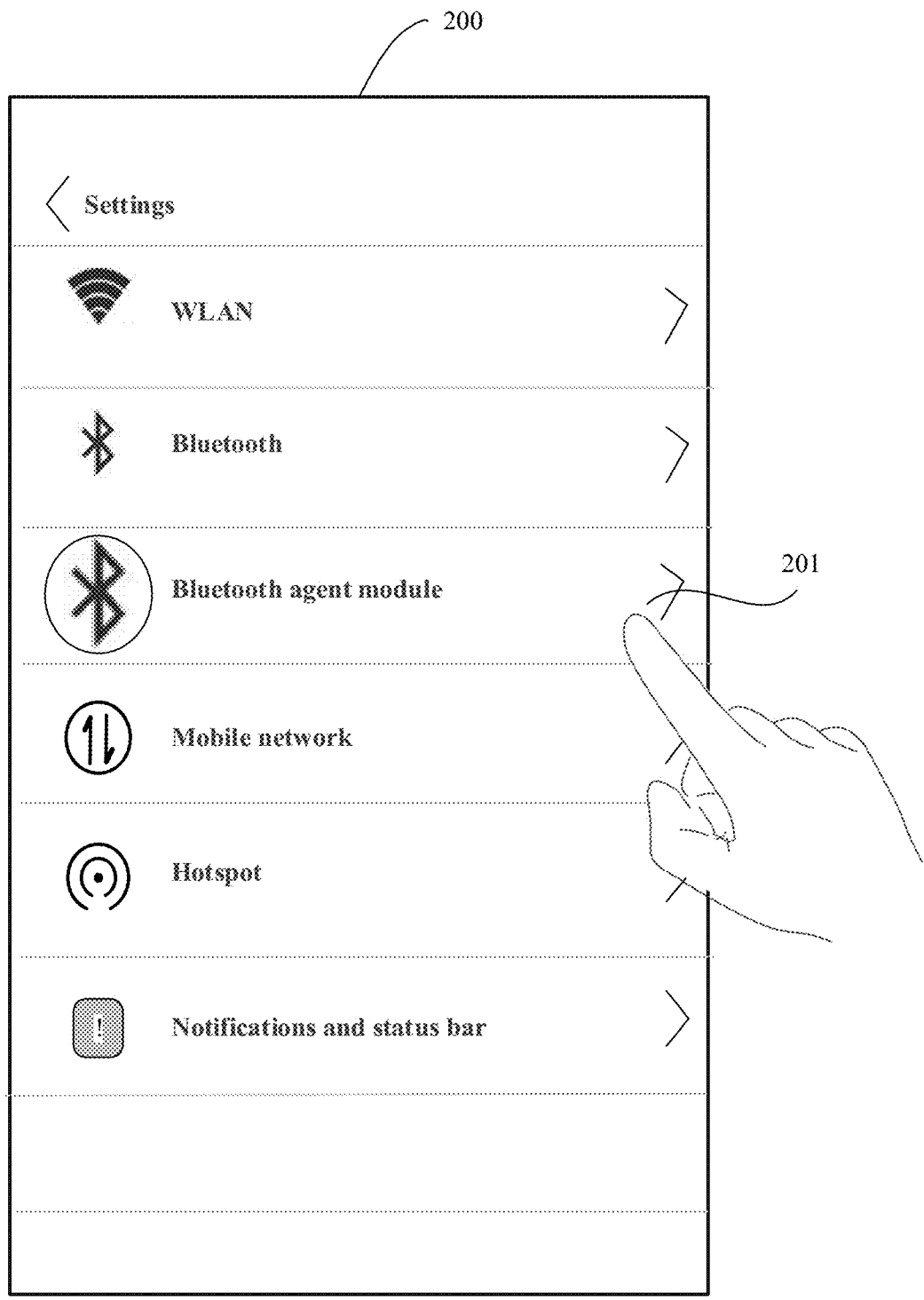
FIG. 12A and FIG. 12B are a schematic diagram of some user interfaces according to an embodiment of this application.
Figure 12B:
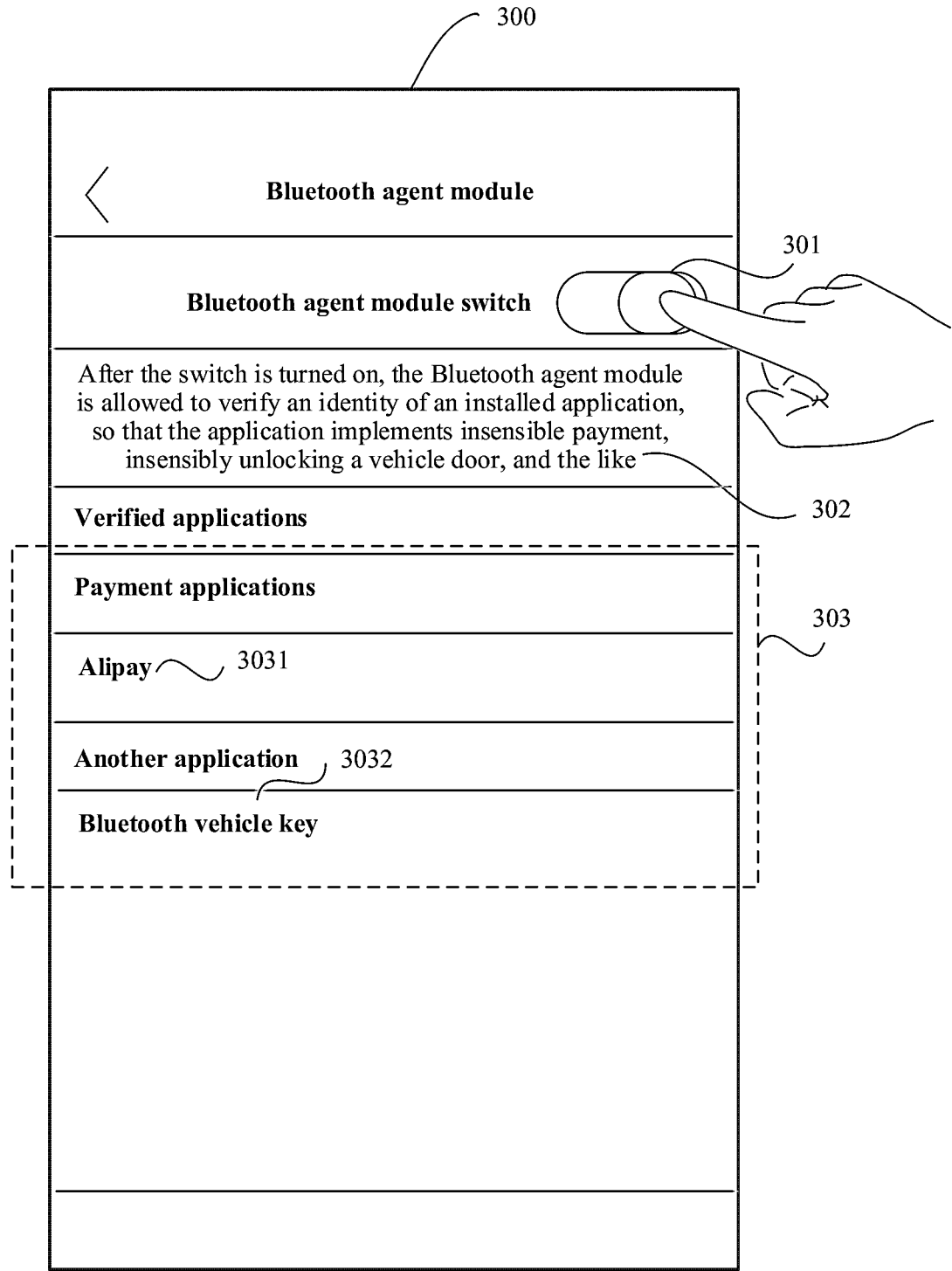

In some possible implementations, a setting interface of the electronic device 10 may include a setting entry of the Bluetooth agent module. As shown in FIG. 12A, a setting interface 200 includes a setting entry 201 of the Bluetooth agent module. In response to a user operation performed by the user on the setting entry 201 of the Bluetooth agent module, for example, a tapping operation, the electronic device 10 displays a Bluetooth agent module setting interface 300. As shown in FIG. 12B, the Bluetooth agent module setting interface 300 includes a Bluetooth agent module switch 301, a switch indication 302, and a list 303 of registered applications.

In response to a tap operation performed by the user on the Bluetooth agent module switch 301, the process in which the wallet application verifies the registration information in the registration process is triggered, namely, steps S202 to S204 are performed.

The switch indication 302 may indicate a function of the Bluetooth agent module switch 301: After the switch is turned on, the Bluetooth agent module is allowed to verify an identity of an installed application, so that the application implements insensible payment, insensibly unlocking a vehicle, and the like.

The list 303 of registered applications may include an identifier of an application that is registered with the electronic device 10 through steps S201 to S204. For example, the list 303 of registered applications includes an Alipay identifier 3031 and a Bluetooth vehicle key identifier 3032. Optionally, application identifiers in the list 303 of registered applications may be classified based on an application category for display, for example, classified as a payment application and another application.

Figure 13:
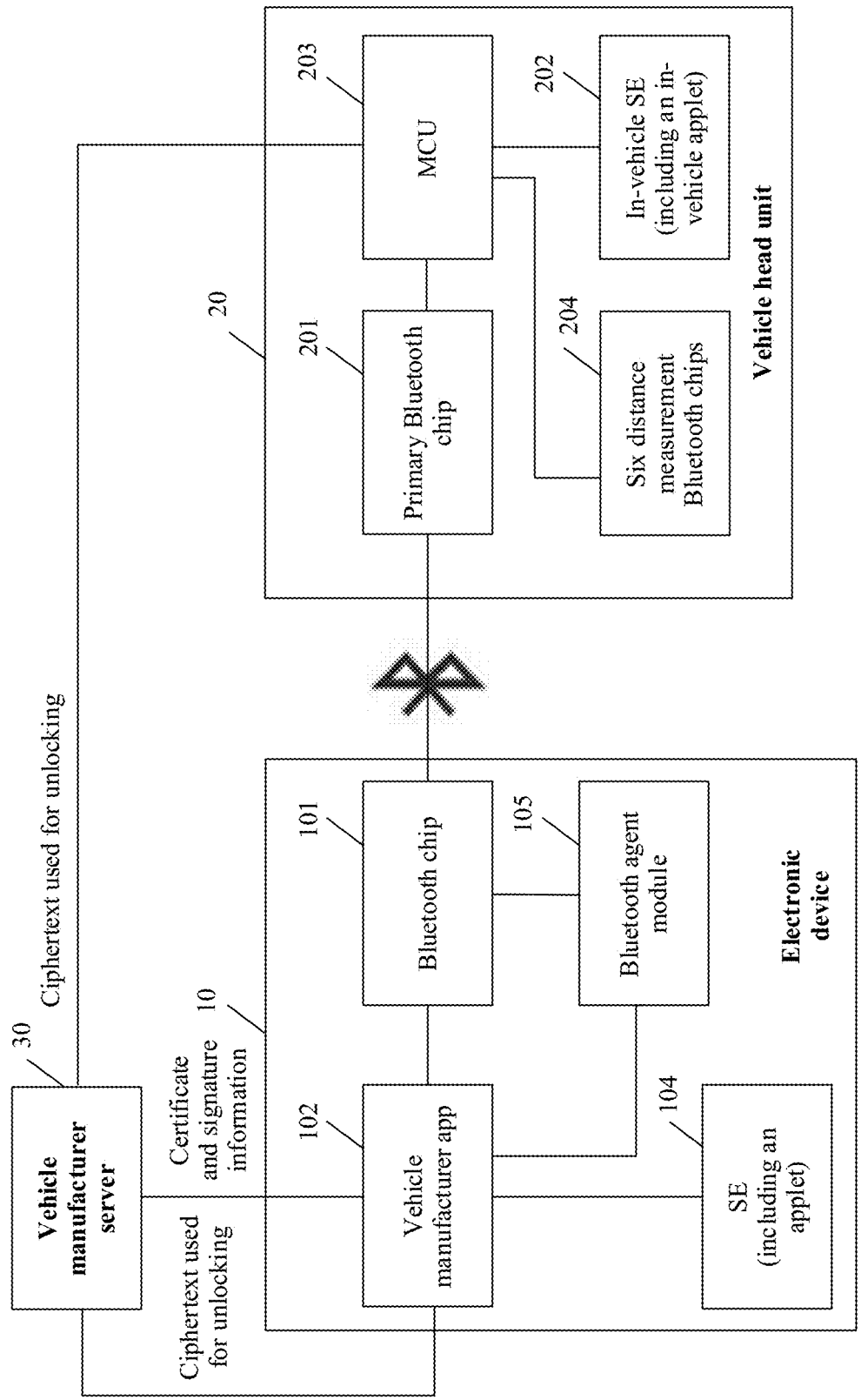
FIG. 13 is a schematic diagram of a structure of a Bluetooth system according to an embodiment of this application.

In this embodiment of this application, a function of the wallet app 106 may be implemented by the Bluetooth agent module 105. That is, the Bluetooth system may no longer include the wallet app 106, and the Bluetooth agent module 105 implements the function of the wallet app 106. FIG. 13 is a schematic diagram of a structure of the Bluetooth system according to this embodiment of this application.

Verifying whether the registration information of the vehicle manufacturer app 102 is valid may be performed by the Bluetooth agent module 105 based on the certificate, the signature information, and the like from the wallet server. Specifically, in the process of insensibly unlocking the vehicle, the Bluetooth agent module 105 in step S310 in the example shown in FIG. 8B may not need to send the third notification, but verifies, based on the first MAC address, whether the registration information of the vehicle manufacturer app 102 is valid. In addition, the Bluetooth agent module 105 may start the vehicle manufacturer app 102 in step S311. A similar case lies in the registration process. The vehicle manufacturer app 102 sends the registration information to the Bluetooth agent module 105, and the Bluetooth agent module 105 verifies whether the registration information is valid.

In the system architecture shown in FIG. 13, the vehicle manufacturer app 102 may establish the connection to the SE 104. In the process of checking the ciphertext used for unlocking, the vehicle manufacturer app 102 may extract the first ciphertext from the SE, and send the first ciphertext to the MCU 203 of the vehicle head unit 20 through the Bluetooth connection between the Bluetooth chip 101 and the primary Bluetooth chip 201. The Bluetooth agent module 105 may communicate with the wallet server to obtain the certificate, the signature information, and the like. The Bluetooth agent module 105 is configured to verify, based on the certificate, the signature information, and the like, whether the vehicle manufacturer app 102 is valid.

For descriptions of the vehicle manufacturer app 102, the SE 104, the vehicle manufacturer server 30, and the Bluetooth chip 101 in this embodiment of this application, refer to the descriptions in FIG. 6 and the examples described in FIG. 7 to FIG. 9B. Details are not described herein again.

This embodiment of this application is not limited to being applied to the function of insensibly unlocking the vehicle, and may be applied to another scenario. For example, the application may be a payment application in an insensible payment scenario. When a connection to a payment terminal (for example, a payment device similar to the vehicle head unit 20) is disconnected, if the payment application on the electronic device 10 is cleared by a system, the electronic device 10 may enable the Bluetooth scanning function. When being close to the payment device, the electronic device 10 may obtain, through scanning, a Bluetooth advertising signal sent by the payment terminal. The electronic device 10 may start the payment application when the payment application is cleared by the system. The payment application on the electronic device 10 may send service information related to the payment device to a corresponding server, to complete a subsequent payment process. This implements insensible payment. For details about the insensible payment scenario, refer to the following description.

For another example, the application may alternatively be a weight scale application in a scenario in which weight data is automatically uploaded to the electronic device 10. When a connection to a weight scale (similar to the vehicle head unit 20) is disconnected, if the weight scale application on the electronic device 10 is cleared by a system, the electronic device 10 may enable the Bluetooth scanning function. The weight scale can advertise a Bluetooth advertising signal. When being close to the weight scale, the electronic device 10 may obtain, through scanning, the Bluetooth advertising signal sent by the weight scale. The electronic device 10 may start the weight scale application when the weight scale application is closed, and reconnect to the weight scale. The weight scale can transmit the weight data to the weight scale application through the Bluetooth connection. In this way, the weight data is insensibly uploaded to the electronic device 10. For details about the scenario in which the weight data is uploaded insensibly, refer to the following description.

This embodiment of this application is not limited to being applied to the foregoing scenario examples, and may be applied to scenarios such as unlocking a door lock and synchronizing data of a smart band to the electronic device 20. A specific application scenario is not limited in this embodiment of this application.

Figure 14:
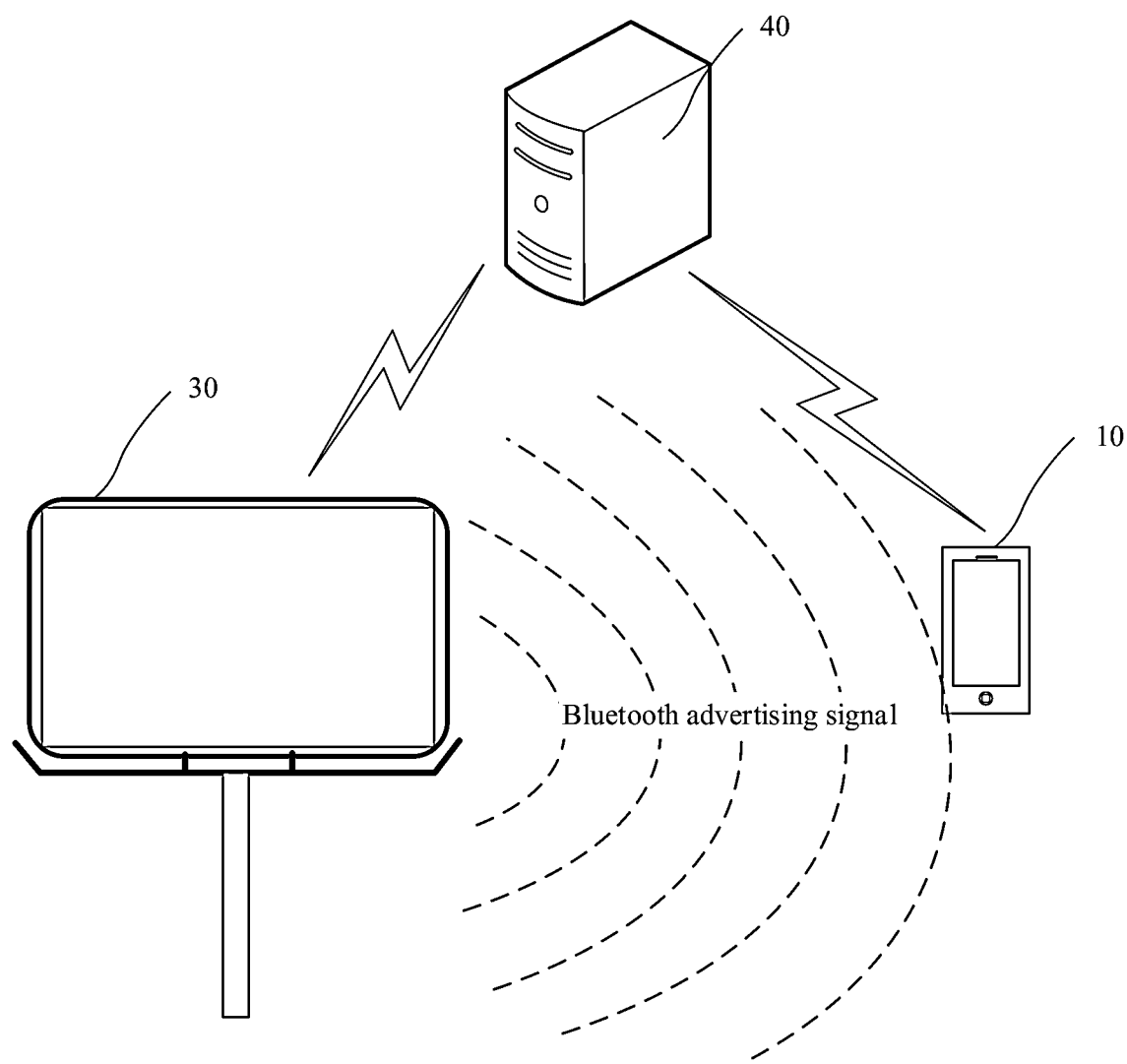
FIG. 14 is a schematic diagram of an architecture of a Bluetooth system according to an embodiment of this application.

The following describes the insensible payment scenario in embodiments of this application. FIG. 14 is a schematic diagram of an architecture of a Bluetooth system according to an embodiment of this application. As shown in FIG. 14, the Bluetooth system includes an electronic device 10, a Bluetooth device 30 (for example, a payment device 30), and a server 40.

The electronic device 10 may establish a communication connection to the server 40, and the payment device 30 may establish a communication connection to the server 40. The payment device 30 may advertise a Bluetooth advertising signal. When a user carrying the electronic device 10 is close to the payment device 30, the electronic device 10 may receive the Bluetooth advertising signal. An app corresponding to the payment device 30 may be installed on the electronic device 10. For example, if the app is WeChat, the server 40 is a WeChat server. When payment is required, the user faces the payment device 30, and the payment device 30 collects a facial image, and uploads the facial image to the server 40. The server 40 may complete facial verification of the user, and automatically complete a payment service process. In the foregoing facial payment process, insensible payment may be implemented without the user manually operating the app on the electronic device 10.

Figure 15:
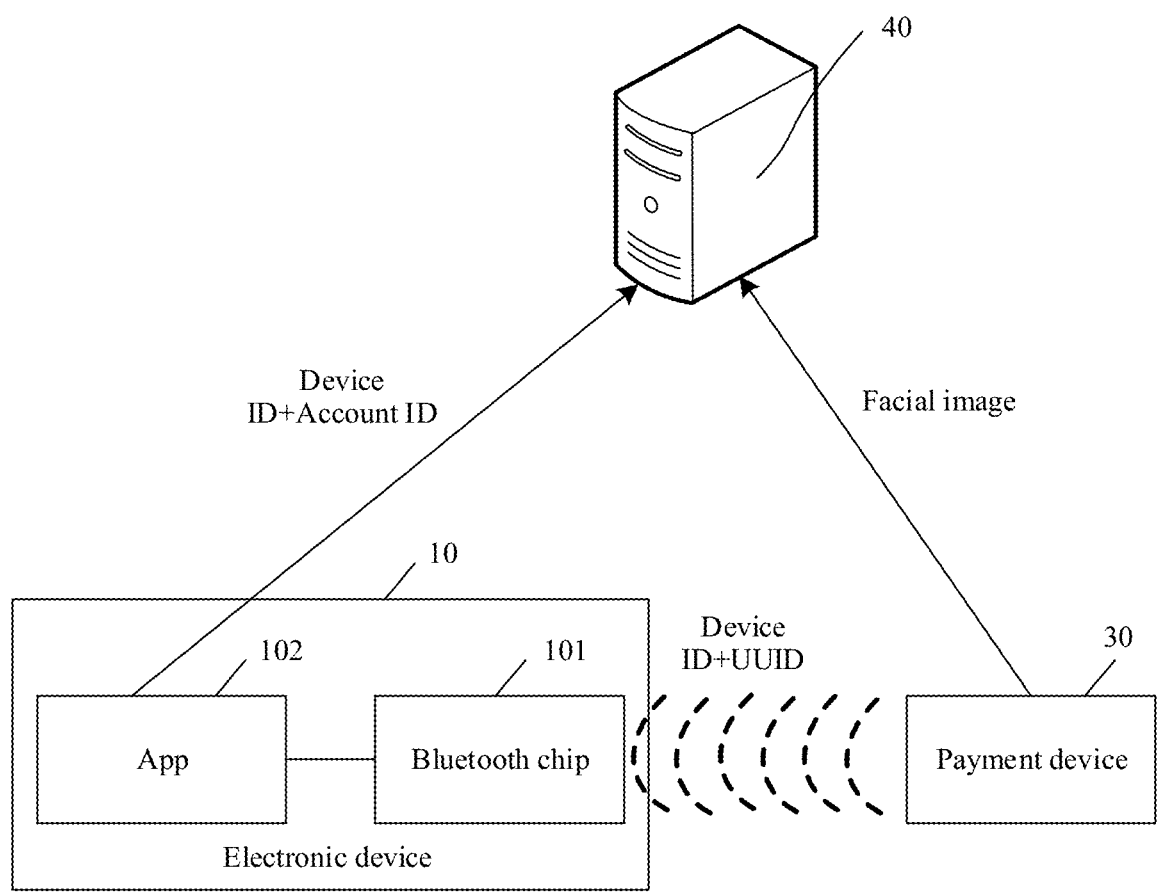
FIG. 15 is a schematic diagram of an architecture of a Bluetooth system according to an embodiment of this application.

The following describes the insensible payment process in the scenario shown in FIG. 14 with reference to structures of the electronic device 10 and the payment device 30. FIG. 15 is a schematic diagram of an architecture of the Bluetooth system according to this embodiment of this application. As shown in FIG. 15, the electronic device 10 includes the Bluetooth chip 101 and the app 102. The Bluetooth chip 101 is connected to the app 102. The payment device 30 may continuously advertise the Bluetooth advertising signal.

Figure 16:
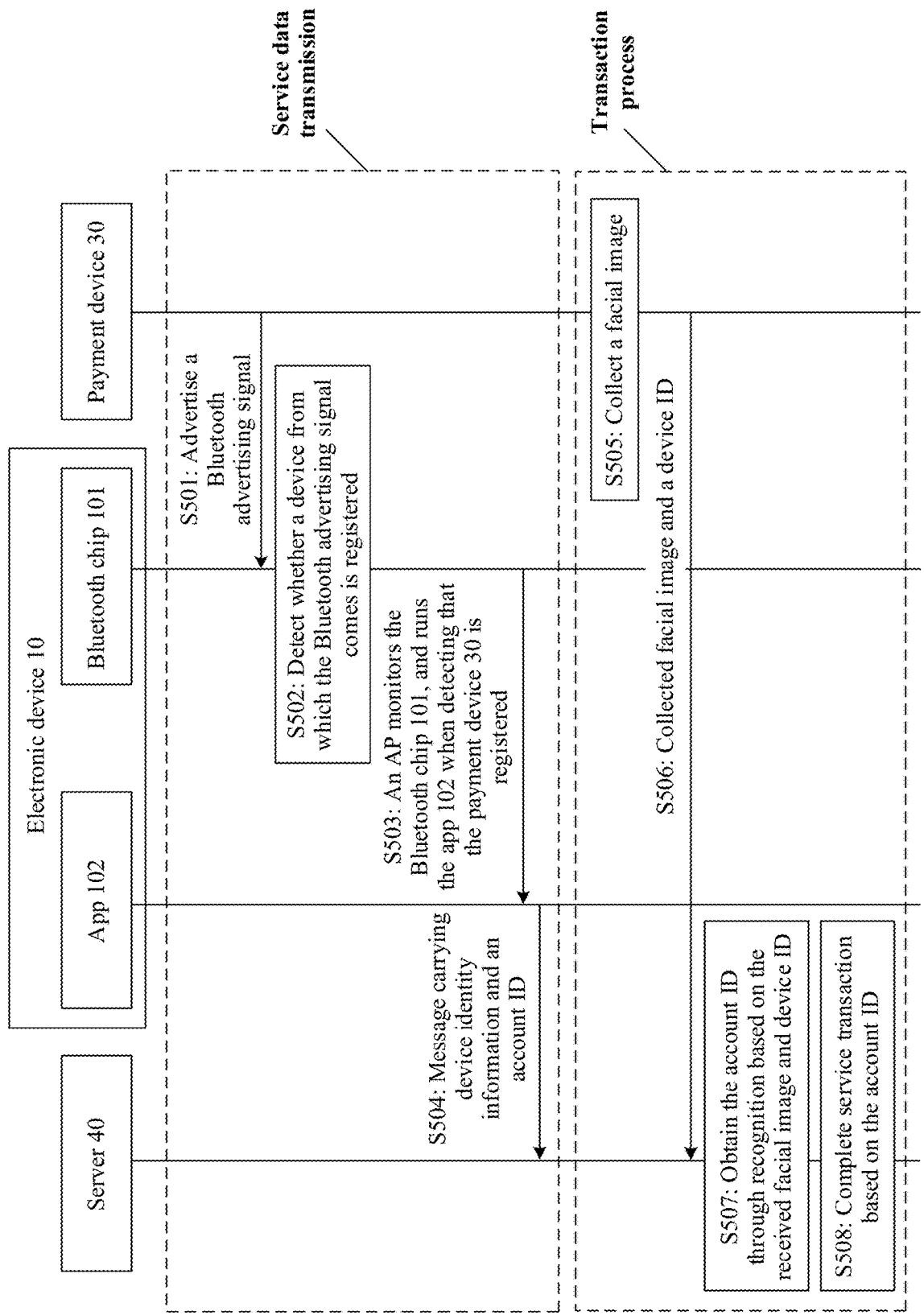
FIG. 16 is a schematic flowchart of a service transaction method according to an embodiment of this application.

FIG. 16 is a schematic flowchart of a service transaction method according to this embodiment of this application. As shown in FIG. 16, on the basis of the system architectures described in FIG. 14 and FIG. 15, the service transaction method includes steps S501 to S508.

S501: The payment device 30 advertises the Bluetooth advertising signal.

The Bluetooth advertising signal carries device identity information and device identifier information (for example, a UUID). For example, the device identity information may include a device ID. The device ID may uniquely identify the payment device 30. The UUID may identify a payment device that can connect the app 102 and the server 40. For example, for an Alipay application, payment devices that can connect the Alipay application and an Alipay server have a same UUID, and the UUID may be stored in the Bluetooth chip 101. Alternatively, a UUID of a payment device that can connect the Alipay application to the Alipay server is one of several UUIDs. The several UUIDs may be stored in the Bluetooth chip 101.

S502: The Bluetooth chip 101 receives the Bluetooth advertising signal from the payment device 30, and detects whether a device (the payment device 30) from which the Bluetooth advertising signal comes is registered with the electronic device 10.

For the Bluetooth scanning (to be specific, detecting whether the device from which the Bluetooth advertising signal comes is registered with the electronic device 10), refer to the specific description in the example described in FIG. 2. Details are not described herein again. The Bluetooth chip 101 may support a BLE connection, and may also support a BR/EDR connection. The Bluetooth chip 101 can perform step S502 only when the Bluetooth scanning switch on the electronic device 10 is turned on.

S503: An application processor of the electronic device 10 monitors the Bluetooth chip 101, and runs the app 102 when detecting that the device (the payment device 30) from which the Bluetooth advertising signal comes is registered with the electronic device 10.

After detecting that the device from which the Bluetooth advertising signal comes is registered, the application processor may detect whether the app 102 is run. If the app 102 is not run, step S504 is performed to run the app 102. For a system with a release later than Android 8.0, the AP of the electronic device 10 may automatically run the app 102 through step S503.

S504: The app 102 sends a message carrying the device identity information and an account ID to the server 40.

The app may send the message carrying the device ID and the account ID to the server 40. The device ID may be obtained by the Bluetooth chip 101 from the Bluetooth advertising signal and sent to the app 102. The server 40 may obtain one or more account IDs that can receive the Bluetooth advertising signal from the payment device 30. For example, there are currently 10 electronic devices near the payment device 30, an Alipay application is installed on each of the 10 electronic devices, and an insensible payment service is enabled. Each of the Alipay applications on the 10 electronic devices has an Alipay account ID (for example, an Alipay account). For each of the 10 electronic devices, service information (for example, device identity information) from an external Bluetooth device 51 may be transmitted to the app 102 through steps S501 to S504, and the app 102 transmits the service information to the server 40. The server 40 may obtain the Alipay account ID on each of the 10 electronic devices. In steps S505 to S508, facial comparison is performed to determine which Alipay account ID to execute the transaction process.

S505: The payment device 30 collects the facial image.

S506: The payment device 30 sends the collected facial image and the device ID to the server 40.

The device ID is in a one-to-one correspondence with the payment device 30.

S507: The server 40 obtains the account ID through recognition based on the received facial image and device ID.

After receiving the facial image and the device ID, the server 40 may determine, based on the device ID, an account ID of the uploaded service information (for example, the device identity information). For example, in the foregoing example, the server 40 may determine 10 Alipay account IDs based on device IDs to upload service information (for example, device identity information) to the server 40 through the payment device 30. The server 40 may obtain a facial image corresponding to each of the 10 Alipay account IDs. Then, the facial image received from the payment device 30 is compared with the 10 facial images, to obtain an Alipay account ID corresponding to the received facial image.

The server 40 may store an account ID and a corresponding facial image, and the facial image may be pre-stored by the user. The facial image corresponding to the account may alternatively be obtained by the server 40 from another device (for example, the electronic device 10). This is not limited in this embodiment of this application.

S508: The server 40 completes service transaction based on the account ID.

The server 40 may use the account ID obtained in step S507 as a deduction account to complete the service transaction.

In the foregoing process of insensible payment, in step S502, the application processor of the electronic device 10 needs to always be in a working state in a Bluetooth scanning process, to monitor whether a device from which a Bluetooth advertising signal comes is registered with the electronic device 10. This increases power consumption and memory usage of the electronic device 10. In addition, the Bluetooth scanning switch, of the electronic device 10, that is used to enable Bluetooth scanning is turned off by default. As a result, the Bluetooth scanning is affected, and convenience of the payment process is reduced.

Figure 17:
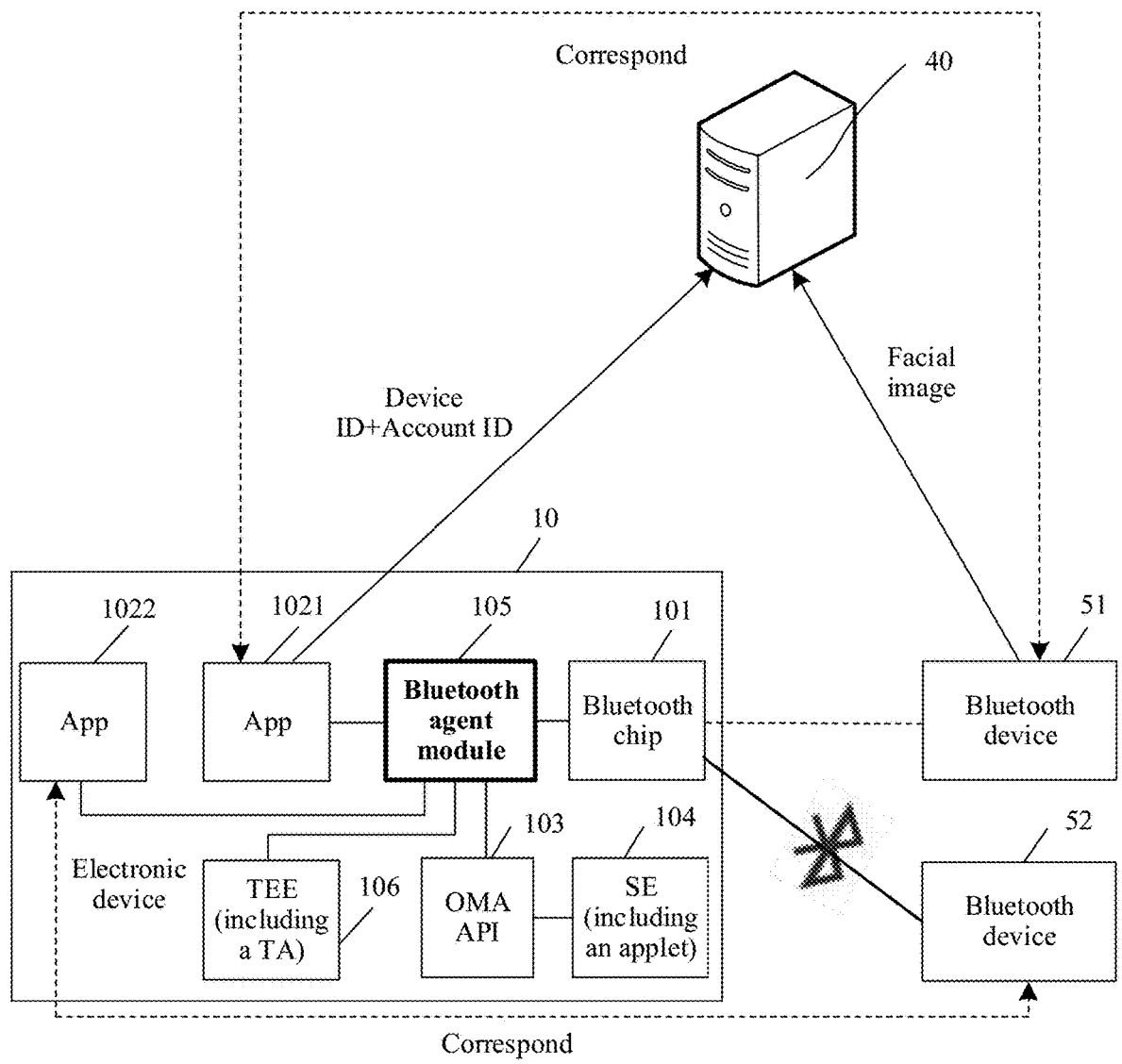
FIG. 17 is a schematic diagram of an architecture of a Bluetooth system according to an embodiment of this application.

An embodiment of this application provides a service execution method, to improve convenience of a service execution process, and reduce power consumption and memory usage of the electronic device 10. The service execution may include an insensible vehicle unlocking service and an insensible payment service. The electronic device 10 in the service execution method includes a Bluetooth agent module. FIG. 17 is a schematic diagram of an architecture of a Bluetooth system according to this embodiment of this application. As shown in FIG. 17, the Bluetooth system includes the electronic device 10, a Bluetooth device 50 (for example, a vehicle, or a payment device), and the server 40. The Bluetooth device 50 includes, for example, a Bluetooth device 51 and a Bluetooth device 52.

Modules related to the insensible payment service include the Bluetooth device 51, the Bluetooth chip 101, the Bluetooth agent module 105, an app 1021, and the server 40. Modules involved in the service in which the vehicle is insensibly unlocked include the Bluetooth device 52, the Bluetooth chip 101, the Bluetooth agent module 105, an app 1022, an OMA API 103, and the SE 104.

As shown in FIG. 17, the electronic device 10 includes the Bluetooth chip 101, an app 102, the OMA API 103, the SE 104, the Bluetooth agent module 105, a TEE 106, the app 1021, and the app 1022. The app 1021 and the app 1022 may be different service applications (for example, one is a payment application and the other is an application associated with the vehicle 20). Each of the app 1021 and the app 1022 corresponds to a Bluetooth device. For example, the app 1021 corresponds to the Bluetooth device 51, and the app 1022 corresponds to the Bluetooth device 52.

In this embodiment of this application, an application on which permission verification is performed during installation and an application participating in a service execution process may be the same app or different apps. If the apps are different, the app participating in the service execution process is connected to the server 40 and the Bluetooth agent module.

There may be a plurality of Bluetooth devices corresponding to the app 1021. Device identifier information of a Bluetooth device is stored in the Bluetooth agent module 105 and the Bluetooth chip 101, and the Bluetooth device corresponds to one app on the electronic device 10. There may also be a plurality of Bluetooth devices corresponding to the app 1022. For example, an Alipay application may correspond to a plurality of payment devices, and the service execution process may be completed on the plurality of payment devices.

Descriptions are provided in this embodiment of this application by using an example in which the app 1021 is a payment application and the Bluetooth device 51 is a payment device corresponding to the app 1021, and the app 1022 is a vehicle application (namely, a vehicle manufacturer app) and the Bluetooth device 52 is a vehicle corresponding to the app 1022.

The Bluetooth agent module 105 is connected to the app 1022. The Bluetooth agent module 105 is further connected to the TEE 106, and the Bluetooth agent module 105 is further connected to the SE 104 through the OMA API 103.

In the vehicle unlocking scenario, the Bluetooth agent module 105 is started when the Bluetooth chip 101 detects that a device from which a Bluetooth advertising signal comes is registered with the electronic device 10. The Bluetooth agent module 105 may establish a channel to an external Bluetooth device, and the Bluetooth agent module 105 is connected to the SE 104, so that service information (for example, a ciphertext) in the SE 104 may be transmitted to the external Bluetooth device (for example, a vehicle). The Bluetooth agent module 105 is further connected to the TEE 106, so that service information (for example, a ciphertext) in the TEE 106 may also be transmitted to the external Bluetooth device (for example, the vehicle).

In the payment scenario, the Bluetooth chip 101 is connected to the Bluetooth agent module 105, the Bluetooth agent module 105 is connected to the app 1021, and the app 1021 establishes a communication connection to the server 40. The Bluetooth device 51 establishes a communication connection to the server 40. In this service method, when the Bluetooth chip 101 obtains a first device identifier in device identifiers through scanning, the Bluetooth chip 101 notifies the Bluetooth agent module 105. The Bluetooth agent module 105 may wake up the app 1021, and service information (for example, a device ID of the Bluetooth device 51) from the external Bluetooth device 51 may be transmitted to the app 1021. The app 1021 establishes the communication connection to the server 40, so that the service information (for example, the device ID of the Bluetooth device 51) from the external Bluetooth device 51 is transmitted to the server 40. The server 40 may complete a service based on the service information transmitted from the app 1021 and user information (for example a facial image) collected from the Bluetooth device 51. A device identifier stored in the Bluetooth chip 101 is a device identifier corresponding to an application on which verification succeeds. In other words, verification on an application, corresponding to the first device identifier, on the electronic device 10 succeeds.

The Bluetooth agent module 105 is started only when the Bluetooth chip 101 obtains the first device identifier in the device identifiers through scanning. The Bluetooth agent module 105 and the application processor of the electronic device 10 do not need to be always in a working state, and this reduces power consumption and memory usage of the electronic device 10.

In this embodiment of this application, the Bluetooth agent module may run the app, and the user does not need to manually run the app. In this way, the execution process is insensible to the user, and convenience of the service execution process is improved.

In this embodiment of this application, the Bluetooth agent module 105 may run the app 1021, but the app 1021 does not need to be always run on the electronic device 10, and the app 1021 may be stopped running by the application processor. This further reduces power consumption and memory usage of the electronic device 10.

In this embodiment of this application, the Bluetooth agent module 105 further provides a Bluetooth scanning management platform for a Bluetooth-related service execution process.

The Bluetooth agent module 105 may be connected to the SE 104, and directly establishes a Bluetooth channel between the Bluetooth chip 101 and a Bluetooth device 60 without running the app 1022. This further reduces power consumption and memory usage of the electronic device 10.

Optionally, the app 1022 may be connected to the TEE 106. The Bluetooth agent module 105 may wake up the app 1022. The app 1022 may obtain the service information (for example, the ciphertext) from the TEE 106 and transmit the service information to the Bluetooth agent module 105. The Bluetooth agent module 105 establishes the channel to the external Bluetooth device, and sends the service information to the external Bluetooth device (for example, the vehicle). The external Bluetooth device may execute a corresponding service, for example, unlock a vehicle, based on the service information.

Optionally, the app 1022 may be connected to the SE 104 through the OMA API. The Bluetooth agent module 105 may wake up the app 1022, and the app 1022 may obtain the service information (for example, the ciphertext) from the SE 104 and transmit the service information to the Bluetooth agent module 105. The Bluetooth agent module 105 establishes the channel to the external Bluetooth device (for example, the vehicle), and sends the service information to the external Bluetooth device (for example, the vehicle). The external Bluetooth device may execute a corresponding service, for example, unlock the vehicle, based on the service information.

Descriptions are provided below by using an example in which the service execution process is an insensible facial payment process. The Bluetooth device 50 may be the payment device 30. It may be understood that in this embodiment of this application, the scenario of insensible facial payment is used as an example for description, and another service scenario may alternatively be used. This is not limited in this embodiment of this application.

Figure 18:
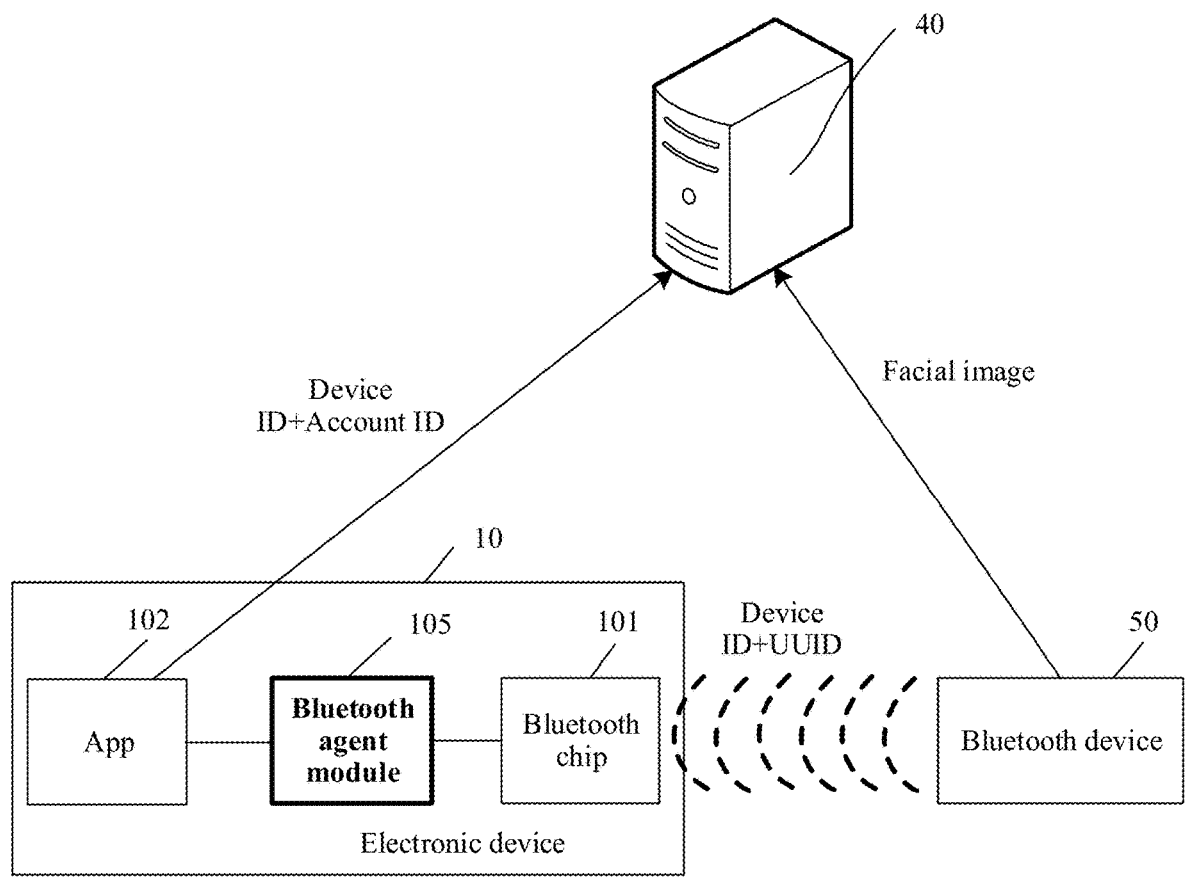
FIG. 18 is a schematic diagram of an architecture of a Bluetooth system according to an embodiment of this application.

FIG. 18 is a schematic diagram of an architecture of a Bluetooth system according to an embodiment of this application. As shown in FIG. 18, the Bluetooth system includes an electronic device 10, a Bluetooth device 50 (for example, a payment device 30), and a server 40. As shown in FIG. 18, the electronic device 10 includes the Bluetooth chip 101, the Bluetooth agent module 105, and the app 102. The Bluetooth chip 101 establishes a connection to the Bluetooth agent module 105, and the Bluetooth agent module 105 establishes a connection to the app 102.

Before insensible facial payment is performed by using the system architecture, a user needs to install the app 102 on the electronic device 10, and the electronic device 10 completes a registration process. The following processes are separately described: (a) Registration process; (b) Transaction process; and (c) Deregistration process.

(a) Registration Process

Figure 19:
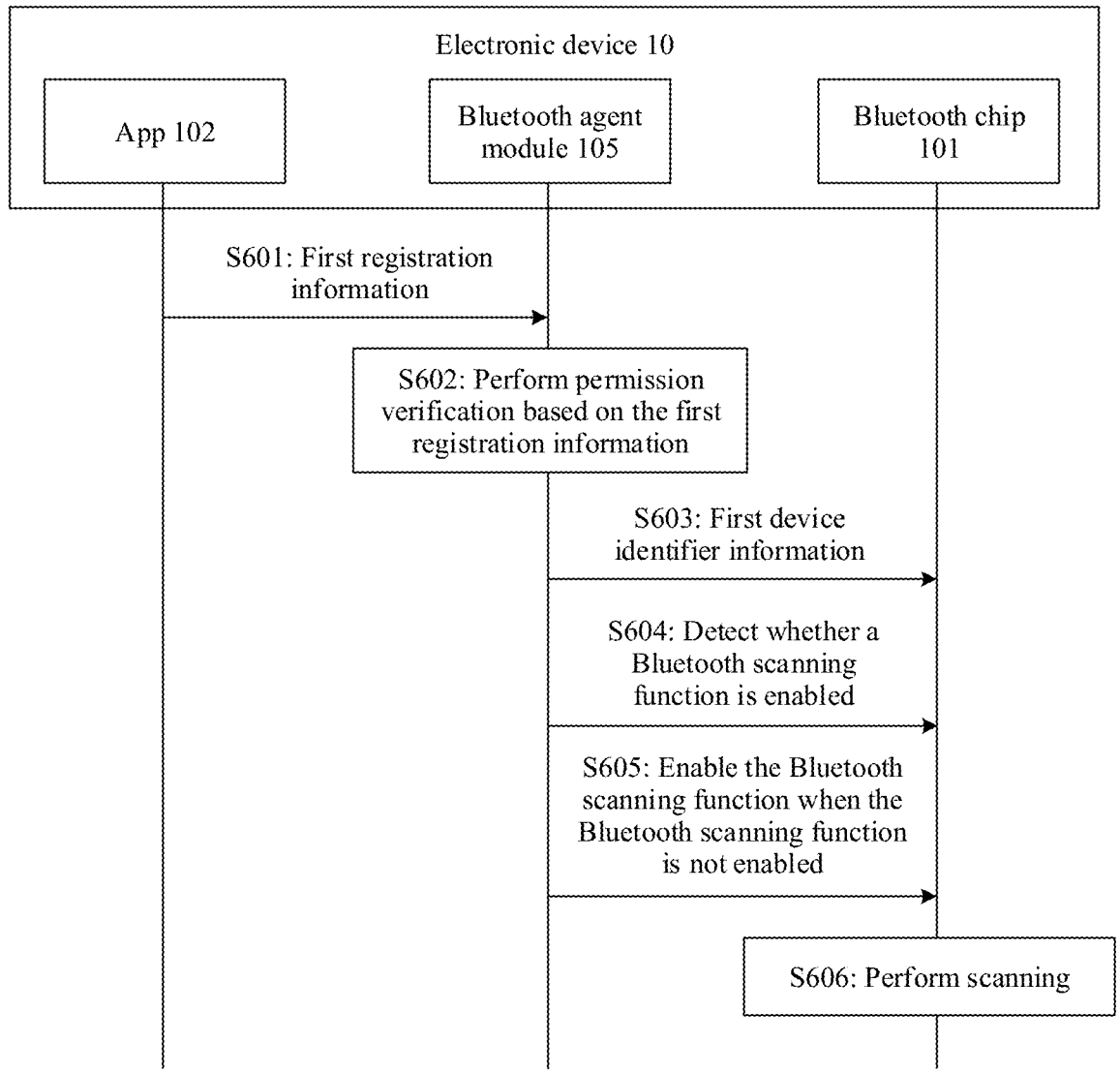
FIG. 19 is a schematic flowchart of a registration process of an app 102 according to an embodiment of this application.

The registration process is described below with reference to the system architecture shown in FIG. 18 and a process shown in FIG. 19. FIG. 19 is a schematic flowchart of the registration process of the app 102 according to this embodiment of this application. The registration process of the app 102 includes steps S201 to S206.

S601: When the app 102 is installed on the electronic device 10, the app 102 sends first registration information to the Bluetooth agent module 105.

The first registration information may include one or more of the following:

①APP_ID: an identifier (identification, ID) of the app 102 on which registration is performed.

②APP_AWAKE_ID: an ID used to wake up the app 102 after the Bluetooth chip 101 obtains first device identifier information through scanning.

③CORRESPONDENT_ID: an ID of a communicator during service information transmission.

For example, the ID of the communicator may be the ID of the app 102. In this case, the app 102 may be woken up when a Bluetooth advertising signal is obtained through scanning. For another example, the ID of the communicator may alternatively be a UUID of a TA. In this case, when a Bluetooth advertising signal is obtained through scanning, the app 102 may be woken up to establish a channel to an external Bluetooth device. For another example, the ID of the communicator may alternatively be an applet identifier (applet identification, AID). In this case, when a Bluetooth advertising signal is obtained through scanning, the app 102 may be woken up to establish a channel to an external Bluetooth device.

④The first device identifier information: identifier information of a Bluetooth device that the app 102 expects to scan, where for example, the identifier information includes but is not limited to a UUID of the external Bluetooth device.

In a possible implementation, the app 102 corresponds to one UUID list. The UUID list includes one or more UUIDs. For each UUID in the UUID list, the Bluetooth agent module 105 verifies a Bluetooth advertising signal advertised by an external Bluetooth device corresponding to the UUID.

⑤OPTION: an entity that receives service information, such as the app 102, a TA in the TEE 106, or the applet in the SE 104; and whether the Bluetooth chip 101 wakes up the app 102 after obtaining the first device identifier information through scanning.

S602: The Bluetooth agent module 105 performs permission verification on the app 102 based on the first registration information.

In a possible implementation, the Bluetooth agent module 105 may store APP_IDs of a plurality of apps, and the plurality of APP_IDs are approved by the Bluetooth agent module 105. The Bluetooth agent module 105 detects whether an APP JD in the first registration information is included in the stored plurality of APP_IDs. If the APP_ID in the first registration information is included in the stored plurality of APP_IDs, the permission verification succeeds, and step S603 is performed. If the APP_ID in the first registration information is not included in the stored plurality of APP_IDs, the permission verification fails, and the process ends.

It may be understood that the foregoing example of the permission verification process is merely used to explain this embodiment of this application, and should not constitute a limitation. The Bluetooth agent module 105 may alternatively have another permission verification method. This is not limited in this embodiment of this application.

In this embodiment of this application, the Bluetooth agent module 105 may be located at the application framework layer in the example shown in FIG. 5, and may be an application/interface at the application framework layer. The Bluetooth agent module 105 is not limited to being located at the application framework layer, and may be located at another layer.

S603: When the permission verification succeeds, the Bluetooth agent module 105 sends first device identifier information to the Bluetooth chip 101.

The Bluetooth chip 101 may store the device identifier information whose permission verification succeeds. For example, permission verification performed by the Bluetooth agent module 105 on an app 1 succeeds, and registration information of the app 1 includes a UUID 1, a UUID 2, a UUID 3, and a UUID 4. Permission verification performed by the Bluetooth agent module 105 on an app 2 succeeds, and registration information of the app 2 includes a UUID 5 and a UUID 6. The Bluetooth chip 101 may receive and store the UUID 1, the UUID 2, the UUID 3, the UUID 4, the UUID 5, and the UUID 6.

It may be understood that in this embodiment of this application, an example in which the device identifier information is a UUID is used for description. However, the device identifier information is not limited to the UUID, and may alternatively be other device information.

In a possible implementation, when the permission verification succeeds, the Bluetooth agent module 105 stores the first registration information of the app 102. The Bluetooth agent module 105 may find, by using the first registration information and a UUID that is obtained by the Bluetooth chip 101 through scanning, a corresponding app, TA, or applet.

S604: The Bluetooth agent module 105 detects whether a Bluetooth scanning function of the Bluetooth chip 101 is enabled.

When the Bluetooth scanning function of the Bluetooth chip 101 is enabled, the Bluetooth chip 101 may receive a Bluetooth advertising signal, and detect whether device identifier information carried in the Bluetooth advertising signal is stored on the Bluetooth chip 101. When the Bluetooth scanning function of the Bluetooth chip 101 is disabled, the Bluetooth chip 101 cannot receive a Bluetooth advertising signal.

S605: When detecting that the Bluetooth scanning function of the Bluetooth chip 101 is not enabled, the Bluetooth agent module 105 enables the Bluetooth scanning function.

For example, if the Bluetooth chip 101 is a BLE Bluetooth chip, EnableBLE may be invoked to enable the Bluetooth scanning function.

S606: The Bluetooth chip 101 performs scanning.

In the scanning process, the Bluetooth chip 101 may receive the Bluetooth advertising signal, and detect whether the UUID carried in the Bluetooth advertising signal is stored on the Bluetooth chip 101.

Through steps S601 to S606, registration of the app 102 on the electronic device 10 is completed. After the registration is completed, the electronic device 10 may log in to the app 102 by using an account in response to a user operation. For example, for an Alipay application, after registration is completed, the electronic device 10 may log in to the Alipay application by using an Alipay account in response to a user operation. The Alipay account may be an account ID of the Alipay application on the electronic device 10. In a process of logging in by using the account, for example, an account password corresponding to the account ID needs to be verified.

(b) Transaction Process

Figure 20A:
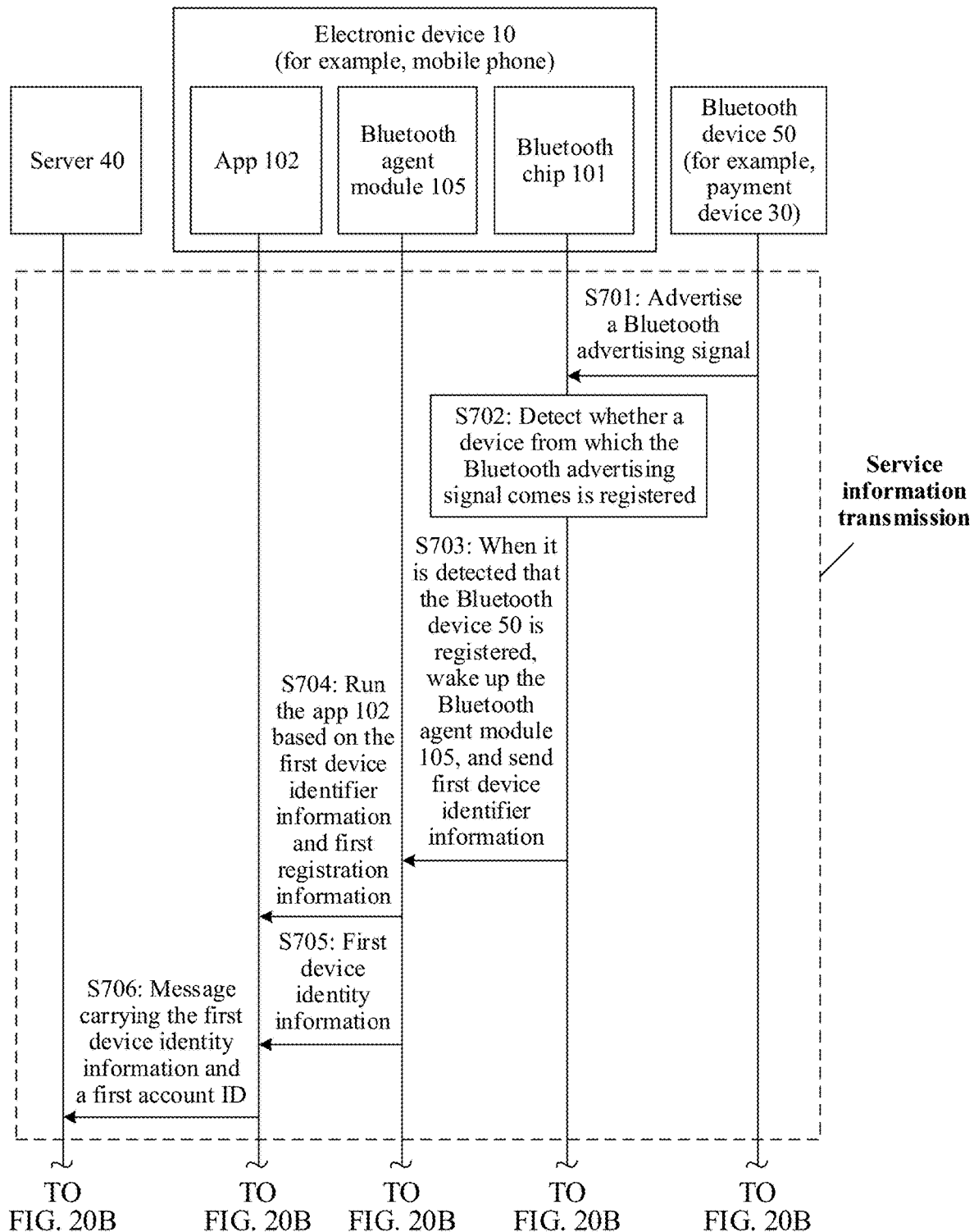
FIG. 20A and FIG. 20B are a schematic flowchart of a service transaction method according to an embodiment of this application.
Figure 20B:
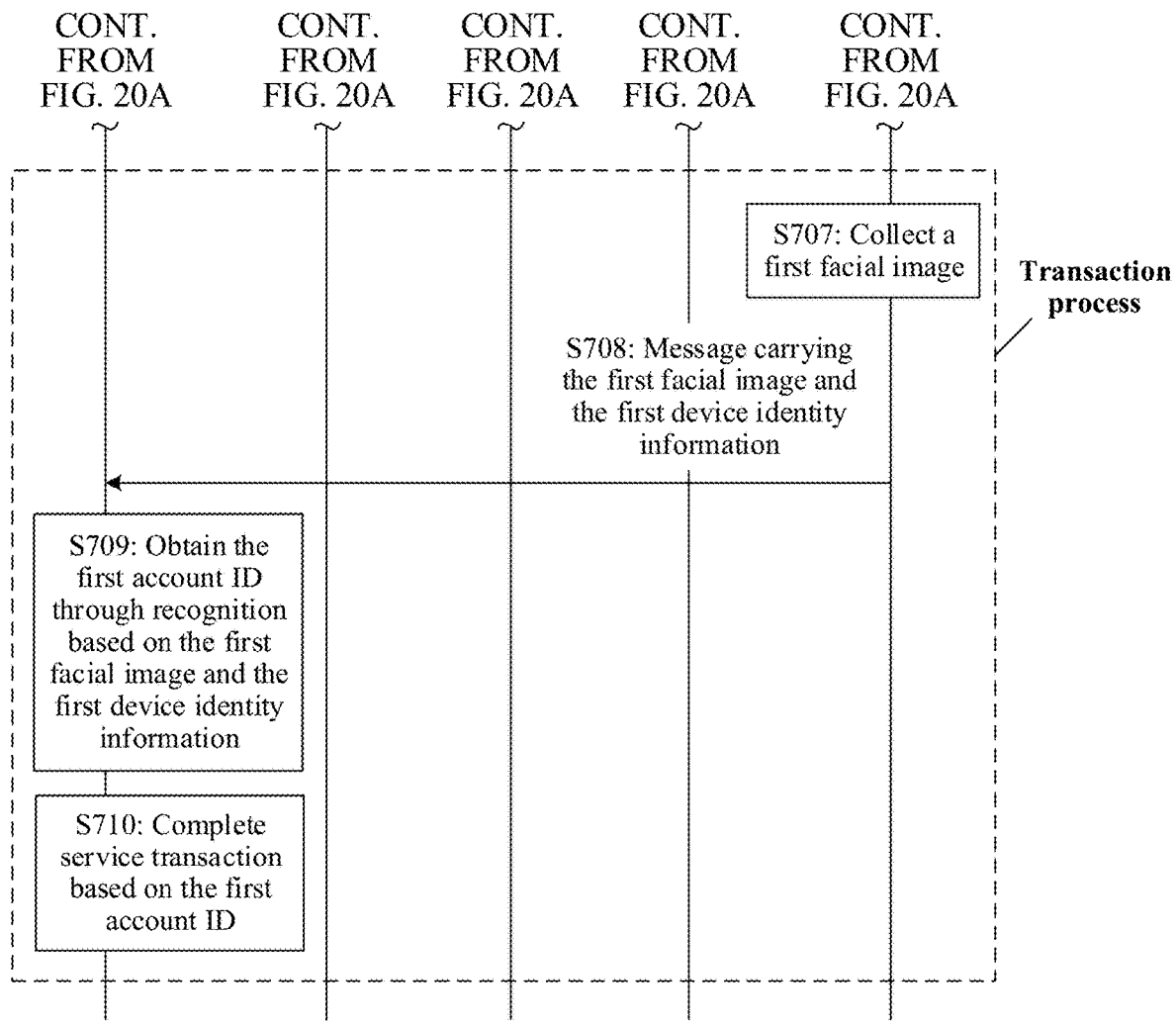

After registration is completed and the account is logged in to, the electronic device 10 may perform the service execution method according to embodiments of this application. FIG. 20A and FIG. 20B are a schematic flowchart of the service transaction method according to this embodiment of this application. The service transaction method is on a basis of the system architecture shown in FIG. 18, and the service transaction method includes steps S701 to S710.

S701: The Bluetooth device 50 advertises a Bluetooth advertising signal.

The Bluetooth advertising signal may carry first device identifier information (for example, a first UUID) and first device identity information (for example, a first device ID). The first device identity information is in a one-to-one correspondence with the Bluetooth device 50.

S702: The Bluetooth chip 101 receives the Bluetooth advertising signal from the device, and detects whether a device (the Bluetooth device 50) from which the received Bluetooth advertising signal comes is registered with the electronic device 10.

When the electronic device 10 is in a sleep state (for example, the electronic device 10 is in a screen-off sleep state), if the Bluetooth chip 101 detects that the device from which the received Bluetooth advertising signal comes is not registered with the electronic device 10, the Bluetooth agent module 105 may be in a sleep state.

S703: When the device from which the received Bluetooth advertising signal comes is registered with the electronic device 10, the Bluetooth chip 101 wakes up the Bluetooth agent module 105, and sends the first device identifier information.

If the Bluetooth agent module 105 is already in an enabled state, the first device identifier information can be sent to the Bluetooth agent module 105 without waking up the Bluetooth agent module 105.

S704: The Bluetooth agent module 105 runs the app 102 based on the first device identifier information and first registration information.

The Bluetooth agent module 105 stores the first registration information in step S603 in the registration process. The Bluetooth agent module 105 finds the first registration information by using the first device identifier information, and finds and runs the app 102 by using APP_AWAKE_ID in the first registration information.

⑤ OPTION in the first registration information may indicate that a data receiving entity is the app 102, and the Bluetooth chip 101 wakes up the app 102 after obtaining the first device identifier information through scanning. The Bluetooth agent module 105 may further determine, based on OPTION, that the app 102 needs to be run. Then, the app 102 is run by using APP_AWAKE_ID in the first registration information.

Optionally, if the app 102 is already in a running state, there is no need to run the app 102.

S705: The Bluetooth agent module 105 sends the first device identity information to the app 102.

The first device identity information may be sent by the Bluetooth chip 101 to the Bluetooth agent module 105 together with the first device identifier information in step S703.

S706: The app 102 sends, to the server 40, a message carrying the first device identity information and a first account ID.

Steps S701 to S706 are performed, so that service information (for example, a device ID of the Bluetooth device 50) from the external Bluetooth device 50 may be transmitted to the app 102, and the app 102 sends the service information to the server 40 to prepare for the subsequent transaction process. The first account ID is an ID of a login account on the app 102. For example, for an Alipay app, an account ID may be an Alipay account.

After step S706, the user may execute the transaction process (for example, insensible facial payment) in a verification manner, for example, facial verification or fingerprint verification. For details, refer to steps S707 to S710. For steps S707 to S710, refer to descriptions in steps S505 to S508 in the example shown in FIG. 16. Details are not described herein again.

S707: The Bluetooth device 50 collects a first facial image.

S708: The Bluetooth device 50 sends, to the server 40, a message carrying the first facial image and the first device identity information.

S709: The server 40 obtains the first account ID through recognition based on the first facial image and the first device identity information.

S710: The server 40 completes service transaction based on the first account ID.

In the foregoing service transaction method process, the Bluetooth agent module 105 is started only after the device from which the Bluetooth advertising signal received by the Bluetooth chip 101 comes is registered with the electronic device 10. The Bluetooth agent module 105 and the application processor of the electronic device 10 do not need to be always in a working state, and this reduces power consumption and memory usage of the electronic device 10.

In this embodiment of this application, the Bluetooth agent module 105 may run the app 102, and the user does not need to manually run the app 102. In this way, the service transaction execution process is insensible to the user, and convenience of the service transaction process is improved.

In this embodiment of this application, the Bluetooth agent module 105 may run the app 102, but the app 102 does not need to be always run on the electronic device 10, and the app 102 may be stopped running by the application processor. This further reduces power consumption and memory usage of the electronic device 10.

In this embodiment of this application, the Bluetooth agent module 105 further provides a Bluetooth scanning management platform for a Bluetooth-related service transaction process.

In a possible implementation, the Bluetooth scanning function in step S702 may be implemented by the user manually enabling the Bluetooth scanning switch 1001. In another possible implementation, the Bluetooth scanning function may alternatively be enabled when the electronic device 10 detects that the Bluetooth scanning function is not enabled. For example, in the example of the registration process described in FIG. 19, the Bluetooth agent module 105 enables the Bluetooth scanning function through steps S604 and S605. Alternatively, after registration is completed, the Bluetooth agent module 105 may automatically enable the Bluetooth scanning function in the service transaction process. The Bluetooth agent module 105 may enable the Bluetooth scanning function, so that the user does not need to manually enable the Bluetooth scanning function. In this way, the service transaction execution process is insensible to the user, and convenience of the service transaction process is improved.

(c) Deregistration Process

Figure 21:
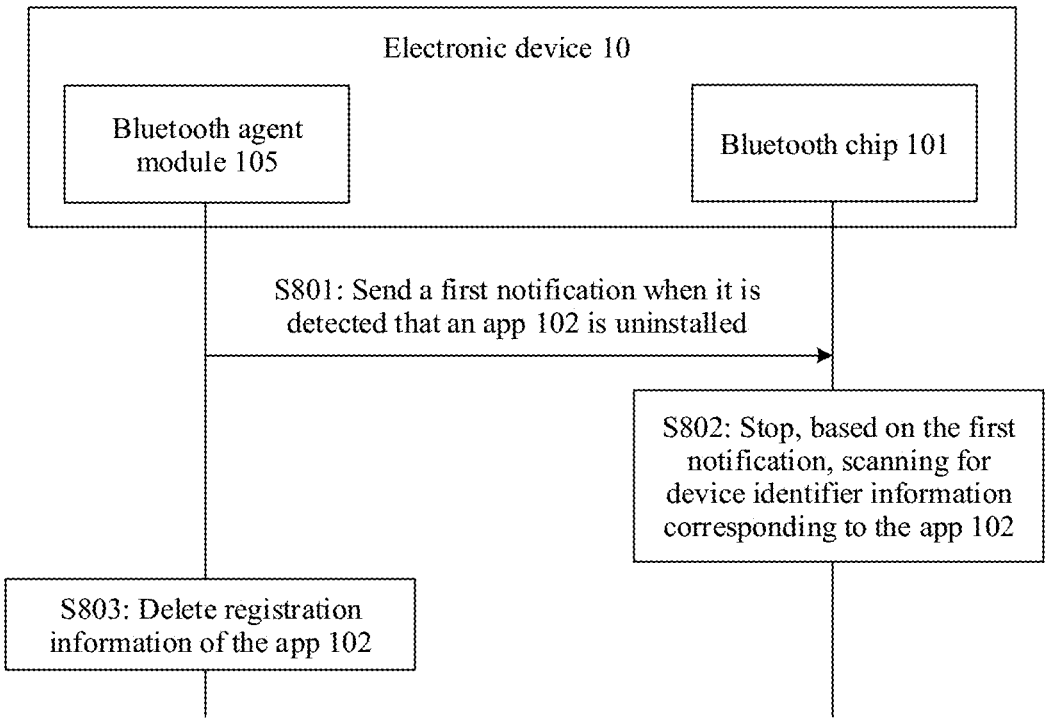
FIG. 21 is a schematic flowchart of deregistration of an app 102 according to an embodiment of this application.

The registered app 102 on the electronic device 10 may be deregistered in response to a user operation. The following specifically describes the deregistration process provided in embodiments of this application. FIG. 21 is a schematic flowchart of deregistration of the app 102 according to this embodiment of this application. The deregistration process of the app 102 includes steps S801 to S806.

S801: When detecting that the app 102 is uninstalled, the Bluetooth agent module 105 sends a first notification to the Bluetooth chip 101. The first notification indicates the Bluetooth chip 101 to stop scanning for the first device identifier information.

The first device identifier information is first device identifier information included in the registration information of the app 102 during registration. For example, the first device identifier information included in the registration information of the app 102 during registration is a UUID 1, a UUID 2, a UUID 3, and a UUID 4. In this case, the first notification indicates the Bluetooth chip 101 to stop scanning for the UUID 1, the UUID 2, the UUID 3, and the UUID 4. After step S801 is performed, when detecting that the Bluetooth advertising signal includes the UUID 1, the UUID 2, the UUID 3, and the UUID 4, the Bluetooth chip 101 considers that the device from which the Bluetooth advertising signal comes is not registered with the electronic device 10, and does not wake up the Bluetooth agent module 105.

In this embodiment of this application, the application processor may detect that the app 102 is uninstalled, and advertise an advertisement used to indicate that the app 102 is uninstalled. The Bluetooth agent module 105 determines, based on the advertisement used to indicate that the app 102 is uninstalled, that the app 102 is detected to be uninstalled, and performs step S801.

S802: The Bluetooth chip 101 stops, based on the first notification, scanning for the first device identifier information.

The Bluetooth chip 101 may delete the stored device identifier information corresponding to the app 102. In the example of step S801, the Bluetooth chip 101 may delete the stored UUID 1, UUID 2, UUID 3, and UUID 4.

S803: The Bluetooth agent module 105 deletes the registration information of the app 102.

Step S803 may alternatively be performed before step S802.

After the deregistration process of the app 102 is performed, when detecting that the Bluetooth advertising signal includes the first device identifier information, the Bluetooth chip 101 considers that the device from which the Bluetooth advertising signal comes is not registered with the electronic device 10. In addition, the Bluetooth agent module 105 is not woken up, and a Bluetooth channel is not established.

In the service execution method in embodiments of this application, descriptions are provided by using an example in which service information (for example, weight information) is insensibly uploaded to an electronic device. The Bluetooth device 50 may be a weight scale 90. It may be understood that in embodiments of this application, the scenario of automatically uploading the weight data to the electronic device 10 is used as an example for description, and another service scenario may alternatively be used. This is not limited in embodiment of this application. The electronic device 10 may receive a Bluetooth advertising signal. An app 102 corresponding to the weight scale 90 may be installed on the electronic device 10. The app 102 on the electronic device 10 may establish a channel to the weight scale 90 through the Bluetooth advertising signal, and the weight scale 90 may upload the weight data detected in real time to the app 102. In the foregoing process of uploading the weight data to the electronic device 10, the data can be insensibly uploaded to the electronic device 10 without the user manually operating the app 102 on the electronic device 10.

Figure 22:
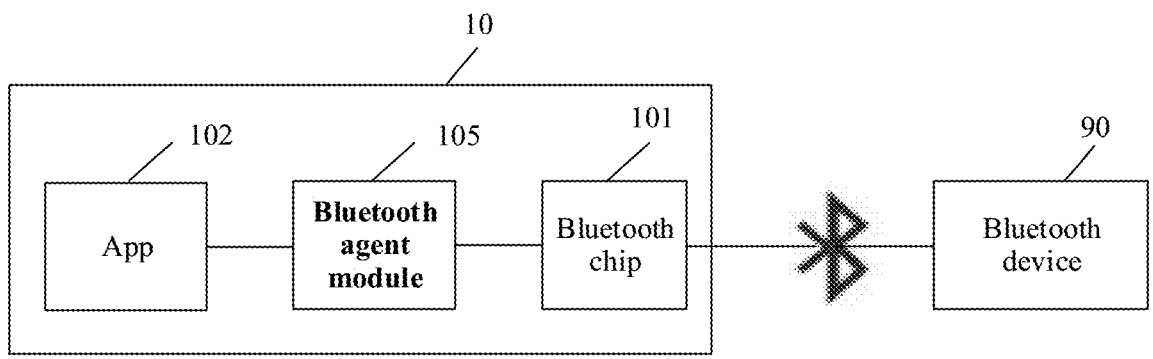
FIG. 22 is a schematic diagram of an architecture of a Bluetooth system according to an embodiment of this application.

FIG. 22 is a schematic diagram of an architecture of a Bluetooth system according to an embodiment of this application. As shown in FIG. 22, the Bluetooth system includes a Bluetooth device (for example, a weight scale 90) and an electronic device 10.

As shown in FIG. 22, the electronic device 10 includes a Bluetooth chip 101, a Bluetooth agent module 105, and an app 102. The Bluetooth chip 101 establishes a connection to the Bluetooth agent module 105, and the Bluetooth agent module 105 establishes a connection to the app 102.

After the app 102 is installed on the electronic device 10, a registration process of the app needs to be completed, and a Bluetooth connection to the weight scale 90 is established. For details, refer to the registration process described in FIG. 7.

Figure 23:
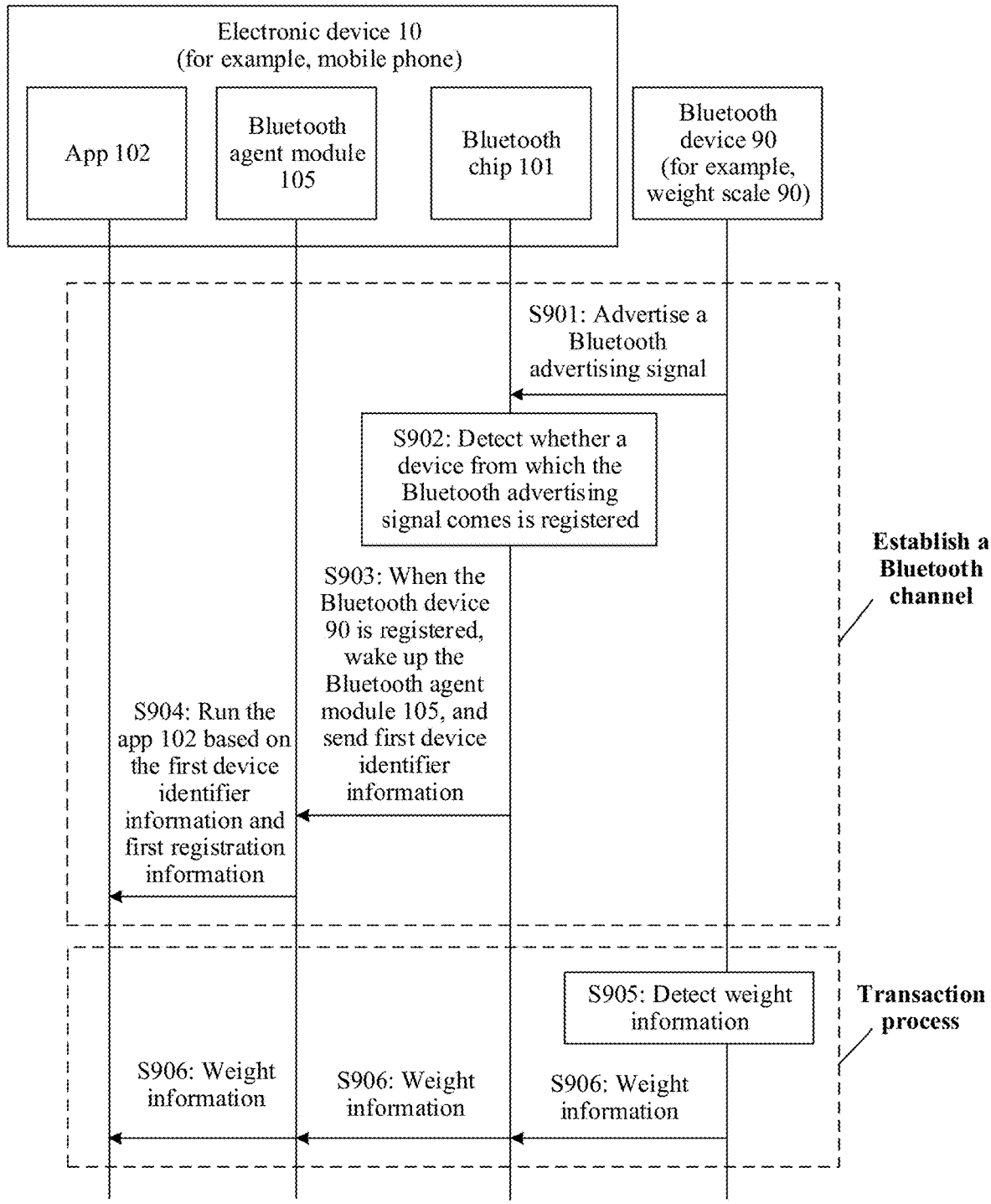
FIG. 23 is a schematic flowchart of a service execution method according to an embodiment of this application.

After registration is completed and an account is logged in to, the electronic device 10 may perform a service execution method according to an embodiment of this application. FIG. 23 is a schematic flowchart of the service execution method according to this embodiment of this application. As shown in FIG. 23, the service execution method includes steps S901 to S906.

S901: The Bluetooth device 90 advertises a Bluetooth advertising signal.

The Bluetooth advertising signal may carry first device identifier information (for example, a first UUID) and first device identity information (for example, a first device ID). The first device identity information is in a one-to-one correspondence with the Bluetooth device 50.

In some embodiments of this application, when the app 102 corresponding to the Bluetooth device 90 is cleared by a system on the electronic device 10, the Bluetooth connection between the electronic device 10 and the Bluetooth device 90 is disconnected, and the Bluetooth chip 101 of the electronic device 10 may enable a Bluetooth scanning function to start to scan the Bluetooth advertising signal.

S902: The Bluetooth chip 101 receives the Bluetooth advertising signal, and detects whether a device (the Bluetooth device 90) from which the Bluetooth advertising signal comes is registered with the electronic device 10.

When the electronic device 10 is in a sleep state (for example, the electronic device 10 is in a screen-off sleep state), if the Bluetooth chip 101 detects that the device (the Bluetooth device 90) from which the Bluetooth advertising signal comes is not registered with the electronic device 10, the Bluetooth agent module 105 may be in a sleep state.

S903: When detecting that the device from which the Bluetooth advertising signal comes is registered with the electronic device 10, the Bluetooth chip 101 wakes up the Bluetooth agent module 105, and sends the first device identifier information.

S904: The Bluetooth agent module 105 runs the app 102 based on the first device identifier information and first registration information.

For descriptions in steps S901 to S904, refer to specific descriptions in steps S701 to S704 in the service execution method described in FIG. 20A.

When detecting that the device from which the Bluetooth advertising signal comes is registered with the electronic device 10, the Bluetooth agent module 105 may establish the channel to the Bluetooth device 90 through steps S901 to S904. Service information (for example, weight information) from the Bluetooth device 90 may be transmitted to the Bluetooth agent module 105. The Bluetooth agent module 105 may wake up the app, and transmit the service information (for example, the weight information) to the app 102.

In some embodiments of this application, after the app 102 is run, the Bluetooth agent module 105 may further indicate the Bluetooth chip 101 to reconnect to the Bluetooth device 90, to establish the Bluetooth connection between the Bluetooth chip 101 and the Bluetooth chip of the Bluetooth device 90. The reconnection process may be a BLE reconnection process, or may be a BR/EDR reconnection process. This is not limited in this embodiment of this application.

Optionally, the service information (for example, the weight information) from the external Bluetooth device 90 may alternatively be received by the Bluetooth chip 101 in a form of an advertising signal, and transmitted to the Bluetooth agent module 105. Then, the service information is transmitted by the Bluetooth agent module 105 to the app 102.

S905: The Bluetooth device 90 detects the weight information.

The weight information may include data such as a weight value, a body fat value, and a health index. For example, the weight information may be sent to the app 102 through the Bluetooth connection.

S906: The Bluetooth device 90 sends the weight information to the app 102 through the channel between the Bluetooth device 90 and the app 102.

The app 102 may store the weight information, and the app 102 may further display the weight information.

In the foregoing method process, in a process of establishing the Bluetooth connection between the Bluetooth device 90 and the Bluetooth chip 101, the Bluetooth agent module 105 is enabled only after the Bluetooth chip 101 detects that the device (the Bluetooth device 90) from which the Bluetooth advertising signal comes is registered with the electronic device 10. The Bluetooth agent module 105 and the application processor of the electronic device 10 do not need to be always in a working state, and this reduces power consumption and memory usage of the electronic device 10.

In the foregoing process in which the weight scale uploads the weight information to the application on the electronic device, the user does not need to manually run the app 102. In this way, the execution process is insensible to the user, and convenience of the service execution process is improved.

In the foregoing process in which the weight scale uploads the weight information to the application, the app 102 does not need to be kept in a running state, and this further reduces power consumption and memory usage of the electronic device 10. In this embodiment of this application, the Bluetooth agent module 105 further provides a management platform for a Bluetooth-related service execution process.

In another possible implementation, the Bluetooth scanning function may alternatively be enabled when the electronic device 10 detects that the Bluetooth scanning function is not enabled. For example, in the example of the registration process, the Bluetooth agent module 105 enables the Bluetooth scanning function. Alternatively, after registration is completed, the Bluetooth agent module 105 may automatically enable the Bluetooth scanning function in the service execution process. The Bluetooth agent module 105 may enable the Bluetooth scanning function, so that the user does not need to manually enable the Bluetooth scanning function. In this way, the service execution process is insensible to the user, and convenience of the service execution process is improved.

In some other embodiments of this application, the Bluetooth advertising signal advertised by the Bluetooth device 90 is not limited to including the first UUID, and may further include a MAC address of the weight scale. In the registration process, in a process of establishing the Bluetooth connection to the electronic device 10, the Bluetooth device 90 transmits the MAC address (the first MAC address) of the Bluetooth device 90 to the electronic device 10. The Bluetooth chip of the electronic device 10 stores the first MAC address. When the Bluetooth connection is disconnected, the electronic device 10 scans the Bluetooth advertising signal according to the first MAC address. A weight scale application corresponding to the weight scale is started only when the Bluetooth advertising signal carrying the first MAC address is obtained through scanning. The weight scale application may indicate the Bluetooth chip 101 to reconnect to the weight scale.

In some embodiments of this application, when the electronic device 10 detects that the app 102 corresponding to the Bluetooth device 90 is cleared by the system, the electronic device 10 may enable the Bluetooth scanning function to start to scan the Bluetooth advertising signal.

In embodiments of this application, the Bluetooth device 90 described in FIG. 22 and FIG. 23 is not limited to a weight scale, and may alternatively be another wearable device, for example, a smartwatch.

In the scenario in which the vehicle is insensibly unlocked, an embodiment of this application further provides a Bluetooth system and a Bluetooth connection method. This method is on a basis of the system architecture described in FIG. 1. A Bluetooth device 60 may be the vehicle head unit 20 shown in FIG. 1. It may be understood that in this embodiment of this application, the scenario in which the vehicle is insensibly unlocked is used as an example for description, and another service scenario may alternatively be used. This is not limited in this embodiment of this application.

Figure 24:
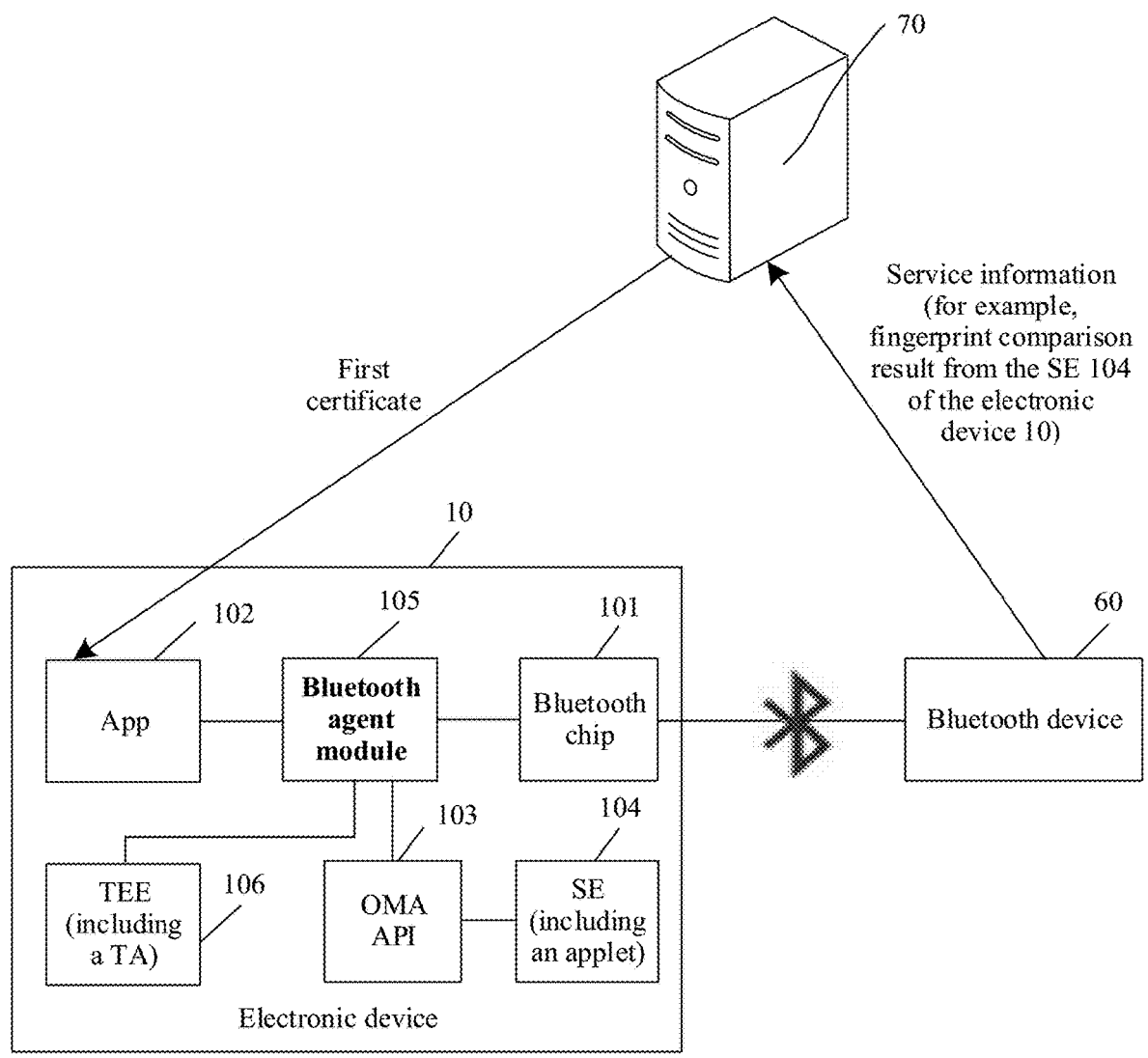
FIG. 24 is a schematic diagram of an architecture of a Bluetooth system according to an embodiment of this application.

FIG. 24 is a schematic diagram of an architecture of the Bluetooth system according to this embodiment of this application. As shown in FIG. 24, the Bluetooth system includes the electronic device 10, the Bluetooth device 60 (for example, the vehicle 20), and a server 70. As shown in FIG. 24, the electronic device 10 includes the Bluetooth chip 101, the Bluetooth agent module 105, the app 102, the OMA API 103, the SE 104, and the TEE 106. The Bluetooth system may include either the SE 104 that is connected to the OMA API 103 or the TEE 106 that is connected to the OMA API 103, or may include both the SE 104 and the TEE 106. The Bluetooth chip 101 establishes a connection to the Bluetooth agent module 105. The Bluetooth agent module 105 is connected to the TEE 106, and the Bluetooth agent module 105 is connected to the SE 104 through the OMA API 103.

Before the vehicle is insensibly unlocked by using the system architecture, a user needs to install the app 102 on the electronic device 10, and the electronic device 10 completes a registration process. The following processes are separately described: (d) Registration process and (e) Service execution process. In this embodiment of this application, for a deregistration process of the app 102, refer to specific descriptions in the example shown in FIG. 13. Details are not described herein again.

(d) Registration Process

Figure 25:
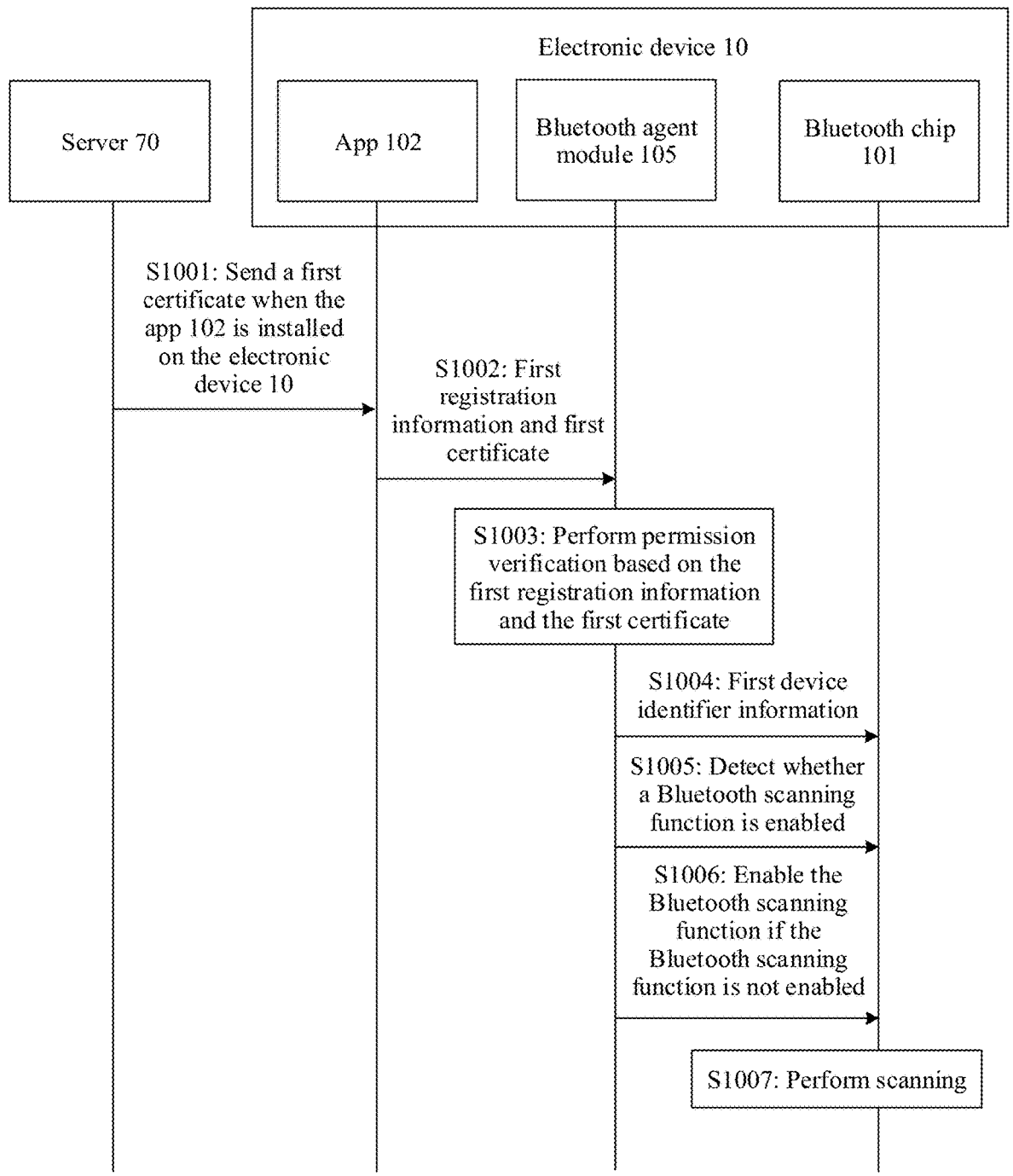
FIG. 25 is a schematic flowchart of a registration process of an app 102 according to an embodiment of this application.

The registration process is described below with reference to the system architecture shown in FIG. 24 and a process shown in FIG. 25. FIG. 25 is a schematic flowchart of the registration process of the app 102 according to this embodiment of this application. The registration process of the app 102 includes steps S1001 to S1006.

S1001: When the app 102 is installed on the electronic device 10, the app 102 obtains a first certificate from the server 70.

In this embodiment of this application, if an app ID of the app 102 is not stored in the Bluetooth agent module 105, the app 102 may obtain the first certificate from the server 70. The first certificate may be used to prove permission of the app 102 to the Bluetooth agent module 105.

In a possible implementation, when the app 102 is installed on the electronic device 10, the app 102 may send, to the server 70, a message used to request to deliver the first certificate. Then, the server 70 sends the first certificate to the app 102. In another possible implementation, when the app 102 is installed on the electronic device 10, the server 70 delivers the first certificate to the app 102.

S1002: The app 102 sends first registration information and the first certificate to the Bluetooth agent module 105.

Optionally, the app 102 may further send the first certificate to the Bluetooth agent module 105. The first certificate may prove the permission of the app 102 to the Bluetooth agent module 105, so that permission verification performed on the app 102 in step S1003 succeeds.

S1003: The Bluetooth agent module 105 performs permission verification on the app 102 based on the first registration information and the first certificate.

S1004: When the permission verification succeeds, the Bluetooth agent module 105 sends first device identifier information to the Bluetooth chip 101.

S1005: The Bluetooth agent module 105 detects whether a Bluetooth scanning function of the Bluetooth chip 101 is enabled.

S1006: When detecting that the Bluetooth scanning function of the Bluetooth chip 101 is not enabled, the Bluetooth agent module 105 enables the Bluetooth scanning function.

S1007: The Bluetooth chip 101 performs scanning.

The following describes the first certificate in step S1002 and the permission verification process in step S1003.

The first certificate is a digital certificate digitally signed by a certificate authority (certificate authority, CA). The certificate authority is approved by the Bluetooth agent module 105. The first certificate may include a public key of the server 70, a name of the server 70, and a digital signature of the certificate authority. When the Bluetooth agent module 105 performs identity authentication by using the first certificate, the first certificate may randomly generate an identity code. Each digital certificate can generate a corresponding identity code, but an identity code generated each time is different.

The first certificate is electronic data, including identity information of the server 70, that is reviewed and issued by an authentication center. Therefore, the first certificate may prove, to the Bluetooth agent module 105 by using the digital signature of the certificate authority, that the server 70 is authenticated by the certificate authority.

The Bluetooth agent module 105 stores a public key of the certificate authority, and performs verification on the digital signature of the certificate authority in the first certificate by using the public key of the certificate authority. When the verification succeeds, the permission verification succeeds. Then, steps S1004 to S1007 are performed.

For steps S1004 to S1007, refer to descriptions in steps S603 to S606 in the example shown in FIG. 19. Details are not described herein again.

(e) Service Execution Process

Figure 26:
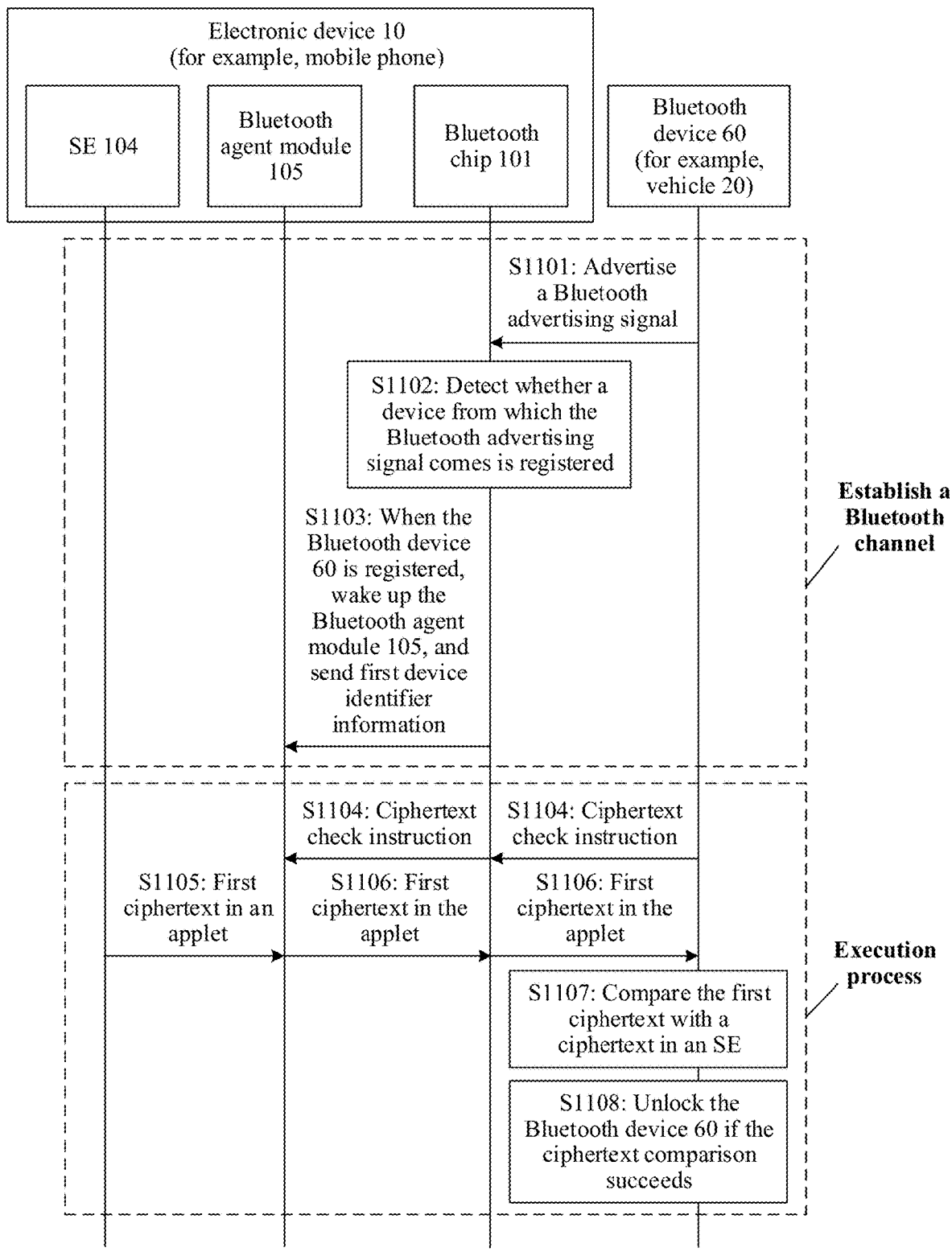
FIG. 26 is a schematic flowchart of a service execution method according to an embodiment of this application.

After registration is completed and an account is logged in to, the electronic device 10 may perform the service execution method according to embodiments of this application. FIG. 26 is a schematic flowchart of the service execution method according to this embodiment of this application. In the service execution method, an example in which a Bluetooth channel is established between the external Bluetooth device 60 and the SE 104 is used. Establishment of a Bluetooth channel between the external Bluetooth device 60 and the TEE 106 is similar. The service execution method is on a basis of the system architecture shown in FIG. 24, and the service execution method includes steps S1101 to S1108.

S1101: The Bluetooth device 60 advertises a Bluetooth advertising signal.

The Bluetooth advertising signal may carry first device identifier information (for example, a first UUID) and first device identity information (for example, a first device ID). The first device identity information is in a one-to-one correspondence with the Bluetooth device 60.

S1102: The Bluetooth chip 101 receives the Bluetooth advertising signal from the Bluetooth device 60, and detects whether a device from which the received Bluetooth advertising signal comes is registered with the electronic device 10.

When the electronic device 10 is in a sleep state (for example, the electronic device 10 is in a screen-off sleep state), if the Bluetooth chip 101 detects that the device (the Bluetooth device 50) from which the Bluetooth advertising signal comes is not registered with the electronic device 10, the Bluetooth agent module 105 may be in a sleep state.

S1103: When detecting that the device from which the Bluetooth advertising signal comes is registered with the electronic device 10, the Bluetooth chip 101 wakes up the Bluetooth agent module 105, and sends the first device identifier information.

The Bluetooth agent module 105 stores the first registration information in step S203 in the registration process shown in FIG. 10. The Bluetooth agent module 105 finds the first registration information by using the first device identifier information. 0 OPTION in the first registration information may indicate that a data receiving entity is the TEE 106, and the Bluetooth chip 101 does not wake up the app 102 after obtaining the first device identifier information through scanning. When detecting that the device from which the Bluetooth advertising signal comes is registered with the electronic device 10, the Bluetooth agent module 105 may establish a channel to the Bluetooth device 60. The channel between the Bluetooth agent module 105 and the external Bluetooth device is established through steps S1101 to S1103, and the Bluetooth agent module 105 may obtain service information of the TEE 106 and transmit the service information to the external Bluetooth device.

After step S1103, a user may execute a transaction process (for example, insensibly unlocking a vehicle) when the user carrying the electronic device 10 is close to the Bluetooth device 60. Refer to steps S1104 to S1108.

For example, in a scenario in which the Bluetooth device 60 unlocks the vehicle of the vehicle 20, when detecting that a distance between the vehicle 20 and the electronic device 10 is less than or equal to a specific distance (for example, 30 meters), the vehicle 20 may perform a process of establishing the Bluetooth channel in steps S1101 to S1103. After the channel between the Bluetooth agent module 105 and the vehicle 20 is established through steps S1101 to S1103, the vehicle 20 may detect the distance between the electronic device 10 and the vehicle 20 in real time. When the vehicle 20 detects that the distance to the electronic device 10 is less than or equal to a specific distance (for example, 10 meters), the vehicle 20 may perform steps S1104 to S1107 to complete a verification process. When detecting that the distance to the electronic device 10 is less than or equal to a specific distance (for example, 3 meters), the vehicle 20 performs step S1108 to unlock the vehicle.

S1104: The Bluetooth device 60 sends a ciphertext check instruction to the Bluetooth agent module 105 through the channel.

The ciphertext check instruction may be transmitted after being encrypted by using a digital signature. The ciphertext check instruction may include a digital signature of the Bluetooth device 60, for example, a digital signature including a private key of the Bluetooth device 60. The Bluetooth agent module 105 may store a public key corresponding to the private key of the Bluetooth device 60. After receiving the ciphertext check instruction, the Bluetooth agent module 105 first verifies the digital signature of the Bluetooth device 60 by using the public key. If the verification succeeds, step S1105 is performed.

S1105: The Bluetooth agent module 105 obtains a first ciphertext in an applet in the SE 104.

S1106: The Bluetooth agent module 105 sends the first ciphertext to the Bluetooth device 60 through the Bluetooth chip 101.

In a transmission process in step S1106, the first ciphertext may be encrypted for transmission. An encryption method is not limited in this embodiment of this application.

S1107: The Bluetooth device 60 compares the first ciphertext with a ciphertext in an SE.

S1108: If the ciphertext comparison succeeds, the Bluetooth device 60 unlocks the vehicle of the Bluetooth device 60.

For example, if the first ciphertext is the same as a ciphertext in an applet in the SE of the Bluetooth device 60, comparison succeeds.

In the foregoing service execution method process, the Bluetooth agent module 105 is enabled only after the Bluetooth chip 101 detects that the device (the Bluetooth device 60) from which the Bluetooth advertising signal comes is registered with the electronic device 10. The Bluetooth agent module 105 and the application processor of the electronic device 10 do not need to be always in a working state, and this reduces power consumption and memory usage of the electronic device 10.

In the foregoing service execution method procedure, the app 102 does not need to be run, the Bluetooth channel between the SE 104 and the Bluetooth device 60 is directly established, and this reduces power consumption and memory occupation of the electronic device 10.

In the foregoing service execution method procedure, the user does not need to manually run the app 102. In this way, the service execution process is insensible to the user, and convenience of the service execution process is improved.

In the foregoing service execution method process, the app 102 does not need to be kept in a running state, and this further reduces power consumption and memory usage of the electronic device 10. In this embodiment of this application, the Bluetooth agent module 105 further provides a management platform for establishing a Bluetooth channel for a Bluetooth-related service execution process.

In a possible implementation, the Bluetooth scanning function in step S1102 may be implemented by the user manually enabling the Bluetooth scanning switch 1001. In another possible implementation, the Bluetooth scanning function may alternatively be enabled when the electronic device 10 detects that the Bluetooth scanning function is not enabled. For example, in the example of the registration process described in FIG. 25, the Bluetooth agent module 105 enables the Bluetooth scanning function through steps S1005 and S1006. Alternatively, after registration is completed, the Bluetooth agent module 105 may automatically enable the Bluetooth scanning function in the service process. The Bluetooth agent module 105 may enable the Bluetooth scanning function, so that the user does not need to manually enable the Bluetooth scanning function. In this way, the service execution process is insensible to the user, and convenience of the service execution process is improved.

In some other embodiments of this application, the app 102 may further establish a connection to the SE 104 through the OMA API 103. ⑤ OPTION in the first registration information may indicate that a data receiving entity is the SE 104, and the Bluetooth chip 101 wakes up the app 102 after obtaining the first device identifier information through scanning. After step S1103, the Bluetooth agent module 105 wakes up the app 102. The Bluetooth agent module 105 may establish the channel to the external Bluetooth device 60, and the Bluetooth agent module 105 is connected to the SE 104, so that service information (for example, a ciphertext) in the SE 104 may be transmitted to the Bluetooth device 60 (for example, the vehicle).

In this embodiment of this application, the Bluetooth device 60 may further establish a communication connection to the server 70, as shown in FIG. 24. The Bluetooth device 60 may exchange service information with the server 70 through the communication connection. For example, the service information is a fingerprint comparison result from the SE 104 of the electronic device 10.

Specifically, after the channel is established between the Bluetooth agent module 105 and the external Bluetooth device, if the server 70 needs to verify a user identity on the electronic device 10 in the transaction process, for example, verify a user fingerprint or a facial image of the user, after the verification is completed, the electronic device 10 may send a comparison result to the server 70 through the Bluetooth device 60. Fingerprint verification is used as an example. First, the electronic device 10 compares a detected fingerprint with a pre-stored fingerprint, and stores a comparison result in the SE 104 of the electronic device 10. The Bluetooth agent module 105 obtains the comparison result from the SE 104. The Bluetooth agent module 105 sends the comparison result to the Bluetooth device 60 through the Bluetooth connection. The Bluetooth device 60 sends the comparison result to the server 70 through the communication connection to the server 70, to complete the transaction process.

It may be understood that the communication connection between the Bluetooth device 60 and the server 70 is not limited to the foregoing function example, and may be used to transmit other service information in the service execution process. This is not limited in this embodiment of this application.

Figure 27:
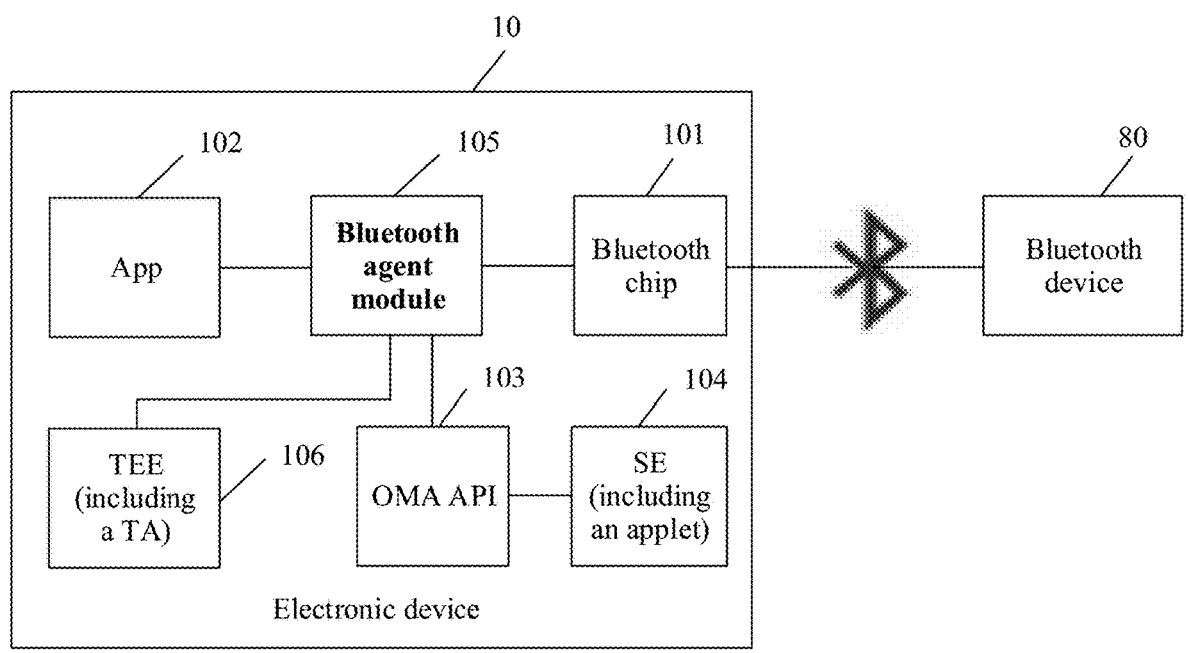
FIG. 27 is a schematic diagram of an architecture of a Bluetooth system according to an embodiment of this application.

For the service execution process in which the vehicle is insensibly unlocked, the server 70 may alternatively not be required in the registration process of the app 102. The Bluetooth agent module 105 stores the APP_ID of the app 102, and the Bluetooth agent module 105 may perform permission verification on the app by using the APP_ID of the app 102. Specifically, refer to FIG. 27. FIG. 27 is a schematic diagram of an architecture of the Bluetooth system according to this embodiment of this application. As shown in FIG. 27, the Bluetooth system includes the electronic device 10 and a Bluetooth device 80 (for example, a vehicle 20). As shown in FIG. 27, the electronic device 10 includes the Bluetooth chip 101, the Bluetooth agent module 105, the app 102, the OMA API 103, the SE 104, and the TEE 106. The Bluetooth system may include either the SE 104 that is connected to the OMA API 103 or the TEE 106 that is connected to the OMA API 103, or may include both the SE 104 and the TEE 106. The Bluetooth chip 101 establishes a connection to the Bluetooth agent module 105. The Bluetooth agent module 105 is connected to the TEE 106, and the Bluetooth agent module 105 is connected to the SE 104 through the OMA API 103.

After the app 102 is installed on the electronic device 10, a registration process needs to be completed for the app. For the registration process, refer to the embodiment described in FIG. 10. The registration process is completed only on the electronic device 10. For a service execution process, refer to the embodiment described in FIG. 26. Neither the registration process nor the service execution process requires interaction with a server. For a service deregistration process, refer to specific descriptions in the example shown in FIG. 13. Details are not described herein.

It may be understood that a Bluetooth connection is used as an example for description in embodiments of this application. The Bluetooth connection in embodiments of this application may be a BLE connection, or may be a BR/EDR connection. However, in embodiments of this application, the connection is not limited to the Bluetooth connection, and may be another short-range wireless communication connection, for example, a Wi-Fi connection or a ZigBee connection. This is not limited in embodiments of this application.

In the foregoing embodiments, all or some of the functions may be implemented by using software, hardware, or a combination of software and hardware. When software is used to implement the foregoing embodiments, all or some of the foregoing embodiments may be implemented in a form of a computer program product. The computer program product includes one or more computer instructions. When the computer program instructions are loaded and executed on a computer, a procedure or function according to embodiments of this application is all or partially generated. The computer may be a general-purpose computer, a special-purpose computer, a computer network, or another programmable apparatus. The computer instructions may be stored in a computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A Bluetooth connection method, comprising:
    establishing, by a first electronic device, a first Bluetooth connection with a second electronic device;
    disconnecting, by the first electronic device, the first Bluetooth connection with the second electronic device when a first preset condition is met;

scanning, by the first electronic device, a Bluetooth advertising signal in response to the disconnection of the first Bluetooth connection;

starting, by the first electronic device upon determining that a first advertising signal carries device information of the second electronic device, a first application that is a service application running at an application layer and associated with the second electronic device, wherein the first application is cleared by a system of the first electronic device and in a closed state before the first application is started;

sending, by the first electronic device via the first application, a connection request to the second electronic device; and establishing, by the first electronic device, a second Bluetooth connection with the second electronic device when receiving a response data packet sent by the second electronic device.

2. The method of claim 1, wherein before starting the first application, the method further comprises:
detecting, by the first electronic device, whether registration information of the first application is valid.

3. The method of claim 1, wherein the method further comprises:
displaying, by the first electronic device, a first user interface comprising a first control for disconnecting the first Bluetooth connection with the second electronic device; and
in response to a user operation performed on the first control, disconnecting, by the first electronic device, the first Bluetooth connection with the second electronic device, and skipping scanning the Bluetooth advertising signal.

4. The method of claim 1, wherein the second electronic device is a vehicle head unit, the first application is a vehicle manufacturer application, and after the establishing, by the first electronic device, a second Bluetooth connection with the second electronic device, the method further comprises:
receiving, by the first electronic device, a ciphertext check instruction from the vehicle head unit through the second Bluetooth connection with the vehicle head unit; and
sending, by the first electronic device to the vehicle head unit via the vehicle manufacturer application, a first ciphertext for vehicle unlocking.

5. The method of claim 4, wherein the vehicle manufacturer application operatively communicates with a second application installed on the first electronic device, the second application operatively communicates with a secure storage area, and the secure storage area stores the first ciphertext; and
the sending, by the first electronic device via the vehicle manufacturer application, a first ciphertext to the vehicle head unit comprises:
obtaining, by the first electronic device, the first ciphertext from the secure storage area by using the vehicle manufacturer application and the second application, and sending the first ciphertext to the vehicle head unit.

6. The method of claim 1, wherein the first Bluetooth connection and the second Bluetooth connection each are a Bluetooth low energy (BLE) connection or a classic Bluetooth Basic Rate/Enhanced Data Rate (BR/EDR) connection.

7. The method of claim 1, wherein the device information of the second electronic device comprises one or more of a media access control (MAC) address of the second electronic device, a vehicle identification number (VIN) of the second electronic device, or a universally unique identifier (UUID) of the second electronic device.

8. The method of claim 1, the method further comprising:
obtaining, by the first electronic device, the device information of the second electronic device when establishing the first Bluetooth connection to the second electronic device;
detecting, by the first electronic device, whether the registration information of the first application is valid, wherein the registration information of the first application comprises the device information of the second electronic device; and
storing, by the first electronic device, the device information of the second electronic device when the registration information of the first application is valid, wherein the stored device information of the second electronic device is used by the first electronic device to scan the first advertising signal.

9. The method of claim 8, wherein the detecting, by the first electronic device, whether the registration information of the first application is valid comprises:
obtaining, by the first electronic device, a first certificate of the first application from a server; and
detecting, by the first electronic device based on the first certificate, whether the registration information of the first application is valid.

10. The method of claim 1, wherein the starting the first application is performed by one of a Bluetooth agent at the application frame layer and a second service application running at the application layer, wherein the one of Bluetooth agent at the application frame layer and the second service application comprises register information of the first application, the register information includes an identifier of the first application and an identifier of the second electronic device.

11. A first electronic device, wherein the first electronic device comprises:
a Bluetooth chip, wherein the Bluetooth chip supports classic Bluetooth Basic Rate/Enhanced Data Rate (BR/EDR) and Bluetooth low energy (BLE);
a memory storing one or more computer program instructions;
one or more processors in communication with the Bluetooth chip and the memory, wherein the one or more processors execute the computer program instructions to cause the first electronic device to perform the following steps of:
establishing a first Bluetooth connection with a second electronic device;
disconnecting the first Bluetooth connection with the second electronic device when a first preset condition is met;
scanning a Bluetooth advertising signal in response to the disconnection of the first Bluetooth connection;
starting, upon determining that a first advertising signal carries device information of the second electronic device, a first application that is a service application running at an application layer and associated with the second electronic device, wherein the first application is cleared by a system of the first electronic device and in a closed state before the first application is started;
sending, via the first application, a connection request to the second electronic device; and
establishing a second Bluetooth connection with the second electronic device when receiving a response data packet sent by the second electronic device.

12. The first electronic device of claim 11, wherein the one or more processors execute the computer program instructions to cause the first electronic device to perform the following steps of:
- in response to the disconnection of the first Bluetooth connection, when the first application is in a closed state, scanning the Bluetooth advertising signal; and
- in response to the disconnection of the first Bluetooth connection, when the first application is cleared by the first electronic device, sending the connection request to the second electronic device.

13. The first electronic device of claim 11, wherein the one or more processors execute the computer program instructions to cause the first electronic device to perform the following steps of:
- when the first advertising signal obtained through scanning carries the device information of the second electronic device, detecting whether registration information of the first application is valid; and
- starting the first application when the registration information of the first application is valid.

14. The first electronic device of claim 11, wherein the second electronic device is a vehicle head unit, the first application is a vehicle manufacturer application, and after the first electronic device establishes the second Bluetooth connection with the second electronic device, the one or more processors execute the computer program instructions to cause the first electronic device to perform the following steps of:
- receiving a ciphertext check instruction from the vehicle head unit through a Bluetooth connection with the vehicle head unit; and
- sending, to the vehicle head unit via the vehicle manufacturer application, a first ciphertext, wherein the first ciphertext is configured to unlock a vehicle.

15. The first electronic device of claim 11, wherein the starting the first application is performed by one of a Bluetooth agent at the application frame layer and a second service application running at the application layer, wherein the one of Bluetooth agent at the application frame layer and the second service application comprises register information of the first application, the register information includes an identifier of the first application and an identifier of the second electronic device.

16. A non-transitory computer storage medium comprising computer instructions for execution by a processor, the computer instructions including instructions for:
- establishing a first Bluetooth connection between a first electronic device and a second electronic device;
- disconnecting the first Bluetooth connection with the second electronic device when a first preset condition is met;
- scanning a Bluetooth advertising signal in response to the disconnection of the first Bluetooth connection;
- starting, upon determining that a first advertising signal carries device information of the second electronic device, a first application that is a service application running at an application layer and associated with the second electronic device, wherein the first application is cleared by a system of the first electronic device and in a closed state before the first application is started;
- sending, via the first application, a connection request to the second electronic device; and
- establishing a second Bluetooth connection with the second electronic device when receiving a response data packet sent by the second electronic device.

17. The non-transitory computer storage medium of claim 16, wherein the second electronic device is a vehicle head unit, the first application is a vehicle manufacturer application, and after the establishing, by the first electronic device, a second Bluetooth connection with the second electronic device, the computer instructions further comprise instructions for:
- receiving a ciphertext check instruction from the vehicle head unit through the second Bluetooth connection with the vehicle head unit; and
- sending, to the vehicle head unit via the vehicle manufacturer application, a first ciphertext for vehicle unlocking.

18. The non-transitory computer storage medium of claim 17, wherein a second application installed on the first electronic device operatively communicates with the vehicle manufacturer application, the second application operatively communicates with a secure storage area that stores the first ciphertext; and
- wherein the sending, via the vehicle manufacturer application, the first ciphertext to the vehicle head unit comprises:
- obtaining the first ciphertext from the secure storage area by using the vehicle manufacturer application and the second application, and
- sending the first ciphertext to the vehicle head unit.

19. The non-transitory computer storage medium of claim 16, wherein the device information of the second electronic device comprises one or more of a media access control (MAC) address of the second electronic device, a vehicle identification number (VIN) of the second electronic device, or a universally unique identifier (UUID) of the second electronic device.

20. The non-transitory computer storage medium of claim 16, wherein the starting the first application is performed by one of a Bluetooth agent at the application frame layer and a second service application running at the application layer, wherein the one of Bluetooth agent at the application frame layer and the second service application comprises register information of the first application, the register information includes an identifier of the first application and an identifier of the second electronic device.

* * * * *